(12) United States Patent
Kim et al.

(10) Patent No.: US 12,522,971 B2
(45) Date of Patent: Jan. 13, 2026

(54) CLOTHES TREATMENT APPARATUS AND CONTROL METHOD THEREFOR

(71) Applicant: LG Electronics Inc., Seoul (KR)

(72) Inventors: Seonghwan Kim, Seoul (KR); Myoungjong Kim, Seoul (KR); Manseok Lee, Seoul (KR); Ingeon Lee, Seoul (KR); Haeyoon Je, Seoul (KR)

(73) Assignee: LG Electronics Inc., Seoul (KR)

( * ) Notice: Subject to any disclaimer, the term of this patent is extended or adjusted under 35 U.S.C. 154(b) by 162 days.

(21) Appl. No.: 18/494,434

(22) Filed: Oct. 25, 2023

(65) Prior Publication Data

US 2024/0052550 A1  Feb. 15, 2024

Related U.S. Application Data

(63) Continuation of application No. 17/053,639, filed as application No. PCT/KR2019/005488 on May 8, 2019, now Pat. No. 11,834,774.

(30) Foreign Application Priority Data

May 8, 2018 (KR) .................. 10-2018-0052733
May 8, 2018 (KR) .................. 10-2018-0052742
(Continued)

(51) Int. Cl.
*D06F 58/20* (2006.01)
*B08B 3/02* (2006.01)
(Continued)

(52) U.S. Cl.
CPC ................ *D06F 58/20* (2013.01); *B08B 3/02* (2013.01); *D06F 58/24* (2013.01); *D06F 58/206* (2013.01);
(Continued)

(58) Field of Classification Search
CPC . B08B 3/02; D06F 58/45; D06F 58/24; D06F 58/20; D06F 58/22; D06F 2103/00; D06F 58/30; D06F 58/206; D06F 2105/30
See application file for complete search history.

(56) References Cited

U.S. PATENT DOCUMENTS 6,151,795 A    11/2000 Hoffman
7,866,057 B2 *  1/2011 Grunert .................. D06F 58/20
                                                34/73
(Continued)

FOREIGN PATENT DOCUMENTS

CN      201416109       3/2010
CN      101805973       8/2010
(Continued)

OTHER PUBLICATIONS

Machine Translation of EP 2341183 to Essaid et al., Jun. 2011. (Year: 2011).*
(Continued)

*Primary Examiner* — Benjamin L Osterhout
(74) *Attorney, Agent, or Firm* — Fish & Richardson P.C.

(57) ABSTRACT

The present specification relates to a clothes treatment apparatus and a control method therefor, the apparatus comprising, in order to improve an air flow mechanism for circulating air to a drum, the drum for accommodating objects to be treated, an air circulation path connected to the drum, a circulation fan, which is provided on the downstream side of a heat exchanger inside the air circulation path and generates suction force so as to suction the air of the air circulation path and supply same to the drum, a water collection part formed at the lower side of the drum so as to collect condensate water, and a trap having a bottom surface that is lower than a peripheral area in the water collection part so as to allow the condensate water to gather therein.

19 Claims, 25 Drawing Sheets

(30) Foreign Application Priority Data

May 8, 2018 (KR) .................... 10-2018-0052745
May 9, 2018 (KR) .................... 10-2018-0053337
May 15, 2018 (KR) .................... 10-2018-0055603

(51) Int. Cl.
| | |
|---|---|
| *D06F 58/24* | (2006.01) |
| *D06F 58/22* | (2006.01) |
| *D06F 58/30* | (2020.01) |
| *D06F 58/45* | (2020.01) |
| *D06F 103/00* | (2020.01) |
| *D06F 105/30* | (2020.01) |

(52) U.S. Cl.
CPC .............. *D06F 58/22* (2013.01); *D06F 58/30* (2020.02); *D06F 58/45* (2020.02); *D06F 2103/00* (2020.02); *D06F 2105/30* (2020.02)

(56) References Cited

U.S. PATENT DOCUMENTS

| | | | |
|---|---|---|---|
| 8,182,612 B2 * | 5/2012 | Grunert | .................. D06F 58/20 134/37 |
| 9,273,903 B2 | 3/2016 | Vian et al. | |
| 9,347,171 B2 * | 5/2016 | Grunert | .................. D06F 58/22 |
| 9,512,554 B2 * | 12/2016 | Baurmann | .............. D06F 58/24 |
| 9,631,315 B2 * | 4/2017 | Jung | .................. F26B 23/001 |
| 10,145,056 B2 * | 12/2018 | Grunert | .................. D06F 58/22 |
| 11,332,877 B1 | 5/2022 | Dighton | |
| 2005/0066538 A1 | 3/2005 | Goldberg et al. | |
| 2010/0146811 A1 | 6/2010 | Steffens | |
| 2012/0017456 A1 | 1/2012 | Grunert | |
| 2013/0305553 A1 | 11/2013 | Heo | |
| 2013/0312274 A1 | 11/2013 | Pillot et al. | |
| 2014/0090265 A1 | 4/2014 | Santarossa et al. | |
| 2014/0144035 A1 | 5/2014 | Vian et al. | |
| 2016/0083894 A1 | 3/2016 | Bison et al. | |
| 2016/0115643 A1 | 4/2016 | Bison et al. | |
| 2016/0362830 A1 | 12/2016 | Rice et al. | |
| 2017/0175320 A1 | 6/2017 | Masters et al. | |
| 2017/0191215 A1 | 7/2017 | Yoon et al. | |
| 2017/0268158 A1 | 9/2017 | Owejan | |
| 2017/0268159 A1 | 9/2017 | Brown | |

FOREIGN PATENT DOCUMENTS

| | | | | |
|---|---|---|---|---|
| CN | 102292489 | | 12/2011 | |
| CN | 102686792 | | 9/2012 | |
| CN | 106400430 | | 2/2017 | |
| DE | 20304521 | | 5/2003 | |
| EP | 2341178 | | 7/2011 | |
| EP | 2341183 | | 7/2011 | |
| EP | 2573253 A1 * | 3/2013 | .......... D06F 58/206 |
| EP | 2620539 A1 * | 7/2013 | ............. D06F 58/22 |
| EP | 2628843 A1 * | 8/2013 | ............. D06F 58/24 |
| EP | 2628844 A1 * | 8/2013 | ............. D06F 58/24 |
| EP | 2628846 A1 * | 8/2013 | ............. D06F 58/24 |
| EP | 2746455 | | 6/2014 | |
| EP | 3024969 | | 6/2016 | |
| EP | 3135802 | | 3/2017 | |
| JP | 2008-155732 | | 7/2008 | |
| JP | 2010-090690 | | 4/2010 | |
| JP | 2010-094169 | | 4/2010 | |
| JP | 2011-078474 | | 4/2011 | |
| JP | 2011-245034 | | 12/2011 | |
| JP | 2011-259640 | | 12/2011 | |
| KR | 2005-0041658 | | 5/2005 | |
| KR | 100687376 | | 2/2007 | |
| KR | 2007-0081854 | | 8/2007 | |
| KR | 2010-0083913 | | 7/2010 | |
| KR | 2011-0072965 | | 6/2011 | |
| KR | 2012-0110497 | | 10/2012 | |
| KR | 2012-0110498 | | 10/2012 | |
| KR | 2013-0127816 | | 11/2013 | |
| KR | 2017-0082048 | | 7/2017 | |

OTHER PUBLICATIONS

Extended European Search Report in European Appln. No. 23208148.9, mailed on Feb. 7, 2024, 8 pages.
Extended European Search Report in European Appln. No. 19798871.0, dated Dec. 14, 2021, 61 pages.
Machine Translation of KR 20130127816 to Jung et al., Nov. 2013. (Year: 2013).
Office Action in Korean Appln. No. 20180052733, dated Feb. 17, 2023, 11 pages (with English translation).
Office Action in Korean Appln. No. 20180052745, dated Mar. 17, 2023, 4 pages.
Office Action in Korean Appln. No. 20180053337, dated Mar. 17, 2023, 14 pages (with English translation).
Office Action in Korean Appln. No. 20180055603, dated Mar. 21, 2023, 5 pages.
Office Action in Chinese Appln. No. 201980030193.6, dated Jun. 21, 2022, 16 pages (with English translation).

* cited by examiner

CLOTHES TREATMENT APPARATUS AND CONTROL METHOD THEREFOR

CROSS-REFERENCE TO RELATED APPLICATIONS

This application is a continuation of U.S. application Ser. No. 17/053,639, filed on Nov. 6, 2020, which is a National Stage filing under 35 U.S.C. 371 of International Application No. PCT/KR2019/005488, filed on May 8, 2019, which claims the benefit of earlier filing dates and right of priority to Korean Application No. 10-2018-0052733, filed on May 8, 2018, Korean Application No. 10-2018-0052742, filed on May 8, 2018, Korean Application No. 10-2018-0052745, filed on May 8, 2018, Korean Application No. 10-2018-0053337, filed on May 9, 2018, and Korean Application No. 10-2018-0055603, filed on May 15, 2018, the contents of which are all hereby incorporated by reference herein in their entirety.

TECHNICAL FIELD

The present disclosure relates to a clothes treatment apparatus performing a drying function, and a method for controlling the same.

BACKGROUND

A clothes treatment apparatus refers to every device which is configured to manage or treat clothes, such as washing, drying or removing wrinkles on clothes, bedding, and the like, at home or at a place like a dry cleaning shop. Clothes treatment apparatuses may include a washing machine, a dryer, a washing and drying machine, a refresher, an iron, a steamer, and the like.

A washing machine is an apparatus washing clothes or bedding. A dryer is an apparatus that dries moisture from clothes or bedding. A washing and drying machine is an apparatus that has both a washing function and a drying function. A refresher is an apparatus that refreshes clothes or the like, such as removing odors and dust from clothes or performing antistatic treatment. An iron is an apparatus for removing unnecessary wrinkles from clothes or creating wrinkles necessary for clothes. A steamer is an apparatus that sterilizes clothes or delicately removes unnecessary wrinkles from clothes using hot steam without a contact with a hot plate.

Among others, the dryer, as an apparatus performing a drying function, evaporates moisture contained in an object to be treated, such as clothes or bedding put in a drum (or tub), by supplying hot air to the object to be treated. Air which is discharged out of the drum after evaporating the moisture from the object to be treated contains such moisture so as to be in a hot and humid state. Here, dryers are classified into a condensing type and an exhaust type depending on a way of treating such hot and humid air.

The condensing type dryer does not discharge hot and humid air to outside, but condenses moisture contained in the hot and humid air through heat exchange while circulating the air. In contrast, the exhaust type dryer directly discharges hot and humid air to outside. The condensing type dryer and the exhaust type dryer are structurally different from each other in that the condensing type dryer has a structure for treating condensate water and the exhaust type dryer has a structure for exhausting air.

The condensing type dryer may include a heater system that generates Joule's heat to condense moisture through a heat exchange process or a heat pump system using a refrigerant. Regardless of which heat exchange system a dryer is equipped with, heat exchange efficiency affects power consumption or performance of the dryer.

For example, Prior art literature, Korean Laid-open Patent Application No. 10-2013-0127816 (Nov. 25, 2013), discloses a condensing type dryer having a heat pump system. The prior art literature teaches that it is necessary to suppress air leakage in order to improve heat exchange efficiency. The prior art literature also proposes a U-trap as a configuration for suppressing air leakage. The U-trap is configured to prevent air from leaking to a lower portion of an evaporator due to accumulated condensate water.

However, it is not sufficient to improve the heat exchange efficiency only by the configuration. In particular, a suitable structure needs to be provided if a configuration of a heat exchange system or a configuration of a flow path changes.

In recent years, with an increase in demands for large-capacity dryers, dryers having an increased drum capacity are being released. A new structure is considered that increases the capacity of the drum while suppressing an increase in a size of a cabinet, due to limitation on a storage space.

However, if the capacity of the drum increases, an amount of condensate water generated by an operation of a heat pump system increases due to the increased capacity. In a structure of a water tank in the related art, a user had to frequently empty condensate water filled in the water tank.

On the other hand, in a general clothes treatment apparatus having a drying function, after putting an object to be dried into a rotating drum, high-temperature air (or hot air) exhausted from the drum is cooled and condensed through heat exchange with an evaporator, and hot air is generated through heat exchange with a condenser to be supplied into the drum to remove moisture. At this time, since air which has passed through the evaporator is exhausted after being brought into contact with clothes as the object to be dried, the air contains many lint particles coming from a surface of the clothes during a drying process. In order to remove such lint particles before entering the evaporator, a lint removal filter is installed on an exhaust path of hot air. Accordingly, those lint particles are partially suppressed from being exhausted to outside or introduced into the evaporator.

However, in order to increase lint removal performance, a mesh of the lint removal filter must be made fine, which, however, causes flow resistance to be increased and exhaust efficiency to be lowered. Thus, there is a limit to reducing the size of the mesh. As a result, some of those lint particles are introduced into the evaporator through the lint removal filter and stuck on the surface of the evaporator, thereby reducing heat exchange efficiency and increasing flow resistance.

In order to solve this problem, various attempts have been made to remove lint particles accumulated on the surface of the evaporator. As an example, there has been disclosed a clothes treatment apparatus in which condensate water condensed through an evaporator is sprayed (injected) onto the surface of the evaporator to remove lint particles.

However, since an amount of condensate water is not always sufficient, a lint removal is impossible when the amount of condensate water to be used is small. Even when the condensate water is sufficiently supplied, a large-capacity pump is required to allow the condensate water to be evenly sprayed on the surface of the evaporator through a nozzle.

In addition, in order to spray the condensate water on the surface of the evaporator, a pump connected to an injection flow path generates pressure to suck the condensate water to an injection port. In this case, a flow path or valve to which pressure generated by the pump is transferred has a plurality of holes at various points, and thereby not only the condensate water is sucked but also external air is introduced.

When external air flows into the pump or the flow path, water cannot be sucked even if the pump is restarted later, which may cause a problem that water in the clothes treatment apparatus cannot be drained. Therefore, when external air flows into the pump or the flow path, it causes a failure of the clothes treatment apparatus.

In addition, as the capacity of the clothes treatment apparatus increases, the capacity of a fan installed in the clothes treatment apparatus increases, which causes the condensate water to be more affected by an air flow rate. That is, as the air flow rate affecting the condensate water increases, the condensate water is not accurately injected on the surface of the evaporator.

Meanwhile, a condensate water storage unit for storing condensate water is provided inside the clothes treatment apparatus using the condensate water to clean (or wash) a heat pump. In addition, when a water level of the condensate water storage unit reaches a predetermined level, the condensate water is drained from the condensate water storage unit, to prevent overflow of the condensate water.

In general, a control unit of the clothes treatment apparatus determines whether or not the drainage is normally performed by sensing the water level of the condensate water storage unit, and determines whether to terminate the operation of the clothes treatment apparatus according to the determination result.

However, if the water level detection result is not sufficiently reliable, there is a problem that the operation of the clothes treatment apparatus is terminated even when water actually stored in the condensate water storage unit is not excessive. In particular, when the operation of the clothes treatment apparatus is terminated due to an error in detecting the water level even though the drainage is normally performed, there is a problem in that drying of an object to be dried is not suitably performed.

In recent years, consumers are demanding dryers with a larger capacity. Accordingly, studies on dryers having a plurality of motors have been made in order to provide dryers capable of solving those problems while satisfying the consumers' demands.

SUMMARY

One aspect of the present disclosure is to provide a clothes treatment apparatus capable of solving the above problems and other drawbacks, and a method for controlling the same.

Another aspect of the present disclosure is to provide a clothes treatment apparatus having an improved air flow mechanism for circulating air into a drum.

Another aspect of the present disclosure is to provide a clothes treatment apparatus having a structure capable of preventing a decrease in efficiency of a heat exchange system that occurs due to an improvement in an air flow mechanism.

Another aspect of the present disclosure is to provide a clothes treatment apparatus having a trap for preventing suction or introduction of external air, so as to prevent a problem that external air is introduced into an air circulation flow path due to rotation of a circulation fan and lowers efficiency of a heat exchange system.

Another aspect of the present disclosure is to provide a structure of a trap that does not lose an air blocking function in spite of strong suction force of a circulation fan.

Another aspect of the present disclosure is to provide a trap having a structure for preventing a failure of a water level sensor disposed in a water collection part.

Another aspect of the present disclosure is to provide a structure capable of preventing breakage to a trap.

Another aspect of the present disclosure is to provide a water tank structure having an increased capacity for storing condensate water generated in response to an operation of a heat pump system.

Another aspect of the present disclosure is to provide a structure of a clothes treatment apparatus capable of storing more condensate water than the related art clothes treatment apparatus.

Another aspect of the present disclosure is to provide a structure capable of preventing a decrease in efficiency of a heat exchange system that occurs due to an improvement in an air flow mechanism.

Another aspect of the present disclosure is to provide a structure capable of quickly unfreezing condensate water when the condensate water accumulated (or gathered) in a trap portion is frozen.

Another aspect of the present disclosure is to provide a clothes treatment apparatus capable of maintaining stability while operating a drum and a blower fan using separate motors, and a method for controlling the same.

Another aspect of the present disclosure is to provide a clothes treatment apparatus having a cleaning device for cleaning a heat exchanger using a cleaning nozzle, and a method for controlling the same.

Another aspect of the present disclosure is to provide a clothes treatment apparatus capable of controlling a suction flow path so as not to suction external air or substances such as dust, other than objects to be sucked by a cleaning device, and a method for controlling the same.

Another aspect of the present disclosure is to provide a clothes treatment apparatus capable of increasing an effect of cleaning a surface of an evaporator by controlling an operation of a blower fan or a ventilation fan during an operation of a cleaning device, and a method for controlling the same.

Another aspect of the present disclosure is to provide a clothes treatment apparatus capable of accurately detecting a water level of a condensate water storage unit, and a method for controlling the same.

Another aspect of the present disclosure is to provide a clothes treatment apparatus capable of accurately detecting whether or not drainage for a condensate water storage unit has been normally performed, and a method for controlling the same.

Another aspect of the present disclosure is to provide a clothes treatment apparatus capable of maintaining drying performance by preventing an operation of the clothes treatment apparatus from being stopped according to a change in a water level in the condensate water storage unit, and a method for controlling the same.

Implementations of a clothes treatment apparatus and a control method therefor capable of solving at least one of those technical aspects may be provided.

In order to achieve these and other advantages and in accordance with the purpose of this specification, as embodied and broadly described herein, there is provided a clothes treatment apparatus that may include a drum configured to accommodate an object to be dried, an air circulation flow path connected to the drum, a circulation fan disposed at a downstream side of a heat exchanger inside the air circulation flow path and configured to generate a suction force to suction air in the air circulation flow path and supply the air to the drum, and a trap having a water collection part formed below the drum to collect condensate water, and a bottom surface lower than a surround region in the water collection part to gather the condensate water therein.

In one implementation, the air circulation flow path may be connected to a front opening and a rear opening of the drum to define a path through which air discharged from the front opening of the drum is introduced into the rear opening of the drum via a heat exchanger.

In one implementation, the clothes treatment apparatus may include a base, and the base may be disposed below the drum to provide a mounting space of components constructing the air circulation flow path and the heat exchanger.

In one implementation, the circulation fan may be installed at the downstream side of the heat exchanger based on the flow of the air in the air circulation flow path.

In one implementation, the water collection part may have a bottom surface lower than a surrounding region on the base to collect condensate water generated from air circulating in the drum.

In one implementation, the trap may be formed in the water collection part to prevent external air from flowing into the air circulation flow path via the water collection part due to a suction force of the circulation fan.

In one implementation, the clothes treatment apparatus may further include a cover disposed to cover the water collection part. The trap may include an upwardly-protruding rib protruding from the bottom surface of the trap toward the cover and having an upper end spaced apart from the cover, and a downwardly-protruding rib protruding from the cover toward the bottom surface of the trap and having a lower end spaced apart from the bottom surface of the trap.

In one implementation, one of the upwardly-protruding rib and the downwardly-protruding rib may surround another.

In one implementation, the upwardly-protruding rib and the downwardly-protruding rib may have a shape corresponding to a side surface of a cylinder, and may be arranged to form concentric circles of different sizes.

In one implementation, the upwardly-protruding rib may protrude to surround the downwardly-protruding rib. A flow path defined in the trap may be configured such that an area thereof at a second position is larger than an area at a first position. The first position may correspond to a hollow portion of the downwardly-protruding rib. The area of the flow path at the first position may be calculated as a cross-sectional area of the hollow portion. The second position may correspond to a position between the bottom surface of the trap and the lower end of the downwardly-protruding rib. The area at the second position may be calculated as an area of a side surface of a virtual cylinder that a cross-section of the hollow portion is a bottom side and a spacing between the bottom surface of the trap and the downwardly-protruding rib is a height.

In one implementation, at least one of the upwardly-protruding rib and the downwardly-protruding rib may be provided in plurality.

In one implementation, the upwardly-protruding rib and the downwardly-protruding rib may all be provided in plurality, and may alternately be disposed along a direction away from the center of the concentric circle.

In one implementation, the upwardly-protruding rib may include a first upwardly-protruding rib, and a second upwardly-protruding rib having a larger diameter than the first upwardly-protruding rib. The downwardly-protruding rib may include a first downwardly-protruding rib having a smaller diameter than the first upwardly-protruding rib, and a second downwardly-protruding rib having a diameter larger than that of the first upwardly-protruding rib and smaller than that of the second upwardly-protruding rib. The first upwardly-protruding rib may be located to surround the first downwardly-protruding rib, the second downwardly-protruding rib may be located to surround the first upwardly-protruding rib, and the second upwardly-protruding rib may be located to surround the second downwardly-protruding rib.

In one implementation, the clothes treatment apparatus may further include a water pump installed in the water collection part. An opposite portion of the water pump based on the trap, among side surfaces of the water collection part, may be defined by any of the upwardly-protruding rib and the downwardly-protruding rib that is disposed at an outermost side.

In one implementation, the clothes treatment apparatus may further include a stepped portion protruding upward from a boundary between the bottom surface of the water collection part and the trap to form a step with the bottom surface of the water collection part.

In one implementation, the clothes treatment apparatus may further include a stepped portion protruding upward from a boundary between the bottom surface of the water collection part and the trap to form a step with the bottom surface of the water collection part. The stepped portion may be formed by any of the downwardly-protruding ribs that is disposed at an outermost side.

In one implementation, the clothes treatment apparatus may further include a water pump mounted to the water collection part to transfer the condensate water collected in the water collection part. The water pump may include blades rotatably disposed toward the bottom surface of the water collection part, and the stepped portion may be formed such that an upper end thereof is lower than lower ends of the blades.

In one implementation, the cover may be configured to cover the water pump.

In one implementation, the cover may include a trap cover portion formed on an upper side of the trap to face the trap, and a hose connection portion protruding from the downwardly-protruding rib to an upper side of the cover through the trap cover portion. The clothes treatment apparatus may further include a water tank connected to the water pump and configured to accommodate the condensate water transferred by the water pump, a water tank support frame supporting the water tank and configured to accommodate condensate water overflowing from the water tank, and a return hose connected to the water tank support frame and the hose connection portion to return the condensate water overflowing to the water tank support frame to the water collection part.

In one implementation, the return hose may have a tangential tilt greater than zero in an entire section thereof with respect to a ground where the clothes treatment apparatus is installed, so as to prevent the condensate water from accumulating therein.

In one implementation, the base may include a breakage prevention rib formed around the trap. The breakage prevention rib may protrude downward from a lower surface of the base, and a lower end of the breakage prevention rib may be disposed at a position lower than a lower surface of the trap.

In one implementation, the breakage prevention rib may be formed to surround the trap.

To achieve at least one of those aspects of the present disclosure, a clothes treatment apparatus according to another implementation may include a cabinet defining appearance, a drum rotatably provided in an inner space of the cabinet, a heat exchanger provided on a flow path connected to the drum to condensate moisture contained air discharged from the drum, a water collection part configured to collect condensate water condensed by the heat exchanger, and a water tank connected to the water collection part and forming a storage space of the condensate water. The cabinet may have a through hole formed through any one surface thereof. The water tank may extend in one direction to increase the storage space of the condensate water and protrude from an outer side of the cabinet through the through hole.

In one implementation, a ratio of an entire length of the water tank to a length of a protruding portion of the water tank may be 11:1 to 13:1.

In one implementation, the clothes treatment apparatus may include a discharge hose connected to the water tank and defining a flow path for discharging the condensate water, and a water pump connected to the discharge hose and provided in the water collection part to transfer the condensate water collected in the water collection part to the water tank.

In one implementation, the clothes treatment apparatus may include a front cover having a door to open and close the drum, and a rear cover defining a rear surface of the cabinet, and the water tank may protrude from the rear cover.

In one implementation, the clothes treatment apparatus may include a water tank support frame supporting the water tank in the cabinet.

In one implementation, the cabinet may further include an upper cover defining an upper surface of the cabinet. The water tank support frame may have both side surfaces and a lower surface, and may be coupled to an inner surface of the upper cover. The water tank support frame may have a water tank accommodation space that is defined by the both side surfaces, the lower surface and the inner surface of the upper cover.

In one implementation, the water tank support frame may surround the portion of the water tank protruding from the cabinet.

In one implementation, the water tank support frame may include a rib portion protruding from the lower surface and extending in a lengthwise direction of the water tank.

In one implementation, the lower surface of the water tank support frame may be inclined downward from the front to the rear.

In one implementation, the lower surface of the water tank support frame may include a first region downwardly inclined from the front to the rear, and a second region extending from the first region to be stepped from the first region such that the condensate over overflowing from the water tank is gathered.

In one implementation, the water tank support frame may include an outlet hole formed through the lower surface in the second region, and a return hose connected to the outlet hole to return the condensate water overflowing from the water tank into the base where the heat exchanger is disposed.

In one implementation, the drum may be open to the rear, and may include a rear supporter supporting the drum at the rear, an inlet duct mounted to a rear surface of the rear supporter to define a flow path along which heated air is blown to the drum, and a rear cover defining appearance of the cabinet and configured to cover the rear supporter and the inlet duct. The rear cover may include a protruding portion protruding to the rear to define an accommodation space of the inlet duct. A protruding length of the water tank may be shorter than or equal to a protruding length of the protruding portion.

In one implementation, the cabinet may extend from an edge of the through hole to surround the water tank.

To achieve at least one of those aspects of the present disclosure, a clothes treatment apparatus according to still another implementation may include a cabinet defining appearance, a drum provided in an inner space of the cabinet and opened toward the rear, a heat exchanger provided on an air circulation flow path connected to the drum to condense moisture contained in air discharged from the drum, a circulation fan disposed at the rear of the heat exchanger on the air circulation flow path to allow heated air to be introduced into the drum, a collection part formed below the heat exchanger to collect condensate water condensed by the heat exchanger, a water tank provided above the drum and connected to the collection part to store the condensate water, a water tank support frame configured to surround the water tank, and a return hose having one end connected to the water tank support frame and another end connected to the air circulation flow path at the front of the circulation fan and configured to return the condensate water overflowing from the water tank into a mounting portion where the heat exchanger is disposed. The return hose may have a trip portion extending upward at least once such that the condensate water is gathered therein.

In one implementation, the clothes treatment apparatus may include a first hose connected to the water tank, and a water pump provided in the collection part and connected to the first hose to drain the condensate water.

In one implementation, the clothes treatment apparatus may include a control valve provided on an upper surface of the mounting portion of the heat exchanger, and a second hose connected to the control valve and connected to the air circulation flow path to inject the condensate water drained by the water pump to the heat exchanger.

In one implementation, the return hose may be connected to the second hose.

In one implementation, the trap portion may be formed at a position lower than the control valve.

In one implementation, the trap portion may include a first bent part bent in one direction intersecting with a direction downwardly extending from the water tank support frame.

In one implementation, the trap portion may include a second bent part bent in an upwardly-extending direction intersecting with the one direction.

In one implementation, at least part of the trap portion may be inclined upward.

In one implementation, the clothes treatment apparatus may include a compressor for supplying a compressed refrigerant to the heat exchanger, and a discharge pipe connecting a refrigerant outlet port of the compressor and the heat exchanger to define a part of a refrigerant circulation flow path. The trip portion may be disposed adjacent to the discharge pipe to receive heat from the refrigerant discharged from the compressor.

In one implementation, the clothes treatment apparatus may further include a holder for fixing the trap portion to the discharge pipe.

In one implementation, the holder may be made of a material with thermal conductivity, and may surround at least part of each of the trap portion and the discharge pipe. The holder may be formed to be detachable from each of the discharge pipe and the trap portion.

To achieve at least one of those aspects of the present disclosure, a clothes treatment apparatus according to one implementation may include a main body defining an outer appearance, a drum rotatably installed inside the main body and accommodating an object to be dried, a compressor of a heat pump for compressing refrigerant such that moisture-removed air circulates to the drum via a condenser and an evaporator when the moisture is removed from heated air absorbed from the object to be dried, a blower fan for generating a flow of the heated air or the moisture-removed air, a driving unit having a plurality of motors for providing driving force to the drum, the blower fan, and the compressor, a cleaning unit for injecting (or spraying) condensate water generated in the evaporator onto a surface of the evaporator to remove foreign substances that accumulate on the surface of the evaporator while the heated air passes through the evaporator, a valve unit having a plurality of condensate water ports to define a part of paths along which the condensate water flows, and a control unit for controlling an operation of the valve unit based on an operating state of the cleaning unit.

In one implementation, a first port among the plurality of condensate water ports may be connected to outside of the clothes treatment apparatus, and the control unit may control an operation of the cleaning unit to prevent introduction of external air of the clothes treatment apparatus in a state where the first port is open.

In one implementation, the cleaning unit may include a condensate water storage unit, an injection flow path connected to the condensate water storage unit, a pump for supplying condensate water from the condensate water storage unit to one end of the injection flow path, and a cleaning nozzle for injecting the condensate water supplied from the pump onto a surface of a front part of the evaporator.

In one implementation, the control unit may stop the operation of the pump while the first port is open.

In one implementation, the plurality of condensate water ports may include a first port connected to the outside of the clothes treatment apparatus, a second port for injecting condensate water toward a first portion of the evaporator, a third port for injecting condensate water to a second portion of the evaporator, and a fourth port for injecting condensate water to a third portion of the evaporator.

In one implementation, the control unit may control the valve unit so that the fourth port among the plurality of condensate ports is open before the cleaning unit starts a cleaning operation.

In one implementation, the valve unit may further include a valve case, a plurality of condensate water ports protruding from the valve case to set flow paths of the condensate water, a plate member rotatably disposed inside the valve case to block at least some of the plurality of condensate water ports, and a motor configured to rotate the plate member.

In one implementation, the control unit may rotate the plate member so that the state of the valve unit is switched from a state where the fourth port is open to a state where the first port is open when the cleaning operation of the cleaning unit is started.

In one implementation, during the process in which the state of the valve unit is switched from the open state of the fourth port to the open state of the first port, the fourth port may first be open, the third port may be open next, then the second port may be open, and the first port may be open the last.

In one implementation, the control unit may control the rotation of the plate member such that one of the first to fourth ports of the valve unit is maintained in the open state for a preset time interval.

In one implementation, the control unit may operate the pump until before the first port is open while the plate member is rotating.

In one implementation, the control unit may stop the operation of the pump for a preset period when the first port is open.

In one implementation, the control unit may rotate the plate member such that the state of the valve unit is switched from the open state of the first port to the open state of the fourth port when the period elapses after the first port is open.

To achieve at least one of those aspects of the present disclosure, a clothes treatment apparatus according to another implementation may include a main body defining outer appearance, a drum rotatably installed inside the main body and accommodating an object to be dried, a compressor of a heat pump for compressing refrigerant such that moisture-removed air circulates to the drum via a condenser and an evaporator when the moisture is removed from heated air absorbed from the object to be dried, a blower fan for generating a flow of the heated air or the moisture-removed air, a driving unit having a plurality of motors for providing driving force to the drum, the blower fan, and the compressor, a cleaning unit for injecting (or spraying) condensate water generated in the evaporator onto a surface of the evaporator to remove foreign substances that accumulate on the surface of the evaporator while the heated air passes through the evaporator, and a control unit for controlling an operation of the cleaning unit and changing a rotational speed of the blower fan based on the operation of the cleaning unit.

In one implementation, the cleaning unit may include a condensate water storage unit, an injection flow path connected to the condensate water storage unit, a pump for supplying condensate water from the condensate water storage unit to one end of the injection flow path, and a cleaning nozzle for injecting the condensate water supplied from the pump onto a surface of a front part of the evaporator.

In one implementation, the control unit may reduce a rotational speed of the blower fan when the condensate water is injected from the cleaning nozzle by the operation of the pump.

In one implementation, the control unit may control a motor of the blower fan so that the rotational speed of the blower fan is restored to a speed before the pump is operated when the operation of the pump is terminated.

In one implementation, the clothes treatment apparatus may further include a valve unit defining a part of paths along which the condensate water flows. The valve unit may further include a valve case, a plurality of condensate water ports protruding from the valve case to set flow paths of the condensate water, a plate member rotatably disposed inside the valve case to block at least some of the plurality of condensate water ports, and a motor for rotating the plate member.

In one implementation, the control unit may control the blower fan to be operated after the rotation of the plate member is completed.

In one implementation, any one of the plurality of condensate water ports may be connected to the outside of the clothes treatment apparatus.

In one implementation, the control unit may control the motor of the valve unit such that the state of the plate member is switched from a first state in which one condensate water port connected to the outside is open, among the plurality of condensate water ports, into a second state in which another one of the plurality of condensate water ports is open. The control unit may control the blower fan to be operated when the state of the plate member is completely switched.

In one implementation, the control unit may set a start time point of operating the blower fan based on a rotation angle of the plate member.

In one implementation, the control unit may stop the operation of the blower fan before the condensate water is drained to the outside by the operation of the pump.

To achieve at least one of those aspects of the present disclosure, a clothes treatment apparatus according to still another implementation may include a main body defining an outer appearance, a drum rotatably installed inside the main body and accommodating an object to be dried, a compressor of a heat pump for compressing refrigerant such that moisture-removed air circulates to the drum via a condenser and an evaporator when the moisture is removed from heated air absorbed from the object to be dried, a blower fan for generating a flow of the heated air or the moisture-removed air, a driving unit having a plurality of motors for providing driving force to the drum, the blower fan, and the compressor, a condensate water storage unit for storing condensate water generated in the evaporator, a water level sensor for detecting a water level of the condensate water storage unit, and a control unit for determining whether the water level of the condensate water storage unit has reached a full water level based on an output of the water level sensor, and redetect the water level of the condensate water storage unit using the water level sensor in a state where the operation of the compressor 1120 is stopped.

In one implementation, the control unit may stop the operation of the compressor for a preset first period when the output of the water level sensor is not included in a preset range.

In one implementation, the control unit may operate a drain pump for a preset second period after the operation of the compressor is stopped.

In one implementation, the control unit may monitor the water level sensor for a preset third period after the operation of the drain pump is terminated, and control the operation of the compressor based on the monitoring result.

In one implementation, the control unit may maintain the compressor in the stopped state and terminate the operation of the clothes treatment apparatus when it is determined that the condensate water storage unit reaches the full water level in the third period after the operation of the drain pump is terminated.

In one implementation, the control unit may calculate the number of times that the water level of the condensate water storage unit reaches the full water level during the third period, and may maintain the compressor in the stopped state and terminate the operation of the clothes treatment apparatus when the calculated number of times exceeds a preset limit number of times.

In one implementation, the control unit may restart the operation of the compressor when the output of the water level sensor is included in the preset range during the third period.

In one implementation, the control unit may store information related to a rotational frequency at a time when the operation of the compressor is stopped, and set a rotational frequency at a time when the operation of the compressor is restarted by using the stored information.

In one implementation, the clothes treatment apparatus may further include an output unit for outputting information related to an operating state of the clothes treatment apparatus, and the control unit may control the operation of the output unit based on the monitoring result for the third period.

In implementations of a clothes treatment apparatus according to the present disclosure, since a circulation fan suctions dry air at a downstream side of a heat exchanger and supplies it to a drum, hot air that is stronger than that when the circulation fan is disposed at an upstream side of the heat exchanger can be supplied to the drum.

In the implementations of the clothes treatment apparatus according to the present disclosure, a trap can prevent a suction force of the circulation fan from reaching even external air, thereby improving heat exchange efficiency of the heat exchanger.

In the implementations of the clothes treatment apparatus according to the present disclosure, malfunction of the trap due to freezing in winter can be prevented.

In the implementations of the clothes treatment apparatus according to the present disclosure, the trap may have a flow path structure in a zigzag shape repeatedly extending up and down, thereby maintaining an external air blocking effect in spite of the strong suction force of the circulation fan.

In the implementations of the clothes treatment apparatus according to the present disclosure, the trap can not only block the introduction of the external air but also prevent an occurrence of malfunction of a water level sensor or the like disposed in a water collection part due to a suction force of a water pump.

In the implementations of the clothes treatment apparatus according to the present disclosure, a breakage of the trap can be prevented by a breakage prevention rib.

In particular, in the implementations of the clothes treatment apparatus according to the present disclosure, a water tank provided in the clothes treatment apparatus can have a structure with an increased condensate water storage capacity.

In the implementations of the clothes treatment apparatus according to the present disclosure, a user does not need to empty the water tank frequently, thereby enhancing user convenience.

In the implementations of the clothes treatment apparatus according to the present disclosure, the clothes treatment apparatus can be installed even at a place without a drainage facility.

In the implementations of the clothes treatment apparatus according to the present disclosure, a length of the water tank protruding from an outer side of a cabinet can be limited, thereby preventing the outer side of the cabinet from being bent due to a weight of the protruding portion of the water tank.

In the implementations of the clothes treatment apparatus according to the present disclosure, condensate water can flow to a water collection part when the water tank is fully filled with the condensate water, thereby storing more condensate water than the related art clothes treatment apparatus.

In the implementations of the clothes treatment apparatus according to the present disclosure, frozen condensate water can be quickly unfrozen when the condensate water gathered in a trap portion is frozen.

On the other hand, in implementations of a clothes treatment apparatus and a method of controlling the same according to the present disclosure, when a cleaning operation for a heat pump is performed, a pump can be operated according to an operating state of a valve, thereby preventing an introduction of external air into a circulation flow path or pump connected to the valve.

In the implementations of the clothes treatment apparatus and the method of controlling the same according to the present disclosure, drainage and cleaning operations can be performed in consideration of whether a valve unit is connected to an outside of the clothes treatment apparatus, thereby preventing a failure of the clothes treatment apparatus.

In the implementations of the clothes treatment apparatus and the method of controlling the same according to the present disclosure, a rotational speed of a fan can be adjusted when the cleaning operation for the head pump is performed, thereby increasing a cleaning effect for the heat pump.

In the implementations of the clothes treatment apparatus and the method of controlling the same according to the present disclosure, water overflow due to the introduction of the external air into the clothes treatment apparatus can be prevented by adjusting the rotational speed of the fan.

In the implementations of the clothes treatment apparatus and the method of controlling the same according to the present disclosure, an effect of preventing water from being drawn to one side in the clothes treatment apparatus can also be obtained by adjusting the rotational speed of the fan.

In the implementations of the clothes treatment apparatus and the method of controlling the same according to the present disclosure, an amount of water stored in a condensate water storage unit can be detected more accurately, thereby preventing the clothes treatment apparatus from being stopped due to erroneous detection.

In the implementations of the clothes treatment apparatus and the method of controlling the same according to the present disclosure, an effect of preventing an increase in drying time can be obtained by preventing unnecessary stop of an operation.

In the implementations of the clothes treatment apparatus and the method of controlling the same according to the present disclosure, operation reliability can be improved by redetecting the water level of the condensate water storage unit while the compressor is stopped in order to improve reliability of the water level sensor.

DETAILED DESCRIPTION

Hereinafter, description will be given in detail of implementations disclosed herein. Technical terms used in this specification are merely used for explaining specific implementations, and should not be constructed to limit the scope of the technology disclosed herein.

Also, unless particularly defined otherwise, technological terms used herein should be construed as a meaning that is generally understood by those having ordinary skill in the art to which the invention pertains, and should not be construed too broadly or too narrowly.

[Basic Configuration of Clothes Treatment Apparatus]

First, a basic configuration of a clothes treatment apparatus to which implementations of the present disclosure are applied will be described.

Hereinafter, a clothes treatment apparatus according to the present disclosure will be described in detail with reference to the accompanying drawings. For the sake of brief description with reference to the drawings, the same or equivalent components will be provided with the same reference numbers, and description thereof will not be repeated. A singular representation may include a plural representation unless it represents a definitely different meaning from the context.

It will be understood that when an element is referred to as being "connected with" another element, the element can be connected with the another element or intervening elements may also be present. In contrast, when an element is referred to as being "directly connected with" another element, there are no intervening elements present.

Figure 1:
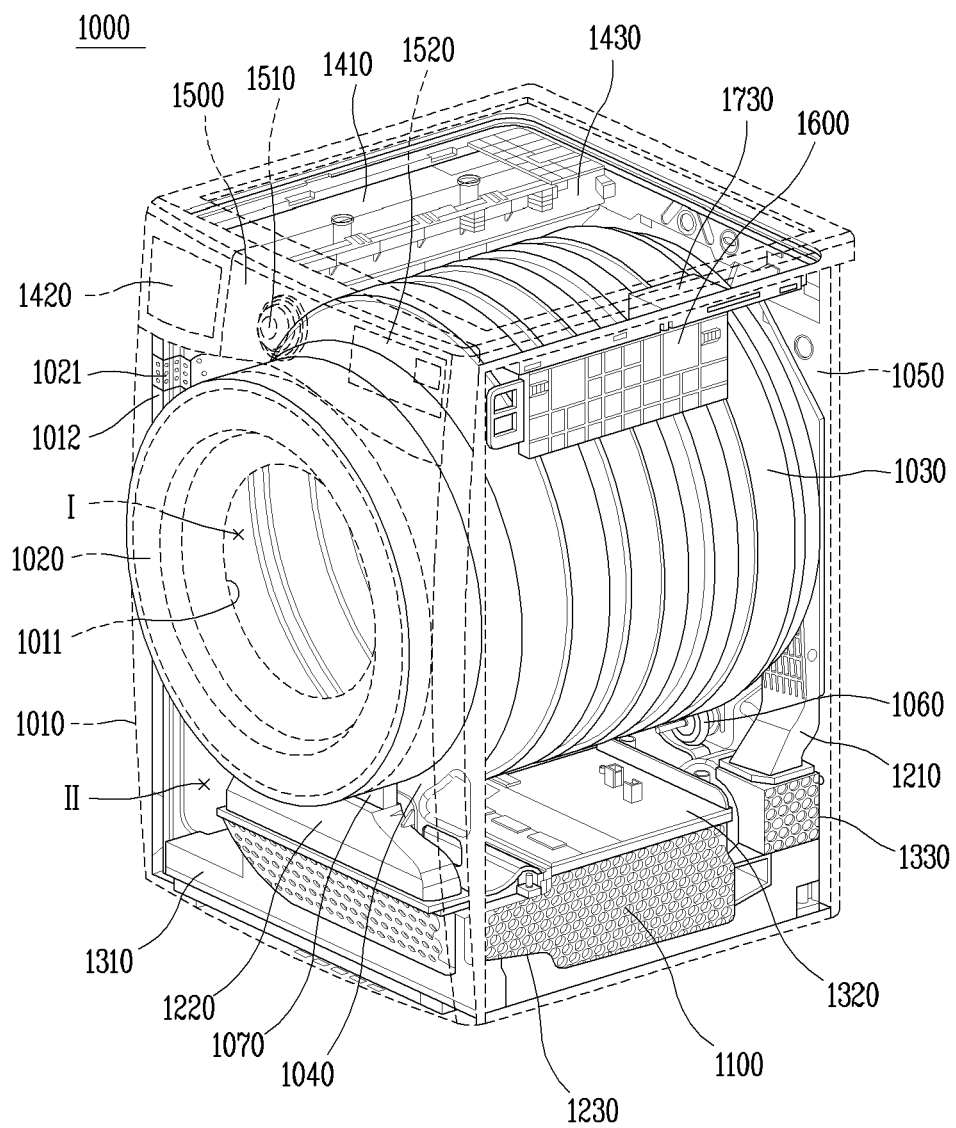
FIG. 1 is a conceptual view illustrating a clothes treatment apparatus in accordance with one implementation of the present disclosure.

FIG. 1 is a conceptual view illustrating a clothes treatment apparatus 1000 in accordance with one implementation of the present disclosure.

A cabinet 1010 may define appearance of the clothes treatment apparatus 1000. The cabinet 1010 may be constituted in combination of a plurality of plates configuring front, rear, left, right, upper and lower parts of the clothes treatment apparatus. Each plate may be named in combination of a position and a cover. For example, a plate defining the front part of the clothes treatment apparatus 1000 may be referred to as a front cover, a plate defining the rear part of the clothes treatment apparatus 1000 may be referred to as a rear cover, and plates defining the side parts of the clothes treatment apparatus 1000 may be referred to as side covers. A front opening 1011 through which an object to be treated is put in a drum 1030 may be formed through the front part of the cabinet 1010.

The door 1020 may be configured to open and close the front opening 1011. The door 1020 may be rotatably connected to the cabinet 1010 by a hinge (not shown). The door 1020 may partially be formed of a transparent material. Therefore, even when the door 1020 is closed, the inside of the drum 1030 may be visually exposed through the transparent material.

The drum 1030 may be rotatably disposed in the cabinet 1010. The drum 1030 may be formed in a cylindrical shape to accommodate an object to be treated. The drum 1030 may be disposed to be laid in a front and rear direction of the clothes treatment apparatus 1000 to receive the object to be treated through the front opening 1011. The drum 1030 may be provided with a concave-convex portion on its outer circumferential surface.

The drum 1030 may be provided with front and rear openings that are open toward front and rear sides of the clothes treatment apparatus 1000. The object to be treated may be introduced into the drum 1030 through the front opening. Hot dry air may be supplied into the drum 1030 through the rear opening.

The drum 1030 may be rotatably supported by a front supporter 1040, a rear supporter 1050, and rollers 1060. The front supporter 1040 may be disposed below the front of the drum 1030, and the rear supporter 1050 may be disposed at the rear of the drum 1030.

The front supporter 1040 and the rear supporter 1050 may be connected to the cabinet 1010 by connection members 1013 or the like. For example, the cabinet 1010 may include pillars 1012 extending in a vertical direction at positions adjacent to both corners of the front supporter 1040. One part of the connection member 1013 may be disposed to face the front supporter 1040, and another part of the connection member 1013 may be bent from the one part several times to surround the pillar 1012. When a screw is coupled through the connection member 1013 and the front supporter 1040, the connection member 1013 and the front supporter 1040 may be connected to each other. Likewise, when a screw is coupled through the connection member 1013 and the pillar 1012, the connection member 1013 and the pillar 1012 may be connected to each other. Besides those screws, various types of connection mechanisms may be applied.

The rollers 1060 may be installed on the front supporter 1040 and the rear supporter 1050, respectively. The rollers 1060 may be disposed right beneath the drum 1030 to be in contact with an outer circumferential surface of the drum 1030. The roller 1060 may be rotatable, and an elastic member such as rubber may be coupled to an outer circumferential surface of the roller 1060. The roller 1060 rotates in a direction opposite to a rotation direction of the drum 1030.

Heat pump cycle devices 1100 for changing temperature and humidity of air to be supplied to the drum 1030 may be installed below the drum 1030. Here, a space below the drum 1030 may indicate a lower portion in a space defined between the outer circumferential surface of the drum 1030 and an inner circumferential surface of the cabinet 1010. The heat pump cycle devices 1100 refer to devices constituting a cycle to sequentially evaporate, compress, condense, and expand a refrigerant. When the heat pump cycle devices 1100 are operated, air may become hot and dry while exchanging heat sequentially with an evaporator 1110 and a condenser 1130.

An inlet duct 1210 and an outlet duct 1220 may define a flow path for circulating the hot dry air generated through the heat pump cycle devices 1100 to the drum 1030. The inlet duct 1210 may be disposed on the rear of the drum 1030, and the hot dry air generated through the heat pump cycle devices 1100 may be supplied into the drum 1030 through the inlet duct 1210. The outlet duct 1220 may be disposed on a front lower side of the drum 1030. Air which has dried the object to be treated may be recovered through the outlet duct 1220.

A filter 1070 may be disposed between the front supporter 1040 and the outlet duct 1220. An upper part of the filter 1070 may be mounted in a filter mounting portion (not shown) provided on the front supporter 1040, and a lower part of the filter 1070 may be inserted into the outlet duct 1220. Dust or lint particles generated while drying the object to be treated using the hot dry air may be filtered by the filter 1070.

A connection duct 1230 and a circulation fan cover 1330 may be disposed between the inlet duct 1210 and the outlet duct 1220.

An inlet of the connection duct 1230 may be connected to the outlet duct 1220. The connection duct 1230 may enclose the evaporator 1110 and the condenser 1130 corresponding to a heat exchanger among the heat pump cycle devices 1100. An outlet of the connection duct 1230 may be connected to the circulation fan cover 1330.

An inlet of the circulation fan cover 1330 may be connected to the outlet of the connection duct 1230. The circulation fan cover 1330 may accommodate a circulation fan therein. An outlet of the circulation fan cover 1330 may be connected to the inlet duct 1210.

A base 1310 may be disposed on a lower side of the drum 1030 and the heat pump cycle devices 1100. The base 1310 refers to a molded body that supports various components of the clothes treatment apparatus 1000 including the heat pump cycle devices 1100 from the lower side.

A base cover 1320 may be disposed between the base 1310 and the drum 1030. The base cover 1320 may cover the heat pump cycle devices 1100 mounted on the base 1310. When sidewalls of the base 1310 and the base cover 1320 are coupled to each other, an air circulation flow path may be defined. Some of the heat pump cycle devices 1100 may be located in the air circulation flow path.

A water tank 1410 may be disposed on an upper left or upper right side of the drum 1030. Here, the upper left or upper right side of the drum 1030 may indicate an upper left or upper right portion in a space defined between the outer circumferential surface of the drum 1030 and the inner circumferential surface of the cabinet 1010. In FIG. 1, the water tank 1410 is shown to be disposed on the upper left side of the drum 1030. Condensate water may be collected in the water tank 1410.

When air which has dried the object to be treated is recovered through the outlet duct 1220, followed by a heat exchange with the evaporator 1110, condensate water may be generated. More specifically, when a temperature of the air is lowered by the heat exchange performed in the evaporator 1110, an amount of saturated water vapor that the air can contain may decrease. Since the air recovered through the outlet duct 1220 contains moisture exceeding the amount of saturated water vapor, condensate water may inevitably be generated.

A water pump 1440 (see FIG. 3) may be installed inside the clothes treatment apparatus 1000. The water pump 1440 may raise the condensate water up to the water tank 1410. This condensate water may be collected in the water tank 1410.

A water tank cover 1420 may be disposed at one corner of the front part of the clothes treatment apparatus 1000 so as to correspond to the position of the water tank 1410. The water tank cover 1420 may be formed to be gripped by hand, and may be disposed on the front surface of the clothes treatment apparatus 1000. When the water tank cover 1420 is pulled out to empty the condensate water collected in the water tank 1410, the water tank 1410 may be drawn out of a water tank support frame 1430 together with the water tank cover 1420.

The water tank support frame 1430 may support the water tank 1410 inside the cabinet 1010. The water tank support frame 1430 may extend in a direction that the water tank 1410 is pushed in or pulled out, so that the water tank 1410 is guided to be pushed in or pulled out.

An input/output panel 1500 may be disposed next to the water tank cover 1420. The input/output panel 1500 may include an input unit 1510 for receiving a selection of a clothes treatment course from a user, and an output unit 1520 for visually displaying an operating state of the clothes treatment apparatus 1000. The input unit 1510 may be configured as a jog dial, but is not limited thereto. The output unit 1520 may be configured to visually display the operating state of the clothes treatment apparatus 1000. The clothes treatment apparatus 1000 may have a separate component for audible display in addition to the visual display.

A control unit 1600 may be configured to control the operation of the clothes treatment apparatus 1000 based on a user's input applied through the input unit 1510. The control unit 1600 may include a printed circuit board and elements mounted on the printed circuit board. When the user selects a clothes treatment course through the input unit 1510 and inputs a control command such as an operation of the clothes treatment apparatus 1000, the control unit 1600 may control the operation of the clothes treatment apparatus 1000 according to a preset algorithm.

The printed circuit board and the elements mounted on the printed circuit board that constitute the control unit 1600 may be disposed at an upper left or upper right side of the drum 1030. In FIG. 1, it is shown that the printed circuit board is disposed at the upper right side of the drum 1030, which is opposite to the water tank 1410 at the upper side of the drum 1030. Considering that the condensate water is collected in the water tank 1410, air containing moisture flows in the heat pump cycle devices 1100 and the ducts 1220 and 1230, and electrical products such as the printed circuit board and the elements are vulnerable to water, the printed circuit board and the elements may be spaced as apart as possible from the water tank 1410 or the heat pump cycle devices 1100.

A heat dissipation fan (cooling fan) 1730 may be mounted to be adjacent to the printed circuit board. For example, the heat dissipation fan 1730 may be installed at a top of the printed circuit board. In addition, the heat dissipation fan 1730 may be installed to face cooling fins (not shown) of the printed circuit board.

The heat dissipation fan 1730 may make wind to cool the printed circuit board or the cooling fins mounted on the printed circuit board. The heat dissipation fan 1730 may generate wind in a direction from top to bottom of the clothes treatment apparatus 1000. The heat dissipation fan 1730 may be configured as an axial fan that generates wind in a direction of a rotation shaft. A circulation flow may be caused by the heat dissipation fan 1730 in an annular space between the cabinet 1010 and the drum 1030.

An inner space of the cabinet 1010 may be divided into a first space I and a second space II based on the drum 1030. The first space I may be a cylindrical space enclosed by the drum 1030, and correspond to a space for accommodating an object to be treated such as clothes or the like. The second space II may be an annular space between the cabinet 1010 and the drum 1030, and correspond to a space in which electric parts and mechanical structures of the clothes treatment apparatus 1000 are disposed. The space between the cabinet 1010 and the drum 1030 refers to the second space II.

When the cylindrical drum 1030 is installed inside the cabinet 1010 having a shape close to a hexahedron as a whole, regions in which electric parts, mechanical structures, etc. can be installed between the cabinet 1010 and the drum 1030 may be four corners outside the drum 1030 when the clothes treatment apparatus 1000 is viewed from the front.

The evaporator 1110 and the condenser 1130 corresponding to the heat exchanger and the connection duct 1230 enclosing the heat exchanger may be disposed to be eccentric to one side below the drum 1030 so as to occupy one of the four corners. A compressor 1120, a drum motor 1800, a blower fan 1820, etc. may be disposed to be eccentric to another side below the drum 1030 so as to occupy another corner of the four corners. The printed circuit board constituting the control unit 1600 may be disposed to be eccentric to one side above the drum 1030 so as to occupy still another corner of the four corners. The water tank 1410 may be disposed to be eccentric to another side above the drum 1030 so as to occupy the last corner of the four corners.

By this arrangement, the blower fan 1820, the connection duct 1230, the printed circuit board constituting the control unit 1600, and the water tank 1410 may not overlap one another in the front and rear direction of the clothes treatment apparatus 1000. In addition, this arrangement may provide a condition for maximizing the size of the drum 1030 in the limited cabinet 1010 by efficiently utilizing the inner space of the clothes treatment apparatus 1000.

In particular, the present disclosure relates to a clothes treatment apparatus 1000 having a drum with a larger size than the related art one. For example, a cross-sectional area of the drum 1030, which may be calculated as an area of a circle, may be in the range of 330,000 to 360,000 mar.

Hereinafter, the drum 1030 and an air circulation flow path will be described.

Figure 2:
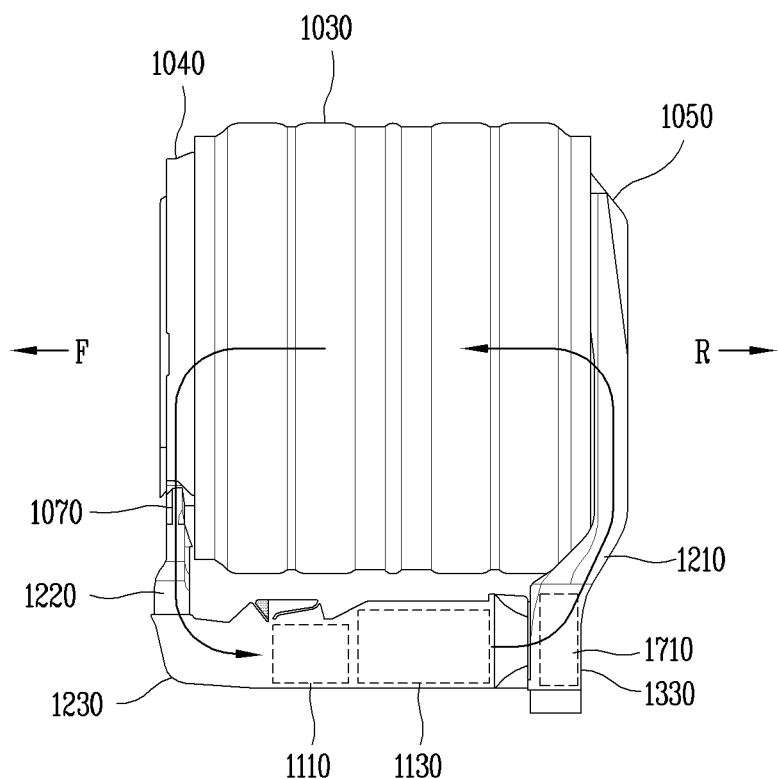
FIG. 2 is a lateral view illustrating a drum and an air circulation flow path.

FIG. 2 is a lateral view illustrating the drum 1030 and an air circulation flow path. In FIG. 2, the left side corresponds to the front F of the drum 1030, and the right side corresponds to the rear R of the drum 1030.

In order to dry clothes, etc. (object to be treated) put in the drum 1030, a process of supplying hot dry air into the drum 1030, and removing moisture from the air by recovering the air that has dried the clothes should be repeatedly performed. In order to repeat this process in a condensing type dryer, air must continuously circulate along the drum 1030. The air circulation may be carried out through the drum 1030 and an air circulation flow path.

The air circulation flow path may be connected to the front opening and the rear opening of the drum 1030. The air circulation flow path may define a path along which air discharged through the front opening of the drum 1030 is introduced into the rear opening of the drum 1030 via the heat exchanger.

The air circulation flow path may be defined by the inlet duct 1210, the outlet duct 1220, the connection duct 1230 disposed between the inlet duct 1210 and the outlet duct 1220, and the circulation fan cover 1330. Each of the inlet duct 1210, the outlet duct 1220, the connection duct 1230, and the circulation fan cover 1330 may be constituted by combining a plurality of members.

Based on an air flow, the inlet duct 1210, the drum 1030, the outlet duct 1220, the connection duct 1230, and the circulation fan cover 1330 may be sequentially connected to one another, and the circulation fan cover 1330 may then connected to the inlet duct 1210 again, thereby defining a closed flow path.

The inlet duct 1210 may extend from the connection duct 1230 to a rear surface of the rear supporter 1050. The rear surface of the rear supporter 1050 refers to a surface facing the rear of the clothes treatment apparatus 1000. Since the drum 1030 and the connection duct 1230 are disposed to be spaced apart from each other in the vertical direction, the inlet duct 1210 may have a structure of extending to the rear of the drum 1030 from the connection duct 1230 disposed below the drum 1030 in the vertical direction.

The inlet duct 1210 may be coupled to the rear surface of the rear supporter 1050. A hole may be formed through the rear surface of the rear supporter 1050. Accordingly, hot dry air may be supplied from the inlet duct 1210 into the drum 1030 through the hole formed through the rear supporter 1050.

The outlet duct 1220 may be disposed on a lower portion of the front supporter 1040. Since the drum 1030 has the front opening for putting an object to be treated, the outlet duct 1220 may be disposed below the front of the drum 1030.

The outlet duct 1220 may extend from the front supporter 1040 to the connection duct 1230. The outlet duct 1220 may also extend in the vertical direction, similar to the inlet duct 1210, but an extending length of the outlet duct 1220 in the vertical direction may be shorter than that of the inlet duct 1210. Air which has dried an object to be treated in the drum 1030 may be recovered into the connection duct 1230 through the outlet duct 1220.

The evaporator 1110 and the condenser 1130 corresponding to the heat exchanger among the heat pump cycle devices 1100 may be disposed inside the connection duct 1230. In addition, a circulation fan 1710 for supplying hot dry air to the inlet duct 1210 may also be disposed in the connection duct 1230. Based on an air flow, the evaporator 1110 may be disposed at an upstream side of the condenser 1130 and the circulation fan 1710 may be disposed at a downstream side of the condenser 1130.

The circulation fan 1710 may generate a suction force to suck air in the air circulation flow path and supply it into the drum. The circulation fan 1710 may make wind in a direction that air is sucked from the condenser 1130 and supplied to the inlet duct 1210. The circulation fan 1710 may be provided inside the circulation fan cover 1330. An inlet of the circulation fan cover 1330 may be connected to the connection duct 1230, and an outlet thereof may be connected to the inlet of the inlet duct 1210.

Hereinafter, components disposed below the drum 1030 will be described.

Figure 3:
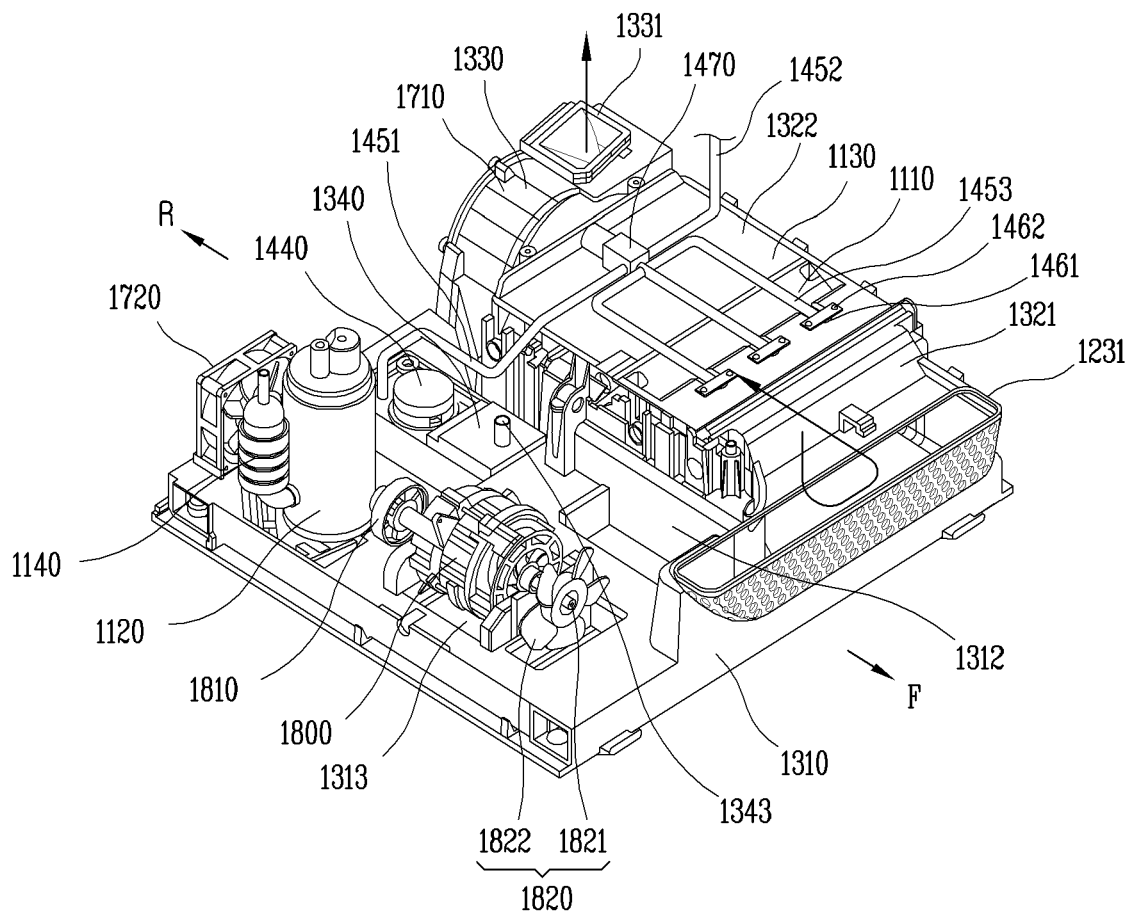
FIG. 3 is a perspective view illustrating a base and components disposed on the base.
Figure 4:
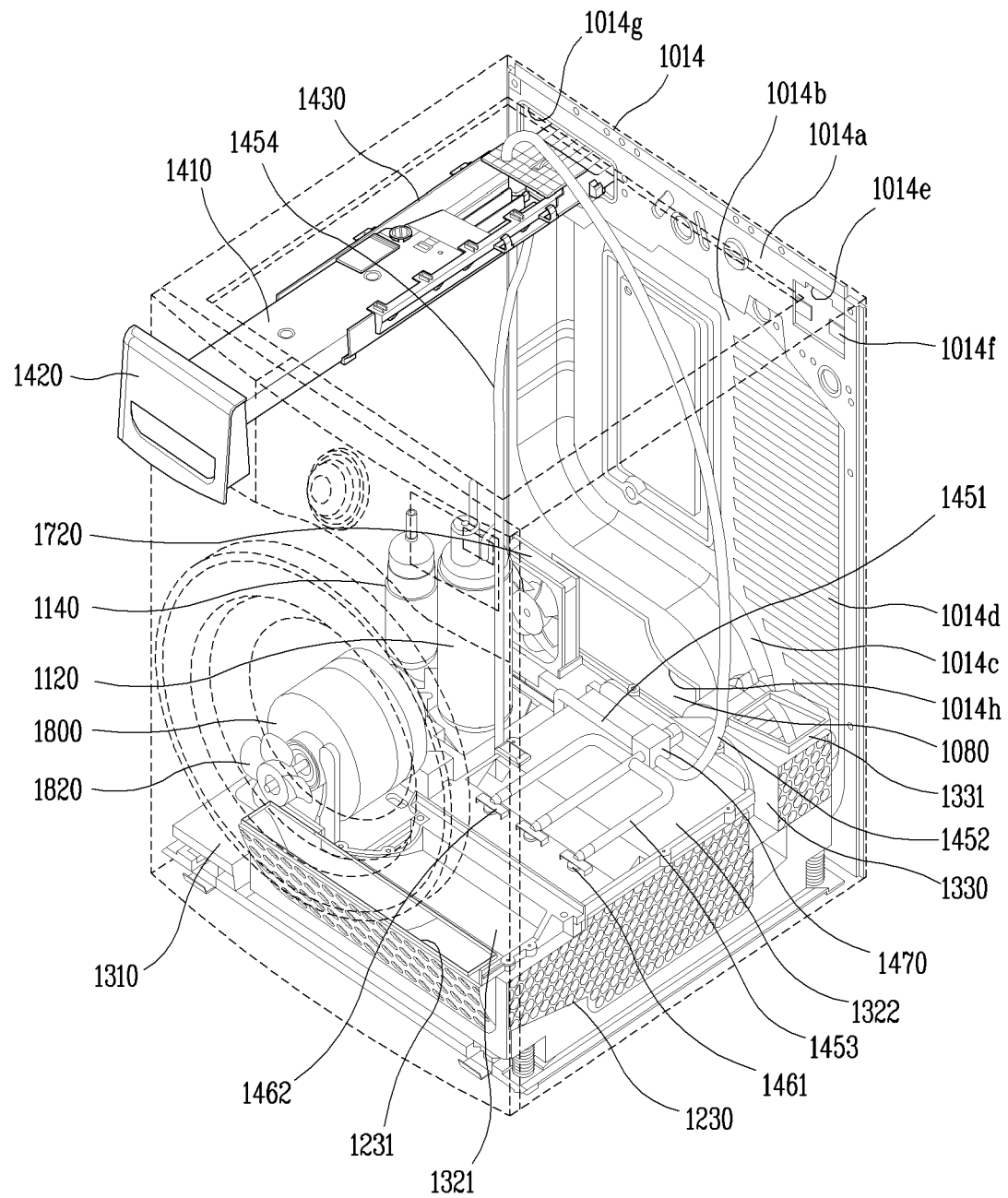
FIG. 4 is a perspective view illustrating an internal configuration of the clothes treatment apparatus.

FIG. 3 is a perspective view illustrating the base 1310 and components mounted on the base 1310. In FIG. 3, F denotes the front of the clothes treatment apparatus 1000, and R denotes the rear of the clothes treatment apparatus 1000. FIG. 4 is a perspective view illustrating the internal configuration of the clothes treatment apparatus 1000.

The base 1310 may be configured to support the mechanical elements of the clothes treatment apparatus 1000, including the heat pump cycle devices 1100. For mounting those mechanical elements, the base 1310 may include a plurality of mounting portions 1313. The mounting portions 1313 indicate regions provided for mounting the mechanical elements. The mounting portions 1313 may be partitioned from one another by stepped jaws of the base 1310. Hereinafter, those components or elements will be described in a counterclockwise direction based on the connection duct 1230.

While the drum 1030 is disposed in the center of the clothes treatment apparatus 1000 in a left and right direction, the air circulation flow path may be disposed eccentrically to the left or right of the drum 1030. FIG. 3 illustrates that the air circulation flow path is disposed at a lower right side of the drum 1030. The eccentric arrangement of the air circulation flow path may be for efficient drying of an object to be treated and for efficient arrangement of components.

An inlet portion 1231 of the connection duct 1230 may be disposed at the lower side of the outlet duct 1220 to be connected to the outlet duct 1220. The inlet portion 1231 of the connection duct 1230 may guide air in a direction inclined toward a lower left side or lower right side, together with the outlet duct 1220. For example, in FIG. 3, the inlet portion 1231 of the connection duct 1230 may become narrower downward. In particular, a left surface of the inlet portion 1231 may extend in a direction inclined downward to the right. If the air circulation flow path is disposed at the lower left side of the drum 1030, a right surface of the inlet portion 1231 may be formed to be inclined downward to the left.

The evaporator 1110, the condenser 1130, and the circulation fan 1710 may sequentially be disposed at a downstream side of the inlet portion 1231 based on an air flow. When the clothes treatment apparatus 1000 is viewed from the front, the condenser 1130 may be disposed behind the evaporator 1110 and the circulation fan 1710 may be disposed behind the condenser 1130. The evaporator 1110, the condenser 1130, and the circulation fan 1710 may be mounted on respective mounting portions 1313 provided on the base 1310.

A base cover 1320 may be disposed above the evaporator 1110 and the condenser 1130. The base cover 1320 may be configured by a single member or a plurality of members. When the base cover 1320 is configured by a plurality of members, the base cover 1320 may include a front base cover 1321 and a rear base cover 1322.

The base cover 1320 may be configured to cover the evaporator 1110 and the condenser 1130. The base cover 1320 may be coupled to stepped jaws or sidewalls of the base 1310 formed on the left and right sides of the evaporator 1110 and the condenser 1130 to define a part of the connection duct 1230.

The circulation fan 1710 may be surrounded by the base 1310 and the circulation fan cover 1330. An outlet portion 1331 of the circulation fan cover 1330 may be disposed on an upper side of the circulation fan 1710. The outlet portion 1313 may be connected to the inlet duct 1210. Hot dry air generated by the heat pump cycle devices 1100 may be supplied into the drum 1030 through the inlet duct 1210.

The circulation fan 1710 may be disposed at the rearmost inside the cabinet 1010. In the air circulation flow path, the circulation fan 1710 may be disposed at the downstream side of the condenser 1130 based on an air flow.

The circulation fan 1710 may be configured as a centrifugal fan. The centrifugal fan may be configured to suck air in an axial direction and blow it in a radial direction. When the rotation shaft of the circulation fan 1710 is disposed to extend toward the condenser 1130, the condenser 1130 may be disposed in a direction in which the rotation shaft of the circulation fan 1710 extends.

The circulation fan 1710 may suck hot dry air from the condenser 1130. In addition, the hot dry air sucked by the circulation fan 1710 may be blown through an outlet portion 1331 of the circulation fan cover 1330 disposed above the circulation fan 1710. The centrifugal fan may create a strong air volume and fast wind speed based on a strong suction force, compared to an axial flow fan.

A water pump 1440 may be installed at one side of the condenser 1130 (or one side of the circulation fan 1710). The water pump 1440 may be configured to transfer condensate water collected in a water collection part 1315 in which the water pump 1440 is located.

The base 1310 may be configured such that the condensate water generated during the operation of the heat pump cycle devices 1100 are drained into the water collection part where the water pump 1440 is located. For example, condensate water may be generated on a bottom surface of a heat exchanger mounting portion 1311 in which the evaporator 1110 and the condenser 1130 are disposed. The bottom surface of the mounting portion 1313 may be inclined or a sidewall 1312 around the water collection part 1315 may partially be lower in height than the other portion such that the condensate water can flow to the water collection part 1315.

A cover 1340 may be configured to cover the water collection part 1315. The cover 1340 may define an upper wall of the water collection part 1315. The cover 1340 may be configured to cover the water pump 1440. A hose connection portion 1343 may be formed on the cover 1340.

The condensate water collected in the water collection part by the structure of the base 1310 may be transferred into the water tank 1410 by the water pump 1440. In addition, the condensate water may be transferred by the water pump 1440 to be used to clean (wash) the evaporator 1110 or the condenser 1130.

The water pump 1440 may be connected to a control valve 1470 by a hose 1451. When the water pump 1440 is operated, the condensate water collected in the water collection part 1315 may be transferred to a control valve 1470. The control valve 1470 may be configured to distribute the condensate water transferred by the water pump 1440 into to several hoses 1451, 1452 and 1453.

The hoses 1451, 1452, and 1453 connected to the control valve 1470 may be made of a flexible material. Each of the hoses 1451, 1452, 1453 may be referred to as a condensate water supply hose in the sense of supplying the condensate water. For convenience of explanation, an ordinal number is given to each of the hoses 1451, 1452, and 1453.

The first hose 1452 may be connected to the control valve 1470 and the water tank 1410. The first hose 1452 may not be directly connected to the water tank 1410, but may be connected to the water tank 1410 through an upper portion of the water tank support frame 1430. A hole facing a hole that is formed through the water tank 1410 may be formed through the upper portion of the water tank support frame 1430. When the water tank 1410 is inserted into the water tank support frame 1430, the two holes may be aligned to face each other. A sealing member may be coupled to a space between the two holes or around the two holes.

When the condensate water transferred by the water pump 1440 flows into the first hose 1452 by the operation of the control valve 1470, the condensate water may flow into the water tank 1410 along the first hose 1452. The condensate water may be temporarily stored in the water tank 1410 until before the user empties the water tank 1410.

The second hose 1453 may be connected to the control valve 1470 and a condensate water injection portion 1461. The condensate water injection portion 1461 may be configured to inject (or spray) the condensate water on the surface of the evaporator 1110 or the condenser 1130. Dust or foreign substances may be stuck on the surface of the evaporator 1110 and the condenser 1130 with accumulation of an operating time of the clothes treatment apparatus 1000. Since dust or foreign substances cause heat exchange efficiency of the evaporator 1110 and the condenser 1130 to be lowered, it is necessary to remote them quickly.

When the condensate water is supplied to the condensate water injection portion 1461 through the second hose 1453, the condensate water injection portion 1461 may inject the supplied condensate water to the evaporator 1110 or the condenser 1130. To this end, an injection port of the condensate water injection portion 1461 may be disposed to face the evaporator 1110 or the condenser 1130. When the condensate water is sprayed to the evaporator 1110 or the condenser 1130 through the injection port, the dust or foreign substances may be removed from the evaporator 1110 or the condenser 1130.

The second hose 1453 and the condensate water injection portion 1461 may be provided in plurality to inject (or spray) the condensate water over a wide region. Fixing pins 1462 may be provided to fix the condensate water injection portion 1461 to the base cover 1321 or 1322.

The clothes treatment apparatus 1000 may include a return hose 1454. The return hose 1454 may be connected to the water tank support frame 1430 and the hose connection portion 1343 of the cover 1340.

The condensate water transferred to the water tank 1410 by the water pump 1440 may be temporarily stored in the water tank 1410. However, when an amount of condensate water is larger than the capacity of the water tank 1410, the condensate water which has been introduced in the water tank 1410 may overflow to the water tank support frame 1430. The water tank support frame 1430 may be configured to receive the condensate water that overflows from the water tank 1410. In particular, in order to prevent the overflowing condensate water from being introduced into the clothes treatment apparatus 1000, the bottom of the water tank support frame 1430 except for a portion connected to the return hose 1454 may have a blocked structure.

A hole may be formed through a portion of the water tank support frame 1430 which is connected to the return hose 1454. The condensate water may be introduced into the return hose 1454 through the hole to be collected back into the water collection part 1315 along the return hose 154. The bottom of the water tank support frame 1430 may have an inclined structure to gather the condensate water to the hole.

Meanwhile, a compressor 1120 and a compressor cooling fan 1720 for cooling the compressor 1120 may be disposed at one side of the water pump 1440. The compressor 1120 may be an element constituting the heat pump cycle devices 1100, but does not directly exchange heat with air. Thus, the compressor 1120 does not need to be installed in the air circulation flow path. On the contrary, if the compressor 1120 is installed in the air circulation flow path, it may interfere with the flow of air. Therefore, the compressor 1120, as illustrated in FIG. 3, may preferably be installed outside the air circulation flow path.

The compressor cooling fan 1720 may generate wind toward the compressor 1120 or in a direction of sucking air from the compressor 1120. When temperature of the compressor 1120 is lowered by the compressor cooling fan 1720, compression efficiency may be improved.

A gas-liquid separator 1140 may be disposed at an upstream side of the compressor 1120 based on the flow of a refrigerant. The gas-liquid separator 1140 may separate an abnormal refrigerant introduced into the compressor 1120 into a gas phase and a liquid phase so that only the gas phase is introduced into the compressor 1120. The liquid phase may cause a failure of the compressor and deterioration of compression efficiency.

The refrigerant may be evaporated (liquid phase→gaseous phase) while absorbing heat in the evaporator 1110 so as to be sucked into the compressor 1120 in the gaseous phase of low temperature and low pressure. When the gas-liquid separator 1140 is installed at the upstream side of the compressor 1120, the refrigerant may pass through the gas-liquid separator 1140 before flowing into the compressor 1120. The refrigerant in the gaseous phase may be compressed into a high-temperature and high-pressure state in the compressor 1120, and flow to the condenser 1130. The refrigerant may be liquefied while dissipating heat in the condenser 1130. The liquefied high-pressure refrigerant may be depressurized in an expansion apparatus (not shown). The refrigerant in the liquid phase of the low temperature and low pressure may flow into the evaporator 1110.

Hot dry air may be supplied into the drum 1030 through the inlet duct 1210 to dry an object to be treated. The hot dry air may become hot and humid while evaporating moisture of the object to be treated. The hot humid air may be recovered through the outlet duct 1220 and then receive heat from the refrigerant through the evaporator 1110, thereby being cold air. As the temperature of the air is lowered, an amount of saturated water vapor in the air may decrease, and the vapor contained in the air may be condensed. Subsequently, the cold dry air may become hot dry air by receiving heat from the refrigerant through the evaporator 1110, so as to be supplied back into the drum 1030.

A drum motor 1800 may be disposed at the front of the compressor 1120. The drum motor 1800 may have an output shaft protruding in both directions. In this specification, a portion of the output shaft protruding to one side of the drum motor 1800 may be referred to as a first output shaft, and another portion of the output shaft protruding to another side of the drum motor 1800 may be referred to as a second output shaft. However, since the first output shaft and the second output shaft define a single rotation shaft, they rotate in the same direction and at the same speed.

The first and second output shafts may be exposed in opposite directions. It can be seen that the first output shaft is disposed to face the rear of the clothes treatment apparatus 1000, and the second output shaft is disposed to face the front of the clothes treatment apparatus 1000.

A pulley 1810 may be installed to be rotated by the first output shaft. When the first output shaft is rotated by the operation of the drum motor 1800, the pulley 1810 may also be rotated together with the first output shaft in an opposite direction to the rotation direction of the first output shaft. For example, the pulley 1810 may be rotated in engagement with the first output shaft.

A drum belt (not shown) may be coupled to the pulley 1810, so that a driving force of the drum motor 1800 is transmitted to the drum 1030 through the drum belt. The drum 1030 may be rotated by the driving force of the drum motor 1800 transmitted through the pulley 1810 and the drum belt. A rotational speed of the drum 1030 may be controlled by the pulley 1810. Since the drum belt is not directly connected to the first output shaft, the rotational speed of the drum 1030 is not necessarily equal to the rotational speed of the first output shaft.

A blower fan 1820 may be installed on the second output shaft. The blower fan 1820 may be configured as an axial flow fan that generates wind in a direction from the rear to the front of the clothes treatment apparatus 1000.

The blower fan 1820 may generate wind in a direction in which air is sucked from the drum motor 1800. The direction in which the air is sucked from the drum motor 1800 may indicate a direction from the first output shaft toward the second output shaft. The drum motor 1800 may be cooled by the blower fan 1820. Since the blower fan 1820 is directly connected to the second output shaft, the rotational speed of the blower fan 1820 may be equal to the rotational speed of the second output shaft.

The blower fan 1820 may include a hub 1821 and a plurality of vanes 1822. The hub 1821 may be directly connected to the second output shaft of the drum motor 1800. The plurality of vanes 1822 may protrude from an outer circumferential surface of the hub 1821. The plurality of vanes 1822 may have the same shape, and may be disposed to be inclined with respect to the second output shaft in order to generate wind in a direction in which air is sucked.

The plurality of vanes 1822 may be provided in odd number. The number of vanes 1822 may affect vibration generated by the blower fan 1820. If the vanes 1822 are even-numbered, a resonance phenomenon may occur and vibration may increase. On the other hand, if the vanes 1822 are odd-numbered, the vibration may be more reduced than the case where the vanes 1822 are even-numbered. It can be seen from FIG. 3 that the number of vanes 1822 is five.

Although the drum 1030 is incompletely sealed, dew condensation occurred due to such incomplete sealing of the drum 1030 may be suppressed when the blower fan 1820 is rotated. For example, it is difficult to completely discharge hot humid air into the space between the outer circumferential surface of the drum 1030 and the inner circumferential surface of the cabinet 1010. In particular, when air leaked from the drum 1030 stagnates, dew condensation is caused.

However, the blower fan 1820 may produce convection, so as to suppress stagnation of the air leaked from the drum 1030 and an occurrence of dew condensation due to the air stagnation. The air leaked from the drum 1030 may be exhausted while continuously flowing by the blower fan 1820.

When the two output shafts are provided in the single drum motor 1800, there may be many advantages in terms of improving power consumption of the clothes treatment apparatus 1000. Basically, compared to a case in which a drum motor for rotating the drum 1030 and a drum motor for rotating the blower fan 1820 are respectively provided, power consumption may be reduced by half.

In particular, the time when the blower fan 1820 needs to be rotated is the same as the time when the drum 1030 is rotated. This is because hot dry air is supplied to the drum 1030 and hot humid air leaks from the drum 1030 while the drum 1030 is rotating. Therefore, a situation in which power is consumed due to unnecessary rotation of the blower fan 1820 in a state in which the rotation of the drum 1030 is not needed may not occur.

The drum motor 1800 and the blower fan 1820 may be installed in the second space II. In the second space, the drum motor 1800 and the blower fan 1820 may be disposed outside a duct. The outside of the duct refers to a space between the cabinet 1010 and the connection duct 1320. The space between the cabinet 1010 and the drum 1030 may be divided into the inside and the outside of the connection duct 1320. Air that is supplied into the drum 1030 or discharged from the drum 1030 may flow along the inside of the connection duct 1320.

The blower fan 1820 should be distinguished from a structure that cools the drum motor 1800 by sucking external air through the front part of the cabinet 1010, in consideration of an air-flowing direction of the blower fan 1820. First, in the case of cooling the drum motor 1800 by sucking up external air, a hole must be formed through the front part of the cabinet 1010, and wind must be produced in a direction in which the external air is sucked up through the hole.

However, the blower fan 1820 disclosed herein is for suppressing dew condensation occurring in the space between the cabinet 1010 and the drum 1030 rather than cooling the drum motor 1800. Therefore, the front of the blower fan 1820 must be blocked by the front part of the cabinet 1010 which is disposed to be spaced apart from the blower fan 1820. If a hole is formed through the front part of the cabinet 1010, wind produced by the blower fan 1820 may be blown out of the cabinet 1010 through the hole. As a result, the effect of preventing the dew condensation through convection may be reduced.

The rear cover 1014 may be disposed at the rearmost side of the clothes treatment apparatus 1000 and define rear appearance of the clothes treatment apparatus 1000. In this sense, the rear cover 1014 may correspond to a rear wall of the clothes treatment apparatus 1000 or a rear wall of the cabinet 1010. Meanwhile, the front part of the cabinet 1010 located opposite to the rear cover 1014 may be referred to as a front cover.

The rear cover 1014 may include a rear cover base portion 1014*a*, a rear protrusion portion 1014*b*, a connection portion 1014*c*, vent holes 1014*d*, an exhaust port 1014*e*, brackets 1014*f*, a water tank insertion port 1014*g*, and a protective cover coupling portion 1014*h*. Hereinafter, these configurations will be described in order.

The rear cover base portion 1014*a* may have a flat plate shape.

The rear protrusion portion 1014*b* may protrude from the rear cover base portion 1014*a* toward the rear of the clothes treatment apparatus 1000. The rear protrusion portion 1014*b* may be located at a position facing the inlet duct 1210 to secure an installation region of the inlet duct 1210.

The connection portion 1014*c* may extend from an edge of the rear protrusion portion 1014*b* toward the rear cover base portion 1014*a*, to connect the edge of the rear protrusion portion 1014*b* to the rear cover base portion 1014*a*.

The plurality of vent holes 1014*d* may be formed through one region of the rear protrusion portion 1014*b*. The plurality of vent holes 1014*d* may be formed at a position facing the inlet duct 1210. The plurality of vent holes 1014*d* may be open in an inclined direction. The plurality of vent holes 1014*d* may induce air to be passively introduced into the space between the cabinet 1010 and the drum 1030 so that hot humid air is discharged to the outside of the clothes treatment apparatus 1000.

The exhaust port 1014*e* and the water tank insertion port 1014*g* may be formed on an upper part of the rear cover base portion 1014*a*. The exhaust port 1014*e* and the water tank insertion port 1014*g* may be located at opposite sides to each other. For example, referring to the drawing, the exhaust port 1014*e* may be located at a right side, and the water tank insertion port 1014*g* may be located at a left side. The positions of the exhaust port 1014*e* and the water tank insertion port 1014*g* may be switched with each other. In this case, the positions of the water tank 1410 and the printed circuit board constituting the control unit 1600 must be switched with each other as well.

If the vent holes 1014*d* are provided for inducing the passive flow of air, the exhaust port 1014*e* may be associated with an exhaust fan (not illustrated) for active discharge of air. The brackets 1014*f* may be disposed on a circumference of the exhaust port 1014*e* for the active discharge of air, and the exhaust fan may be installed on the brackets 1014*f*.

The bracket 1014*f* may have a shape protruding from the circumference of the exhaust port 1014*e* toward the exhaust port 1014*e*. The brackets 1014*f* may be provided on right and left sides of the exhaust ports 1014*e*, respectively.

The exhaust fan may be mounted to the brackets 1014*f* to face the exhaust port 1014*e*. Accordingly, the position of the exhaust fan may depend on the position of the exhaust port 1014*e*, and may be disposed at a left upper side or right upper side of the drum 1030. The rear cover base portion 1014*a* may correspond to an inner rear wall of the cabinet 1010, and the exhaust fan may be understood to be mounted on the inner rear wall of the cabinet 1010.

The exhaust fan may produce wind to discharge air existing in the space between the cabinet 1010 and the drum 1030 to the outside of the clothes treatment apparatus 1000. The space between the cabinet 1010 and the drum 1030 corresponds to the second space II between the inner circumferential surface of the cabinet 1010 and the outer circumferential surface of the drum 1030. The exhaust fan may be configured as an axial fan that generates wind in a direction of a rotation shaft. The exhaust fan may produce wind in a direction of blowing air toward the exhaust port 1014e (i.e., a direction in which air existing in the space between the cabinet 1010 and the drum 1030 is sucked up and discharged to the exhaust port 1014e).

The water tank insertion port 1014g may be formed to pass through end portions of the water tank 1410 and the water tank support frame 1430. Here, the end portion of the water tank 1410 refers to an opposite part of the water tank cover 1420. The water tank 1410 that can be accommodated in the water tank support frame 1430 may have a limited size. The length of the water tank 1410 may extend as long as the end portion of the water tank 1410 can pass through the water tank insertion port 1014g formed through the rear cover 1014. Here, the length of the water tank 1410 refers to the length of the clothes treatment apparatus 1000 in a front and rear direction.

The protective cover coupling portion 1014h may be provided at a lower part of the rear base portion 1014a. A protective cover 1080 may be coupled around the protective cover coupling portion 1014h. When maintenance of the compressor 1120 or the drum motor 1800 is required, an operator can access the compressor 1120 or the drum motor 1800 simply by opening the protective cover 1080 without disassembling the clothes treatment apparatus 1000.

It has been described that the inner space of the cabinet 1010 is divided into the first space I and the second space II by the drum 1030. The heat pump cycle devices 1100 described above may be installed in the second space II. The connection duct 1230 may be disposed in the second space II, and the evaporator 1110 and the condenser 1130 corresponding to the heat exchanger among the heat pump cycle devices 1100 may be disposed inside the connection duct 1230. Accordingly, the connection duct 1230 may be formed to enclose the heat exchanger, and connected to the drum 1030 to define the air circulation flow path between the heat exchanger and the drum 1030.

The exhaust fan may be disposed in the second space II. Specifically, the exhaust fan may be located outside the duct even in the second space II. Here, the outside of the duct refers to the outside of the connection duct 1230. In addition to the exhaust fan, the drum motor 1800 and the blower fan 1820 may also be disposed outside the connection duct 1230 in the second space II, as described above. The installation of the blower fan 1820 and the exhaust fan outside the connection duct 1230 may be for suppressing an occurrence of condensation by circulating and exhausting humid air leaked from the connection duct 1230 or the drum 1030 into the second space II.

The air volume and size of the exhaust fan may be closely related to the size of the drum 1030. In particular, it should be considered that one of the important functions of the clothes treatment apparatus 1000 is to dry an object to be treated, such as clothes or the like, by using hot air. This is because if an exhaust effect by the exhaust fan is too great, an internal temperature of the cabinet 1010 may be lowered and thereby a drying effect of the clothes treatment apparatus 1000 may be deteriorated. Therefore, the air volume and size of the exhaust fan 1740 should be set in a range capable of suppressing the occurrence of condensation without excessively deteriorating the drying effect of the clothes treatment apparatus 1000.

[Clothes Treatment Apparatus]

Hereinafter, implementations of a clothes treatment apparatus according to the present disclosure will be described.

First of all, one implementation of a clothes treatment apparatus will be described with reference to FIGS. 5 to 8.

Hereinafter, a base and a water collection part formed at the base will be described.

Figure 5:
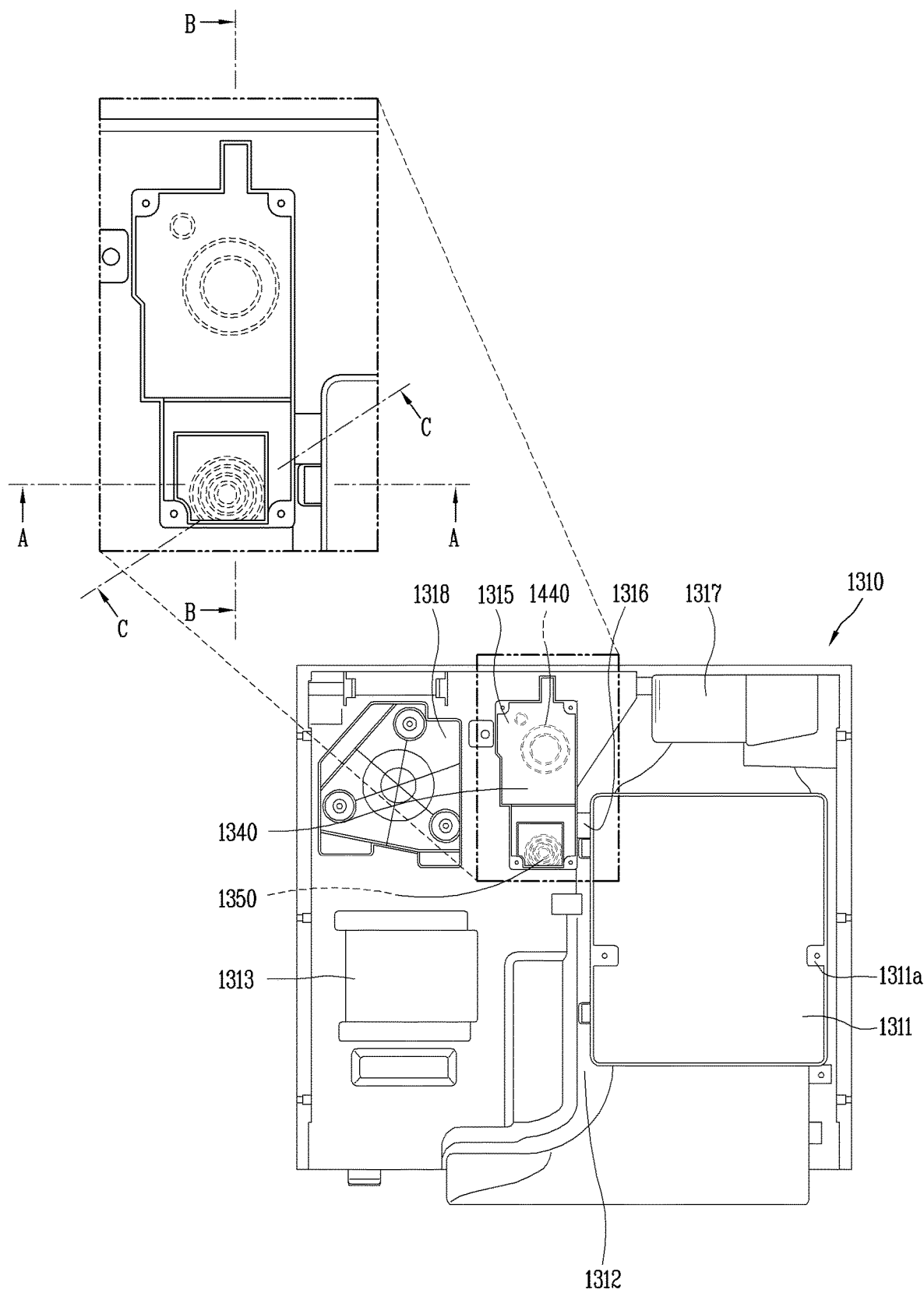
FIG. 5 is a planar view of the base.

FIG. 5 is a planar view of the base 1310. It will be understood that FIG. 5 illustrates the base 1310 when viewed from the position of the drum 1030.

The base 1310 may provide a space for mounting components constituting the air circulation flow path and the heat exchanger. The base 1310 may provide a plurality of mounting portions 1311, 1313, 1317, and 1318. The mounting portions 1311, 1313, 1317, and 1318 refer to regions provided for installing various components of the clothes treatment apparatus.

A partition wall 1312 may be formed at a boundary of each of the mounting portions 1311, 1313, 1317, and 1318, so that the respective mounting portions 1311, 1313, 1317, and 1318 can be partitioned. The partition wall 1312 may protrude from a circumference of each of the mounting portions 1311, 1313, 1317, and 1318. The partition wall 1312 may define a sidewall of each of the mounting portions 1311, 1313, 1317, and 1318.

Each of the mounting portions 1311, 1313, 1317, and 1318 may be classified according to the components installed in the corresponding regions. For example, the base 1310 may provide a heat exchanger mounting portion 1311, a drum motor mounting portion 1313, a circulation fan mounting portion 1317, and a compressor mounting portion 1318. The positions of the mounting portions 1311, 1313, 1317, and 1318 may change as necessary.

The heat exchanger mounting portion 1311 may be located on a right part of the base 1310. The evaporator 1110 and the condenser 1130 may be installed in the heat exchanger mounting portion 1311. A circulation fan mounting portion 1317 is located at the rear of the heat exchanger mounting portion 1311.

The heat exchanger mounting portion 1311 may be provided with protrusion walls 1311a that divide an installation position of the evaporator 1110 and an installation position of the condenser 1130. The protrusion walls 1311a may protrude from sidewalls of the heat exchanger mounting portion 1311 and extend in a vertical direction. The evaporator 1110 and the condenser 1130 may be supported by the protrusion walls 1311a.

The circulation fan 1710 for supplying hot dry air into the drum 1030 may be disposed in the circulation fan mounting portion 1317. The circulation fan cover 1330 may be mounted in the circulation fan mounting portion 1317 to enclose the circulation fan 1710. The circulation fan mounting portion 1317 may be connected to the heat exchanger mounting portion 1311, and condensate water generated in the circulation fan mounting portion 1317 may be collected in the heat exchanger mounting portion 1311.

The drum motor mounting portion 1313 may be located on a left part of the base 1310. The drum motor 1800 may be installed in the drum motor mounting portion 1313. The drum motor 1800 for rotating the drum 1030 may be mounted in the drum motor mounting portion 1313. The compressor mounting portion 1318 may be located at the rear of the drum motor mounting portion 1313. The compressor 1120 may be mounted in the compressor mounting portion 1318. The compressor mounting portion 1318 may have a shape for absorbing vibration of the compressor 1120.

The water collection part 1315 may have a bottom surface lower than a surrounding region on the base 1310 to collect condensate water. Condensate water may be generated from air circulating in the drum 1030. After the air circulating in the drum 1030 exchanges heat with the heat exchanger 1110, 1130, the condensate water may be dropped down to the bottom of the heat exchanger mounting portion 1311. A connection flow path portion 1316 may be formed between the heat exchanger mounting portion 1311 and the water collection part 1315.

The connection flow path portion 1316 may refer to a configuration in which the partition wall 1312 between the heat exchanger mounting portion 1311 and the water collection part 1315 has a height substantially the same as or lower than that of the heat exchanger mounting portion 1311. Alternatively, the connection flow path portion 1316 may refer to a configuration having a tilt gradually decreasing in height from the heat exchanger mounting portion 1311 toward the water collection part 1315.

The heat exchanger mounting portion 1311 and the water collection part 1315 may be divided by the partition wall 1312, but a partition wall may not partially be formed in a region corresponding to the connection flow path portion 1316. Accordingly, the condensate water dropped into the heat exchanger mounting portion 1311 may be collected in the water collection part 1315 only by gravity.

In order to solve this problem, it may be necessary to block a suction force of the circulation fan 1710 from reaching external air. As a configuration for solving the problem, it may be considered that the return hose 1454 is formed in a U-like shape to collect water therein. However, if water is accumulated in the return hose 1454, it may be frozen in winter, and even a bigger problem may occur in that condensate water overflowing from the water tank 1410 cannot be collected back into the water collection part 1315.

Therefore, it may be preferable that the return hose 1454 has a predetermined tangential tilt to prevent condensate water from being accumulated therein. Here, having the predetermined tangential tilt means having a tangential tilt greater than zero (0) in an entire section with respect to the ground on which the clothes treatment apparatus 1000 is installed. Also, the entire section refers to a section between both ends of the return hose 1454.

In order for the return hose 1454 to have the U-like shape, there must be at least one point at which its tilt with respect to the ground is zero. Therefore, the structure in which the return hose 1454 has the tangential tilt greater than zero in the entire section refers to that the return hose 1454 has an inclined I-like shape.

In addition, the present disclosure proposes a trap 1350 provided in the water collection part 1315, as a structure that is capable of blocking the suction force of the circulation fan 1710 without a problem in collecting condensate water even if freezing occurs.

Hereinafter, a detailed structure of the trap 1350 will be described with reference to FIGS. 6 to 8.

Figure 6:
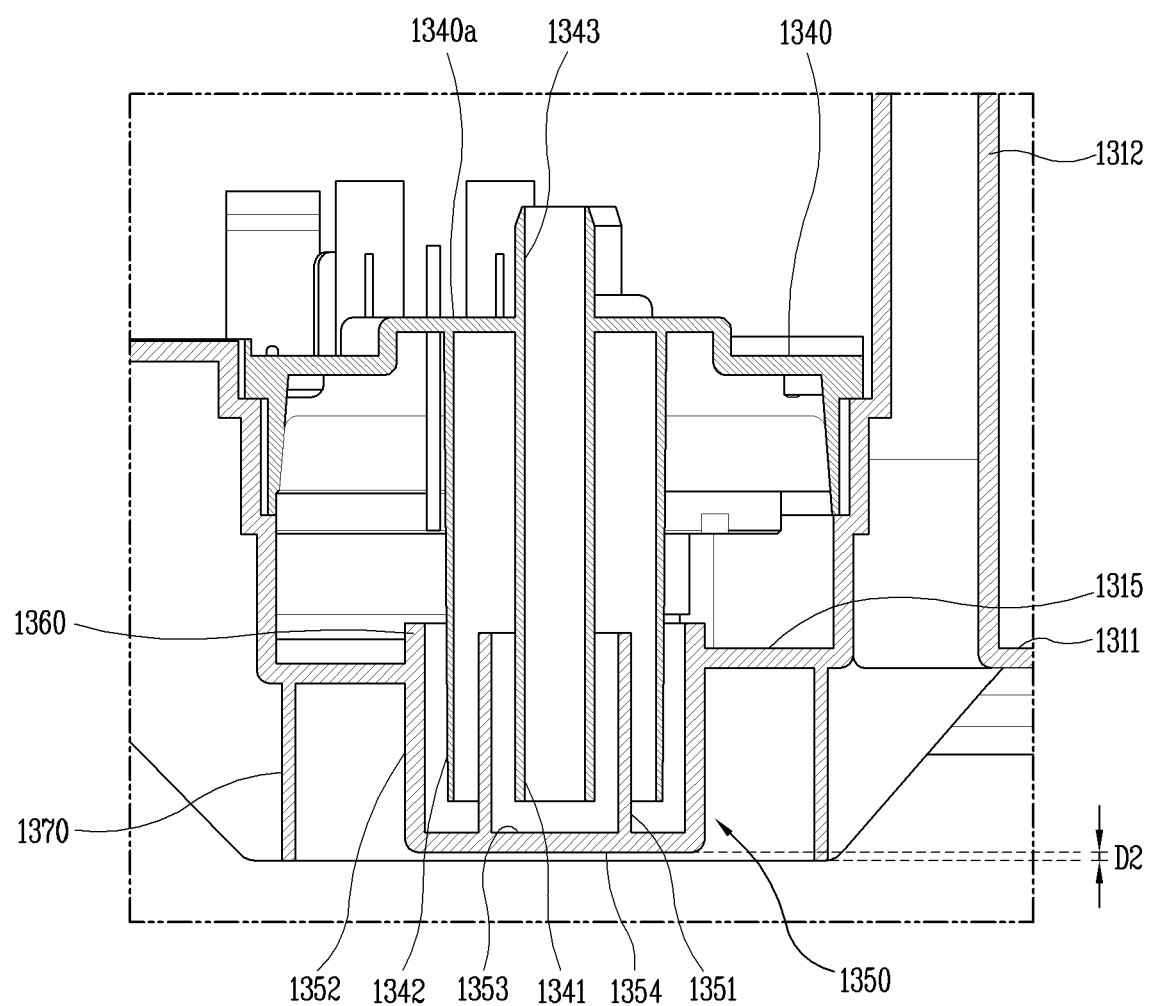
FIG. 6 is a sectional view of a trap, taken along the line A-A of FIG. 5.

FIG. 6 is a sectional view of the trap 1350, taken along the line A-A of FIG. 5. FIG. 7 is a sectional view of the trap 1350, taken along the line B-B of FIG. 5. FIG. 8 is a sectional view illustrating the trap 1350, taken along the line C-C of FIG. 5.

The water pump 1440 may be installed in the water collection part 1315, and the trap 1350 may be formed in the water collection part 1315. The trap 1350 may be configured to prevent suction of external air.

Since the water tank 1410 can be pulled out of the cabinet 1010, the inner space of the water tank support frame 1430 is not a space isolated from the outside of the clothes treatment apparatus 1000. The water tank support frame 1430 may be connected to the water collection part 1315 by the return hose 1454, and the water collection part 1315 may be connected to the circulation fan mounting portion 1317 through the connection flow path portion 1316 and the heat exchanger mounting portion 1311. Therefore, when the suction force is generated by the circulation fan 1710 in the structure without the trap 1350, the suction force may reach up to external air sequentially via the heat exchanger mounting portion 1311, the connection flow path portion 1316, the water collection part 1315, the return hose 1454, the water tank support frame 1430, and the water tank cover 1420. The external air may then be introduced into the air circulation flow path by the suction force generated by the circulation fan 1710.

When the external air flows into the air circulation flow path, the heat exchange efficiency of the heat exchanger may be lowered. In particular, when the clothes treatment apparatus 1000 is installed in a cold environment or a humid environment, the heat exchange efficiency may be likely to be drastically lowered due to introduction of cold humid air.

In addition, if external air flows into the air circulation flow path, several problems may occur, for example, a detection of a water level sensor (not illustrated), drainage, and the like may fail. Because condensate water is generated in the heat exchanger 1110, 1130 while the clothes treatment apparatus 1000 is operating, the condensate water is always present in the water collection part 1315. In addition, condensate water that has not been collected in the water collection part 1315 may remain in the heat exchanger mounting portion 1311 and the connection flow path portion 1316. At this time, when the circulation fan 1710 operates to generate a strong suction force, a surface of the condensate water existing in the water collection part 1315, the heat exchanger mounting portion 1311, and the connection flow path portion 1316 may wave.

The base 1310 may be provided with a water level sensor for detecting a water level of condensate water. If the surface the condensate water waves by the circulation fan 1710, it may act as a factor that interferes with the precise measurement of the water level sensor. In addition, the drainage of the water collection part 1315 may be controlled based on the water level of condensate water detected by the water level sensor, and the waving of the surface of the condensate water due to the introduction of the external air may act as a factor that interferes with the control of the drainage.

The trap 1350 may be formed in the water collection part 1315. The trap 1350 may be a configuration for gathering the condensate water in the water collection part 1315. The trap 1350 may have a bottom surface 1353 lower than a surrounding region in the water collection part 1315 to gather the condensate water. When the trap 1350 has the bottom surface 1353 lower than the other portion in the water collection part 1315, condensate water may always be gathered in the trap 1350. Here, the bottom surface 1353 of the trap 1350 refers to an inner bottom surface of the base 1310 on which the trap 1350 is formed. The inner bottom surface may be distinguished from an outer bottom surface, and the outer bottom surface may be referred to as a lower surface 1354.

Simply forming the bottom surface 1353 lower than the surrounding region may be insufficient to achieve the effect of blocking the introduction of the external air using the trap 1350. In particular, when the suction force generated by the circulation fan 1710 is very strong, the trap 1350 may fail to fully provide the effect of blocking the external air from the condensate water collected therein. The trap 1350 may have ribs 1341, 1342, 1351, and 1352 to have a sufficient effect of blocking the introduction of the external air.

The trap 1350 may be formed by the base 1310, the cover 1340, and the ribs 1341, 1342, 1351, 1352.

The base 1310 and the cover 1340 may provide a space in which the water collection part 1315 and the trap 1350 are formed. The base 1310 may define the bottom surface 1353 of the trap 1350. The cover 1340 may be configured to cover the water pump 1440 and the trap 1350 and coupled to the water collection part 1315. The base 1310 may form a lower portion of the trap 1350, and the cover 1340 may form an upper portion of the trap 1350.

The cover 1340 may include a water pump cover portion 1340b covering the water pump 1440, and a trap cover portion 1340a covering the trap 1350. A hose connection portion 1343 may be formed in the trap cover portion 1340a.

The hose connection portion 1343 may protrude from a downwardly-protruding rib 1341 which will be explained later to an upper side of the cover 1340 through the trap cover portion 1340a. The return hose 1454 may be connected to the hose connection portion 1343.

An upwardly-protruding rib 1351, 1352 may protrude toward the cover 1340 from the bottom surface 1353 of the trap 1350. The upwardly-protruding rib 1351, 1352 may have an upper end spaced apart from the cover 1340. Accordingly, the upwardly-protruding rib 1351, 1352 may protrude from the bottom surface 1353 of the trap 1350 to a portion just before contacting the cover 1340. The upper end of the upwardly-protruding rib 1351, 1352 may be open.

Next, a downwardly-protruding rib 1341, 1342 may protrude from the cover 1340 toward the bottom surface 1353 of the trap 1350. The downwardly-protruding rib 1341, 1342 may have a lower end spaced apart from the bottom surface 1353 of the trap 1350. Accordingly, the downwardly-protruding rib 1341, 1342 may protrude from the cover 1340 to a portion just before contacting the bottom surface 1353 of the trap 1350. The lower end of the downwardly-protruding rib 1341, 1342 may be open.

The upwardly-protruding rib 1351, 1352 and the downwardly-protruding rib 1341, 1342 may protrude from different circumferences of concentric circles. For example, the upwardly-protruding rib 1351, 1352 and the downwardly-protruding rib 1341, 1342 may be disposed to form concentric circles of different sizes. Accordingly, the upwardly-protruding rib 1351, 1352 and the downwardly-protruding rib 1341, 1342 each may have a shape corresponding to a side surface of a cylinder.

One of the upwardly-protruding rib 1351, 1352 and the downwardly-protruding rib 1341, 1342 may surround the other. For example, the upwardly-protruding rib 1351, 1352 may surround the downwardly-protruding rib 1341, 1342 at a position spaced apart from the downwardly-protruding rib 1341, 1342, or vice versa.

Here, the concentric circle does not mean a precise concentric circle in a mathematical sense. There may be some errors in consideration of deviations in a manufacturing process.

Figure 7:
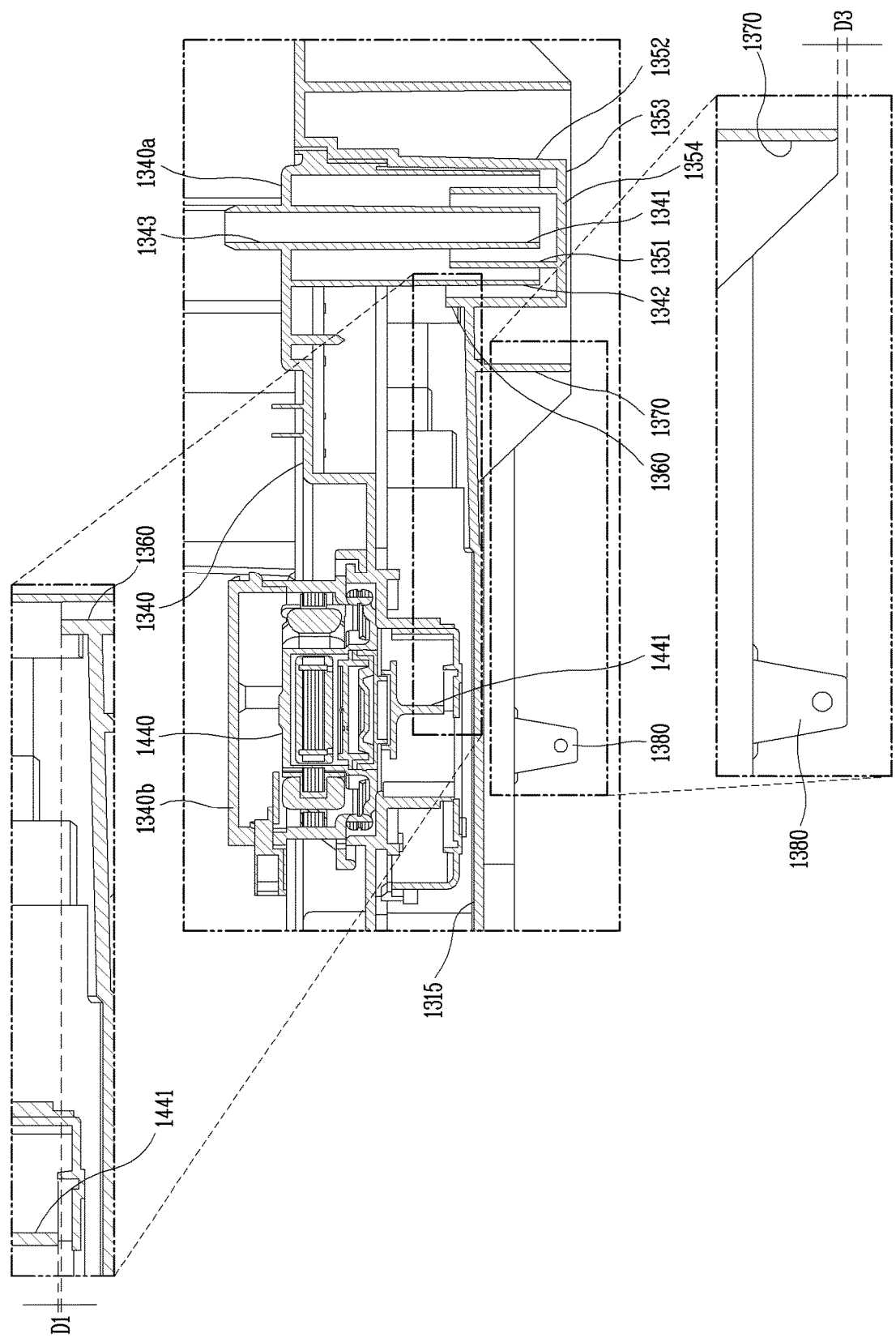
FIG. 7 is a sectional view illustrating the trap, taken along the line B-B of FIG. 5.
Figure 8:
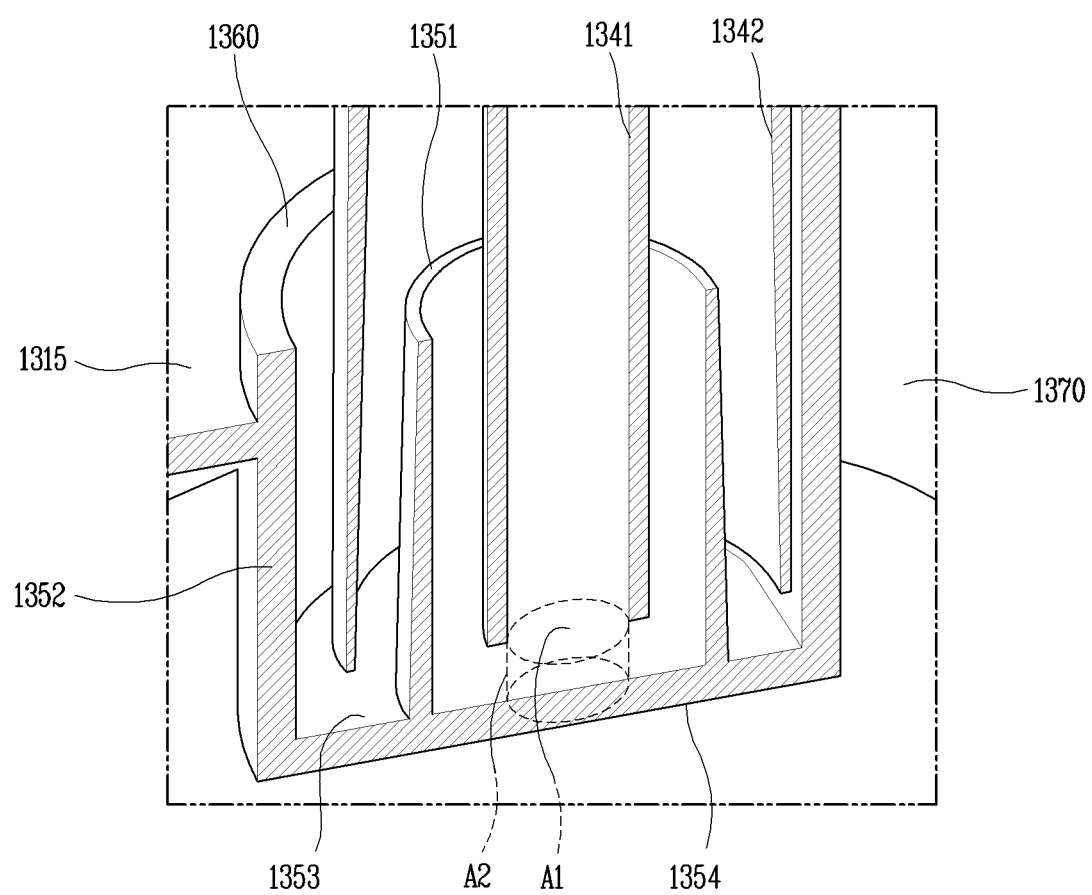
FIG. 8 is a sectional view illustrating the trap, taken along the line C-C of FIG. 5.

In more detail, explaining the structure of the trap 1350 illustrated in FIGS. 6 to 8, at least one of the upwardly-protruding rib 1351, 1352 and the downwardly-protruding rib 1341, 1342 may be provided in plurality. At least one is a concept including one of the upwardly-protruding rib 1351, 1352 and the downwardly-protruding rib 1341,1342, and both of the upwardly-protruding rib 1351, 1352 and the downwardly-protruding rib 1341,1342. FIGS. 6 to 8 illustrate a configuration in which both the upwardly-protruding rib 1351, 1352 and the downwardly-protruding rib 1341, 1342 are provided in plurality.

The upwardly-protruding ribs 1351 and 1352 and the downwardly-protruding ribs 1341 and 1342 may be alternately disposed along a direction away from a concentric center. For example, if any one of the upwardly-protruding rib 1351, 1352 and the downwardly-protruding rib 1341, 1342 is provided in plurality, the downwardly-protruding rib 1342 may be disposed around the upwardly-protruding rib 1351, and another upwardly-protruding rib 1352 may be disposed around the downwardly-protruding rib 1342 again. Conversely, the upwardly-protruding rib 1351 may be disposed around the downwardly-protruding rib 1341, and the another downwardly-protruding rib 1342 may be disposed around the upwardly-protruding rib 1351 again.

When both the upwardly-protruding rib 1351, 1352 and the downwardly-protruding rib 1341, 1342 are provided in plurality, the upwardly-protruding ribs 1351 and 1352 may need to be distinguished from each other, and the downwardly-protruding ribs 1341 and 1342 may need to be distinguished from each other. In order to distinguish the two upwardly-protruding ribs 1351 and 1352 from each other, one having a relatively small diameter may be referred to as a first upwardly-protruding rib 1351, and the other having a relatively large diameter may be referred to as a second upwardly-protruding rib 1352. Similarly, in order to distinguish the two downwardly-protruding ribs 1341 and 1342 from each other, one having a relatively small diameter may be referred to as a first downwardly-protruding rib 1341, and the other having a relatively large diameter may be referred to as a second downwardly-protruding rib 1342.

In this case, the first upwardly-protruding rib 1351, the second upwardly-protruding rib 1352, the first downwardly-protruding rib 1341, and the second downwardly-protruding rib 1342 may have different sizes. In addition, the first upwardly-protruding rib 1351, the second upwardly-protruding rib 1352, the first downwardly-protruding rib 1341, and the second downwardly-protruding rib 1342 may form concentric circles having different sizes.

Arranging the first upwardly-protruding rib 1351, the second upwardly-protruding rib 1352, the first downwardly-protruding rib 1341, and the second downwardly-protruding rib 1342 in order of size, starting from one having the smallest size, the first downwardly-protruding rib. 1341, the first upwardly-protruding rib 1351, the second downwardly-protruding rib 1342, and the second upwardly-protruding rib 1352 may be arranged sequentially. The first downwardly-protruding rib 1341 may be disposed at the innermost side, and the first upwardly-protruding rib 1351 may surround the first downwardly-protruding rib 1341. The second downwardly-protruding rib 1342 may surround the first upwardly-protruding rib 1351. The second upwardly-protruding rib 1352 may surround the second downwardly-protruding rib 1342.

By the structure and arrangement of the upwardly-protruding ribs 1351 and 1352 and the downwardly-protruding ribs 1341 and 1342, a flow path having a concentric structure may be defined. The flow path may have a cross-section in a zigzag shape in a vertical direction as illustrated in FIGS. 6 to 8.

The fact that the upwardly-protruding ribs 1351 and 1352 and the downwardly-protruding ribs 1341 and 1342 are provided in plurality is related to the suction force of the circulation fan 1710. When the circulation fan 1710 operates, the suction force of the circulation fan 1710 may be applied to the trap 1350. However, if the suction force of the circulation fan 1710 is greater than pressure that can be blocked by the trap 1350, external air may be introduced by the circulation fan 1710 despite the presence of the trap 1350.

When the upwardly-protruding ribs 1351 and 1352 and the downwardly-protruding ribs 1341 and 1342 are provided in plurality, the zigzag-shaped flow path may become complicated, and accordingly, the performance of the trap 1350 may be improved. The improvement of the performance of the trap 1350 means an increase in wind pressure which the trap 1350 can block. The zigzag shape may preferably be formed in multiple steps in the range where there is a free space in the base 1310.

The trap 1350 may be provided with a stepped portion 1360 to secure its performance. The stepped portion 1360 may protrude upward from a boundary between the bottom surface of the water collection part 1315 and the trap 1350. The stepped portion 1360 may be formed in a manner that the upwardly-protruding rib 1352 disposed at the outermost side, of the upwardly-protruding ribs 1351 and 1352, protrudes higher than the bottom surface of the water collection part 1315.

An upper end of the stepped portion 1360 may be disposed at a position higher than the water collection part 1315 so as to form a step with the bottom surface of the water collection part 1315. Since the stepped portion 1360 is formed at the boundary between the water collection part 1315 and the trap 1350, the condensate water flowing from the heat exchanger mounting portion 1311 to the water collection part 1315 may not be introduced directly into the trap 1350. The condensate water may be collected in the trap 1350 only when its water level is higher than a height of the stepped portion 1360.

The height of the stepped portion 1360 may affect the performance of the trap 1350. When the stepped portion 1360 becomes higher, an amount of condensate water gathered in the trap 1350 may increase more. The amount and water level of condensate water gathered in the trap 1350 may be factors that determine the performance of the trap 1350. Accordingly, as the height of the stepped portion 1360 increases, the amount of condensate water gathered in the trap 1350 may increase and the performance of the trap 1350 may be improved accordingly.

However, the height of the stepped portion 1360 must be lower than a position where blades 1441 of the water pump 1440 are disposed. The blades 1441 of the water pump 1440 may be rotatably disposed toward the bottom surface of the water collection part 1315 to transfer the condensate water collected on the bottom surface of the water collection part 1315. The blades 1441 of the water pump 1440 may make a vortex during rotation to transfer the condensate water.

If an upper end of the stepped portion 1360 is disposed higher than a lower end of each blade 1441, the blade 1441 that is rotated by the operation of the water pump 1440 may affect even the condensate water gathered in the trap 1350. If the condensate water collected in the trap 1350 swirls due to the blades 1441 of the water pump 1440, the performance of the water level sensor or the like may be deteriorated. In order to prevent an occurrence of such a phenomenon in advance, the upper end of the stepped portion 1360 must be disposed lower than the lower end of each blade 1441. FIG. 7 illustrates that a height difference between the blades 1441 and the stepped portion 1360 is indicated by D1.

In addition, in order to ensure the air blocking performance of the trap 1350, an area of the flow path must be carefully set. Here, the area of the flow path may be related to an inner diameter and length of one (e.g., 1341) that is disposed at the innermost side, among the upwardly-protruding ribs 1351 and 1352 and the downwardly-protruding ribs 1341 and 1342 of the trap 1350, and the area of the flow path at a second position must be larger than the area at a first position.

In FIG. 8, the first position may correspond to a hollow portion of the first downwardly-protruding rib 1341. The area at the first position may be calculated from a cross-sectional area of the hollow portion. For example, when an inner radius of the hollow portion of the first downwardly-protruding rib 1341 is r, the cross-sectional area of the hollow portion may be calculated by a formula ($A1=\pi r^2$) for obtaining an area of a circle.

The second position may correspond to a position between the bottom surface 1353 of the trap 1350 and the lower end of the first downwardly-protruding rib 1341. The area at the second position may be calculated by a formula for obtaining an area of a side surface of a virtual cylinder that the cross-section of the hollow portion is a bottom surface and a spacing between the bottom surface 1353 of the trap 1350 and the first downwardly-protruding rib 1341 is a height. In FIG. 8, if a surface corresponding to A1 is called a bottom surface (base side), a radius of the bottom surface is r. In addition, if a distance between the bottom surface 1353 of the trap 1350 and the lower end of the first downwardly-protruding rib 1341 is h, the area of the side surface of the cylinder may be calculated by a formula ($A2=2\pi r \times h$) corresponding to the product of circumference and height.

When comparing the two areas, preferably, A1<A2. As the value of A2 increases, the performance of the trap 1350 may be improved. More preferably, A2 may be at least twice as large as A1. In the condition of A1<A2, the external air blocking effect of the trap 1350 may increase.

On the other hand, one (e.g., 1352) that is disposed at the outermost side, among the upwardly-protruding ribs 1351 and 1352 and the downwardly-protruding ribs 1341 and 1342 1352, may define a side surface of the water collection part 1315. Here, the side surface of the water collection part 1315 does not mean the entire side surface of the water collection part 1315, but refers to a portion opposite to the water pump 1440 based on the trap 1350. Referring to FIG. 7, it can be seen that the second upwardly-protruding rib 1352 defines the side surface of the water collection part 1315. For example, the side surface of the water collection part 1315 may be defined by the extension of the outermost second upwardly-protruding rib 1352.

If the second upwardly-protruding rib 1352 and the side surface of the water collection part 1315 are separately provided at positions spaced apart from each other, the bottom surface of the water collection part 1315 may completely surround the trap 1350. Accordingly, in order for the suction force of the water pump 1440 to reach up to the rear of the trap 1350, a flow path must be formed around the trap 1350. Since the flow path around the trap 1350 causes a decrease in the diameter of the trap 1350, the performance of the trap 1350 may be deteriorated. On the other hand, as described in the present disclosure, when the side surface of the water collection part 1315 is formed by the upwardly-protruding rib 1351, 1352 or the downwardly-protruding rib 1341, 1342, a flow path around the trap 1350 may be unnecessary.

Meanwhile, the base 1310 may include a breakage prevention rib 1370 for preventing breakage of the trap 1350. The breakage prevention rib 1370 may protrude downward from the lower surface of the base 1310. The lower surface of the base 1310 refers to means the outer bottom surface of the base 1310.

A lower end of the breakage prevention rib 1370 may be disposed at a position lower than the lower surface 1354 of the trap 1350. The lower surface 1354 of the trap 1350 refers to the outer bottom surface of the trap 1350. Only when a lower end of the breakage prevention rib 1370 is disposed at a position lower than the lower surface 1354 of the trap 1350, an external impact can be blocked by the breakage prevention rib 1370 before being applied to the lower surface 1354 of the trap 1350. In FIGS. 6 and 7, the difference in height between the lower surface 1354 of the trap 1350 and the breakage prevention rib 1370 is indicated by D2.

The breakage prevention rib 1370 may be formed to surround the trap 1350. The breakage prevention rib 1370 may form a concentric circle with an outer circumferential surface of the trap 1350. The breakage prevention rib 1370 may surround the trap 1350 at a position spaced apart from the trap 1350. The breakage prevention rib 1370 may preferably be formed to surround the trap 1350, other than being formed only at one side of the trap 1350. That is, the breakage prevention rib 1370 may protect the trap 1350 from impact sources approaching from all directions of the trap 1350.

The lower end of the breakage prevention rib 1370 may be disposed at a position higher than a lower end 1380 of the base 1310. If the lower end of the breakage prevention rib 1370 is higher than the lower end of the base 1310, the damage of the breakage prevention rib 1370 may be prevented when the base 1310 is seated in the cabinet 1010. In FIG. 7, the difference in height between the breakage prevention rib 1370 and the lower end 1380 of the base 1310 is indicated by D3.

According to this implementation, since the circulation fan suctions hot dry air from the downstream side of the heat exchanger and supplies it into the drum, such hot air can be supplied into the drum more powerfully than when the circulation fan is disposed at the upstream side of the heat exchanger. Also, the trap can block the suction force of the circulation fan from reaching up to external air, thereby preventing the malfunction of the trap due to freezing in winter.

Hereinafter, another implementation of a clothes treatment apparatus will be described with reference to FIGS. 9 to 14.

Figure 9:
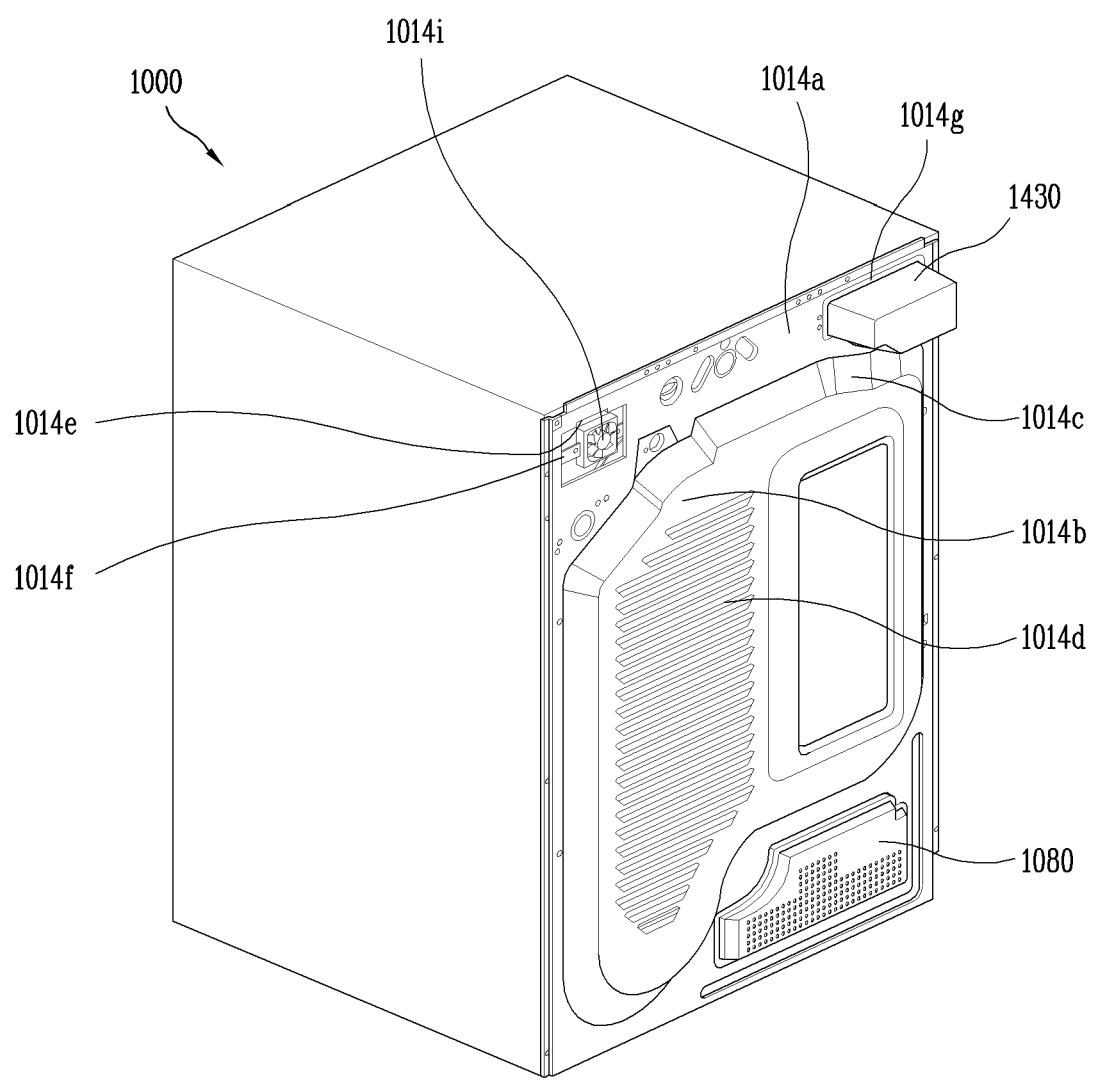
FIG. 9 is a rear perspective view illustrating a clothes treatment apparatus.
Figure 10:
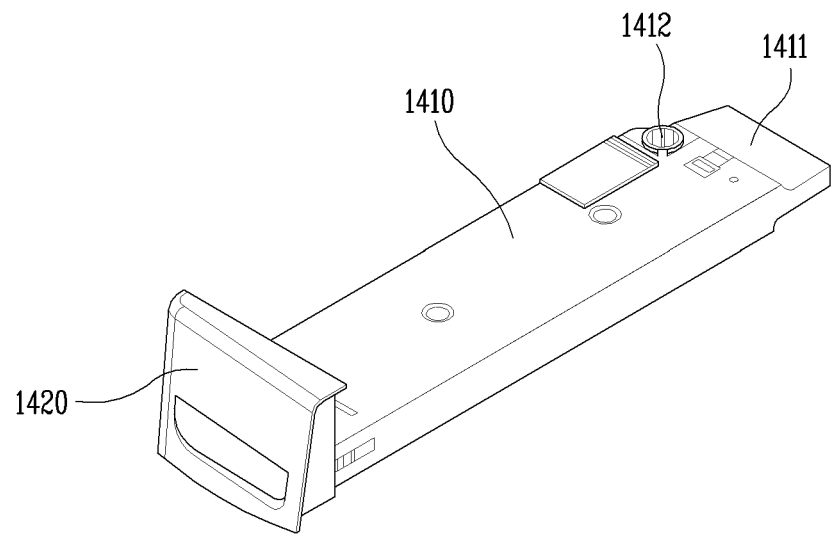
FIG. 10 is a perspective view illustrating a water tank.
Figure 11:
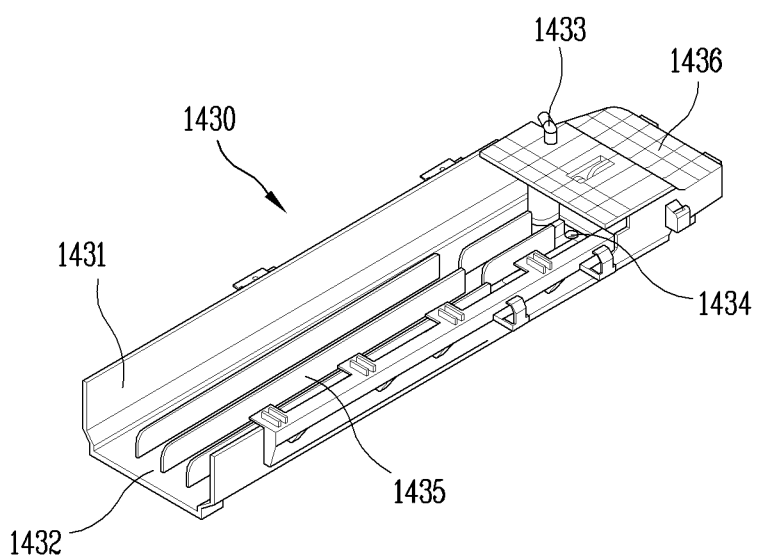
FIG. 11 is a perspective view illustrating a water tank support frame.
Figure 12:
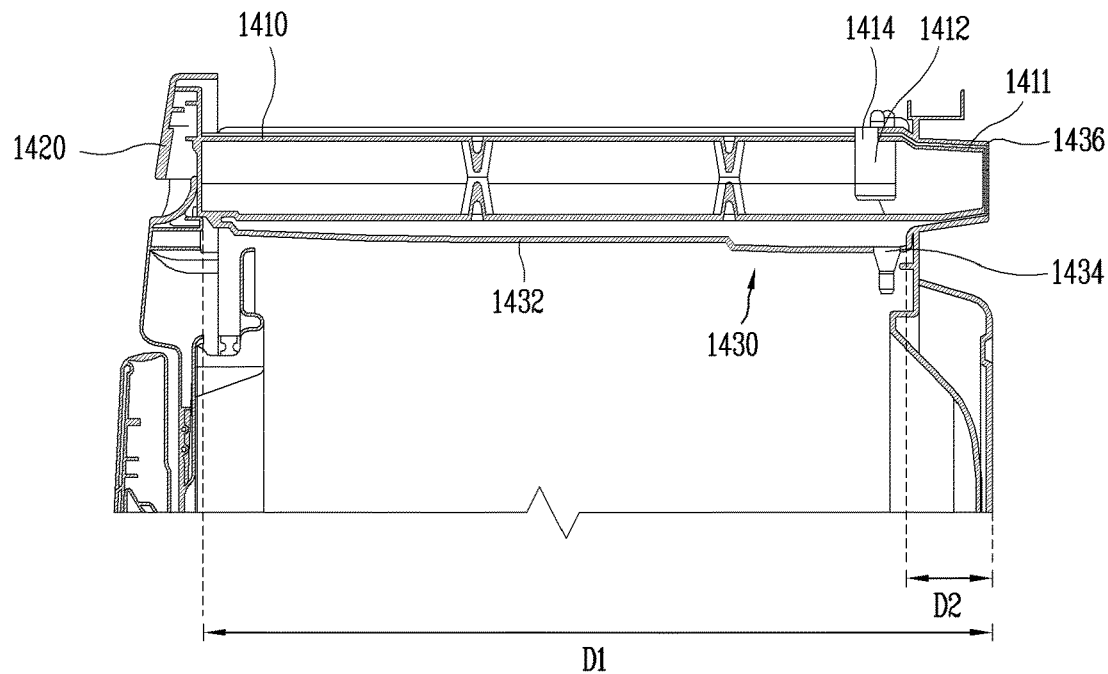
FIG. 12 is a sectional view taken along the line A-A of FIG. 1.

FIG. 9 is a rear perspective view illustrating a clothes treatment apparatus, FIG. 10 is a perspective view illustrating a water tank, FIG. 11 is a perspective view illustrating a water tank support frame, and FIG. 12 is a sectional view taken along the line A-A of FIG. 1.

As described above, the water tank 1410 may be provided at the upper right side of the drum 1030. The water tank cover 1420 may be mounted to the front of the water tank 1410. A water tank inlet/outlet port may be formed at the front cover defining the front appearance of the cabinet 1010 and the front supporter 1400 supporting the drum 1030 at the front of the drum 1030. The water tank inlet/outlet port may be formed through the front cover and the front supporter 1400.

The water tank 1410 may be inserted into and drawn out of the cabinet 1010 through the water tank inlet/outlet port. The user may separate and couple the water tank 1410 from and to the clothes treatment apparatus 1000 using the water tank cover 1420.

The water tank 1410 may define a storage space for storing condensate water therein. The water tank 1410 may be made of synthetic resin. An inlet hole 1412 through which the condensate water transferred by the water pump 1440 flows may be formed at an upper surface of the water tank 1410. As the water tank 1410 slides into and out of the cabinet 1010, the water tank 1410 may extend in one direction. Here, the one direction may be a direction from the front to the rear of the drum 1030.

On the other hand, as the capacity of the drum 1030 increases, an amount of condensate water generated during the operation of the clothes treatment apparatus 1000 may also increase. Accordingly, for user's convenience, the size of the water tank 1410 for storing the condensate water may preferably increase. However, under a structure in which the capacity (the radius) of the drum 1030 is increased while limiting the increase in the size of the cabinet 1010, increasing the capacity of the water tank 1410 may be limited.

The water tank 1410 may extend in the one direction and protrude from an outer side (exterior) of the cabinet 1010. As described above, the rear cover 1014 may include the water tank insertion port 1014g. The water tank insertion port 1014g, as illustrated in FIG. 4, may be located on the upper left side of the rear cover 1014 when viewed from the front. In other words, the water tank insertion port 1014g may be located on the upper right side of the drum 1310 based on the drum 1030 to correspond to the position where the water tank 1410 is disposed.

The water tank insertion port 1014g may be formed through one surface of the rear cover 1410 to pass through end portions of the water tank 1410 and the water tank support frame 1430. The end portion of the water tank 1410 may protrude from the outer side of the cabinet 1010 through the water tank insertion port 1014g. Here, the end portion of the water tank 1410 refers to a portion opposite to the water tank cover 1420. Hereinafter, the end portion of the water tank 1410 protruding from the outer side of the cabinet 1010 is referred to as a water tank extension portion 1411.

As long as the water tank extension portion 1411 can pass through the water tank insertion port 1014g formed through the rear cover 1014, the length of the water tank 1410 may increase correspondingly. Here, the length of the water tank 1410 refers to the length of the clothes treatment apparatus 1000 in the front and rear direction. The water tank 1410 may be formed longer than a side cover of the cabinet 1010. With this structure, the size of the water tank 1410 may increase. That is, the capacity of the water tank 1410 may increase.

Meanwhile, the end portion of the water tank support frame 1430 supporting the water tank 1410 may also protrude from the outer side of the cabinet 1010 through the water tank insertion port 1014g. A frame extension portion 1436 may enclose the water tank extension portion 1411 outside the cabinet 1010. Hereinafter, the end portion of the water tank support frame 1430 protruding from the outer side of the cabinet 1010 is referred to as a frame extension portion 1436. The water tank support frame 1430 may be formed of a material having higher strength than that of the water tank 1410. Accordingly, the water tank support frame 1430 may protect the water tank 1410 from an external impact or the like applied to the water tank 1410.

On the other hand, when the water tank extension portion 1411 excessively extends, user convenience may decrease when separating or coupling the water tank 1410 from or to the cabinet 1010. In this respect, if an entire length D1 of the water tank 1410 is 670 mm to 690 mm, the length D2 by which the water tank extension portion 1411 protrudes may be 55 mm to 60 mm. In other words, the water tank extension portion 1411 may extend by a preset ratio to the entire length of the water tank 1410. The ratio between the entire length D1 of the water tank 1410 and the length D2 of the water tank extension portion 1411 may preferably be 11:1 to 13:1.

According to another implementation, the length of the water tank extension portion 1411 protruding from the rear surface of the cabinet 1010, that is, from the base portion 1014a of the rear cover 1014 may be substantially the same as the protruding length of the rear protrusion portion 1014b.

In general, the rear surface (rear cover) of the clothes treatment apparatus 1000 may be disposed to face a wall. If the protruding length of the water tank extension portion 1411 is longer than the protruding length of the rear protrusion portion 1014b of the rear cover 1014, the water tank extension portion 1411 and the frame extension portion 1436 may hit the wall and be damaged.

In this regard, the protruding lengths of the water tank extension portion 1411 and the frame extension portion 1436 may preferably be shorter than or equal to the protruding length of the rear protrusion portion 1014b.

Although not illustrated, according to another implementation, the rear cover 1014 may include a cover extension portion formed to enclose the water tank.

Specifically, the cover extension portion may extend rearward from an edge of the water tank insertion port 1014g. The cover extension portion may be formed to enclose the protrusion portion of the water tank when the water tank 1410 is mounted to the water tank support frame 1040. In this case, the frame extension portion of the water tank support frame 1040 may be omitted.

Meanwhile, a rib portion 1435 may be formed on a lower surface 1432 of the water tank support frame 1430 such that the water tank 1410 is guided to be inserted or drawn out. The rib portion 1435 may protrude from the lower surface 1432 of the water tank support frame 1430 and extend along the lengthwise direction of the water tank support frame 1430. The rib portion 1435 may be formed thin to reduce a contact area with the water tank 1410.

The rib portion 1435 may be provided in plurality disposed to be spaced apart from each other. The rib portions 1435 may extend in parallel in the direction that the water tank 1410 is inserted and drawn out. The rib portions 1435 may reduce the contact area between the water tank 1410 and the water tank support frame 1430 during sliding of the water tank 1410. This may facilitate the user to separate or detach the water tank from the clothes treatment apparatus.

In addition, according to another implementation, a guide groove corresponding to the rib portion 1435 may be provided on the lower surface of the water tank 1410. The guide groove may be recessed in the lower surface of the water tank 1410 and extend in the lengthwise direction of the water tank 1410. In addition, the guide groove may be provided in plurality to correspond to the plurality of rib portions 1435.

On the other hand, the water tank support frame 1430 may surround the water tank 1410 to support the water tank 1410 in the inner space of the cabinet 1010. More specifically, the water tank support frame 1430 may have both side surfaces 1431 and the lower surface 1432.

The water tank support frame 1430 may be coupled to an inner surface of an upper cover constituting the upper part of the cabinet 1010. Accordingly, an accommodation space for the water tank 1410 may be defined by the both side surfaces 1431 and the bottom surface of the water tank support frame 1430 and the inner surface of the upper cover. The water tank support frame 1430 may extend in the lengthwise direction of the water tank 1410. A front end portion of the water tank support frame 1430 may be connected to the water tank inlet/outlet port. Accordingly, the inner space of the cabinet 1010 and the accommodation space of the water tank 1410 may be spatially separated from each other.

The accommodation space of the water tank 1410 may be connected to the outside since the water tank inlet/outlet port is provided at the front. A sealing member may be disposed between the water tank support frame 1430 and the cabinet 1010 to maintain airtightness between the inner space of the cabinet 1010 and the accommodation space of the water tank 1410. In particular, in order to prevent the condensate water overflowing from the water tank 1410 from being introduced into the clothes treatment apparatus 1000, the bottom of the water tank support frame 1430 except for a portion connected to the return hose 1454 may have a blocked structure.

On the other hand, the condensate water transferred to the water tank 1410 by the water pump 1440 may temporarily be stored in the water tank 1410. However, when an amount of condensate water is larger than the capacity of the water tank 1410, the condensate water which has been introduced in the water tank 1410 may overflow to the water tank support frame 1430. The water tank support frame 1430 may accommodate the condensate that overflows from the water tank 1410.

The lower surface 1432 of the water tank support frame 1430 may be stepped so that the condensate water overflowing from the water tank 1410 can be gathered. Since the inlet hole 1412 through which the condensate water flows in and out is formed on the rear side of the water tank 1410, the lower surface 1432 of the water tank support frame 1430 may be formed such that the rear side thereof is lower than the front side. In addition, the water tank support frame 1430 may be inclined downward at a predetermined inclination from the front to the rear.

With this structure, when the condensate water overflows from the water tank 1410, the water tank support frame 1430 having the structure may prevent the condensate water from flowing out of the cabinet 101 through the water tank inlet/outlet port. In addition, even if the user spills the condensate water into the water tank support frame 1430 while detaching the water tank 1430 filled with the condensate water from the cabinet 1010, the spilled condensate water may be prevented from flowing out of the cabinet 1010. The condensate water may flow to the rear side where a discharge groove is provided.

Meanwhile, the clothes treatment apparatus may include a return hose 1454 along which the condensate water overflowing from the water tank 1410 is recovered into the base 1310.

An outlet hole 1434 through which the condensate water is discharged through the return hose 1454 may be formed through the lower surface 1432 of the water tank support frame 1430. The outlet hole 1434 may be formed on the rear side of the water tank support frame 1430.

The return hose 1454 may be connected to the outlet hole 1434. The water tank support frame 1430 may include a nozzle provided in the outlet hole 1434 to connect the return hose 1454 to the outlet hole 1434. The return hose 1454 may be connected to a collection portion 1414 so that the condensate water overflowing into the water tank support frame 1430 can flow back to the collection portion. That is, one end of an outlet pipe may be coupled to the outlet hole, and another end may be connected to the collection portion.

On the other hand, according to the present disclosure, another end of the return hose 1454 may be connected to a second hose 1453 that is configured to clean or wash the heat exchanger 1110, 1130.

Referring back to FIGS. 3 and 4, the return hose 1454 may extend downward from the lower surface of the water tank support frame 1430 provided in the upper side of the cabinet 1010. The return hose 1454 may be connected to the second hose 1453 provided to clean the heat exchanger.

The second hose 1453 may be formed in plurality, and the return hose 1454 may be connected to any one of the plurality of second hoses 1453. The return hose 1454 may be connected to the second hose 1453 through a connector 1463.

With this structure, the condensate water overflowing from the water tank 1410 may be recovered to the bottom of the mounting portion where the heat exchanger 1110, 1130 is disposed through the second hose 1453 via the return hose 1454. The condensate water recovered to the bottom of the mounting portion where the heat exchanger 1110, 1130 is provided may be collected back into the collection portion 1414.

When the clothes treatment apparatus 1000 is operating, negative pressure may be produced in the air circulation flow path, in which the heat exchanger 1110, 1130 is provided, by the strong suction force of the circulation fan 1710 disposed at the downstream side of the heat exchanger 1110, 1130. Here, the negative pressure may be lower than atmospheric pressure outside the cabinet. In this case, external air of the cabinet 1010 may be introduced into the air circulation flow path sequentially through the water tank inlet/outlet port, the accommodation space of the water tank 1410, the outlet hole 1434, the return hose 1454, and the second hose 1453. This air may cause a problem of lowering the efficiency of the heat exchange system.

Accordingly, the return hose 1454 may be provided with a trap portion 1454a for preventing the external air of the cabinet 1010 from flowing into the air circulation flow path. The trap portion 1454a may be formed by bending at least a portion of the return hose 1454 to be concave downward. That is, the trap portion 1454a may have a U-like shape. The condensate water may be gathered in the trap portion 1454a. The condensate water gathered in the trap portion 1454a may serve to prevent the external air of the cabinet 1010 from flowing into the air circulation flow path.

More specifically, the another end of the return hose 1454 may be connected to the second hose 1453 disposed on an upper surface of the mounting portion where the heat exchanger 1110, 1130 is mounted. That is, the another end of the return hose 1454 may be connected to the second hose 1453 disposed on the upper surfaces of the front base cover 1321 and the rear base cover 1322.

The right mounting portion of the base 1310 may be lower in height than the lower left mounting portion where the heat exchanger 1110, 1130 is provided. Accordingly, since the return hose 1454 extends downward from the water tank support frame 1430 positioned at the upper right side, the return hose 1454 may extend to a position lower than the upper surfaces of the front base cover 1321 and the rear base cover 1322.

In this case, the return hose 1454 may extend upward at least once so as to be connected to the second hose 1453 disposed on the upper surfaces of the front base cover 1321 and the rear base cover 1322. For this reason, the return hose 1454 may be provided with the trap portion 1454a in which the condensate water may be gathered.

According to one implementation, the trap portion 1454a may include a first bent portion 1454a1 extending in a horizontal direction intersecting with a downward direction, and a second bent portion 1454a2 extending in an upward direction intersecting with the horizontal direction. However, the present disclosure is not limited thereto, and the trap portion 1454a may alternatively be formed in a shape in which the return hose 1454 is gently curved or bent. In addition, the trap portion 1454a may extend from the downwardly-extending return hose 1454 to be upwardly inclined.

The shape of the trap portion 1454a may vary depending on the length of the return hose 1454 or an interference position of internal components.

Meanwhile, the condensate water may always be gathered in the trap portion 1454a. Although the return hose 1454 has the trap portion 1454a, external air may continuously flow into the air circulation flow path if the condensate water does not overflow from the water tank 1410.

In this case, the control unit 1600 may control the condensate water collected in the collection portion 1414 to be transferred to the trap portion 1454a. Specifically, the control unit 1600 may operate the water pump 1440 to transfer the condensate water collected in the collection portion 1414 through a discharge hose 1451. In addition, the control unit 1600 may control a valve of the control valve 1470 connected to the first hose 1452 to be closed such that the transferred condensate water is not delivered to the water tank 1410 and control a valve connected to the second hose 1453 to be open. Under the control of the control unit 1600, the condensate water may be kept gathered in the trap portion 1454a.

In addition, a sensor for detecting the condensate water may be provided in the trap portion 1454a, so as to detect whether there is condensate water gathered in the trap portion 1454a. When condensate water in the trap portion 1454a is not detected, the control unit 1600 may control the condensate water collected in the collection portion 1414 to be transferred to the trap portion 1454a.

As described above, the condensate water may always be gathered in the trap portion 1454a. The condensate water gathered in the trap portion 1454a may be frozen at a temperature below zero in winter. When the condensate water is frozen, the condensate water overflowing from the water tank 1410 may leak to the outside of the cabinet 1010 through the water tank inlet/outlet port, or flow into the inner space of the cabinet 1010 through a sealing-vulnerable portion of the water tank support frame 1430.

Accordingly, the clothes treatment apparatus 1000 according to the present disclosure may include a structure for unfreezing the condensate water frozen in the trap portion 1454a.

Figure 13:
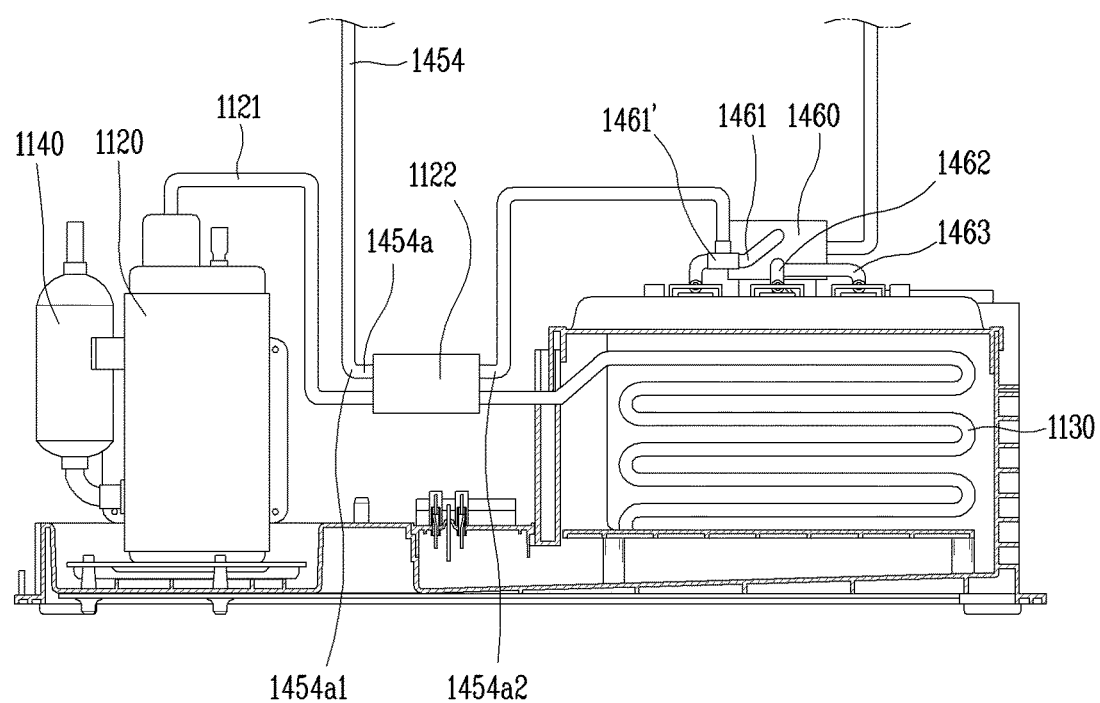
FIG. 13 is a sectional view taken along the line A-A of FIG. 4.

FIG. 13 is a sectional view taken along the line A-A of FIG. 4. Referring to the drawings, the trap portion 1454a may be disposed adjacent to a discharge pipe 1121 for supplying refrigerant from the compressor to the heat exchanger.

As described above, the present disclosure may include a heat pump system including the evaporator 1110, the compressor 1120, the condenser 1130, and the like. In addition, the heat pump system may include a refrigerant circulation flow path defined by connecting the evaporator 1110, the compressor 1120, and the condenser 1130 so that the refrigerant flows therealong. The refrigerant circulation flow path may be defined by a refrigerant pipe through which those components of the heat pump system are connected. The refrigerant may circulate in the heat pump system along the refrigerant circulation flow path.

The refrigerant compressed by the compressor may flow into the condenser 1130 in a state of high temperature and high pressure. The refrigerant pipe may be made of a metal material to withstand the refrigerant of the high temperature and the high pressure. Hereinafter, the refrigerant pipe connecting the compressor and the condenser 1130 is referred to as the discharge pipe 1121.

Since the refrigerant flowing along the discharge pipe 1121 is in the state of high temperature and high pressure, the trap portion 1454*a* may be disposed adjacent to the discharge pipe 1121, so that heat is transferred from the refrigerant to the trap portion 1454*a*. Accordingly, the condensate water condensed inside the trap portion 1454*a* can be quickly unfrozen.

Hereinafter, the structure of the trap portion 1454*a* and the discharge pipe 1121 will be described in more detail. The discharge pipe 1121 may extend upward from the upper surface of the compressor 1120. Since the condenser 1130 is located lower than the compressor, the discharge pipe 1121 may be bent horizontally and downwardly to be connected to the condenser 1130.

Here, the discharge pipe 1121 may be connected to the condenser 1130 through a sidewall that defines a part of the air circulation flow path. In this case, since the discharge pipe 1121 passes through the sidewall of the mounting portion of the condenser 1130, the discharge pipe 1121 may extend horizontally at a position lower than the height of the base cover 1320 where the second hose 1453 is disposed.

Accordingly, the return hose 1454 can be disposed adjacent to the discharge pipe 1121, so as to form the trap portion 1454*a*.

Meanwhile, the clothes treatment apparatus 1000 according to the present disclosure may include a holder 1122 for fixing the return hose 1454 to the discharge pipe 1121.

Figure 14:
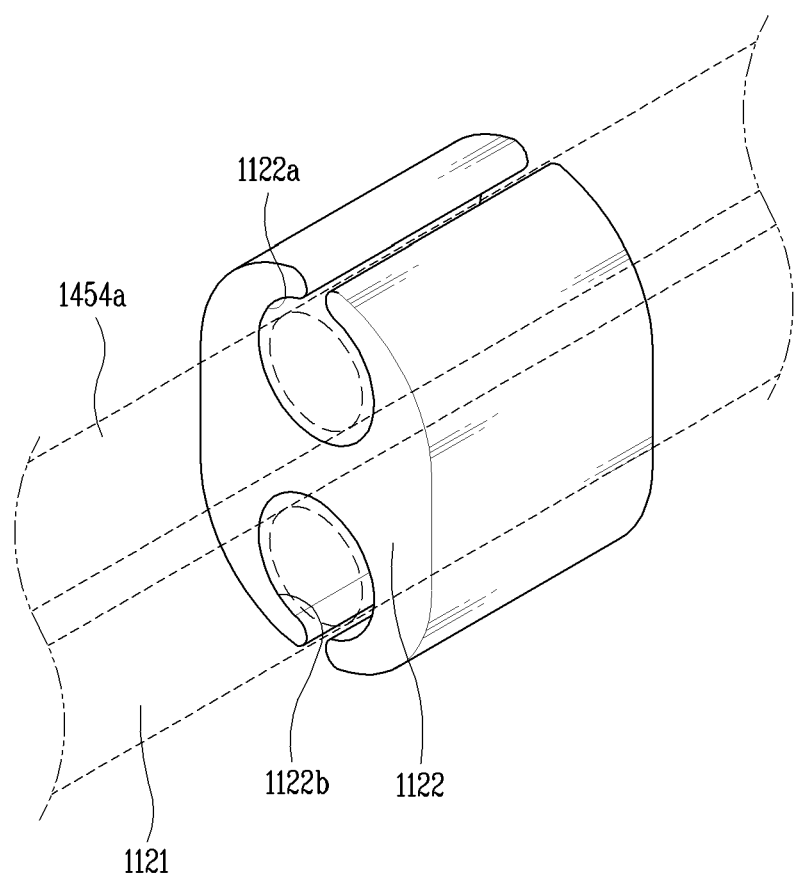
FIG. 14 is a perspective view of a holder in accordance with one implementation of the present disclosure.

FIG. 14 is a perspective view of the holder 1122 in accordance with one implementation.

The holder 1122 may be made of a material having high thermal conductivity, such as a metal. Accordingly, heat of the refrigerant flowing in the discharge pipe 1121 can be quickly transferred to the trap portion 1454*a*.

According to the one implementation, the holder 1122 may include a first coupling portion 1122*a* to which the trap portion 1454*a* of the return hose 1454 is coupled, and a second coupling portion 1122*b* to which the discharge pipe 1121 is coupled. As illustrated, the first coupling portion 1122*a* may be formed to surround at least a portion of the return hose 1454. In addition, the holder 1122 may be detachably coupled to the return hose 1454 and the discharge pipe 1121 for replacement or repair.

However, the holder 1122 is not limited to the shape, and various implementations of fixing the return hose 1454 to be adjacent to the discharge pipe 1121 may be included in the present disclosure.

According to the implementation, the water tank provided in the clothing treatment apparatus may have a structure with an increased condensate water storage capacity. Accordingly, the user does not need to empty the water tank frequently. Thus, the user's convenience can be improved. In addition, the protruding length of the water tank from the outer side of the cabinet may be limited, thereby preventing the outer side of the cabinet from being bent due to the weight of the protruding portion of the water tank.

[Control Configuration of Clothes Treatment Apparatus]

Hereinafter, description will be given of a control configuration of a clothes treatment apparatus to which implementations of the present disclosure are applied.

Hereinafter, a clothes treatment apparatus according to the present disclosure will be described in detail with reference to the accompanying drawings. For the sake of brief description with reference to the drawings, the same or equivalent components will be provided with the same reference numbers, and description thereof will not be repeated. A singular representation may include a plural representation unless it represents a definitely different meaning from the context.

It will be understood that when an element is referred to as being "connected with" another element, the element can be connected with the another element or intervening elements may also be present. In contrast, when an element is referred to as being "directly connected with" another element, there are no intervening elements present.

Figure 15A:
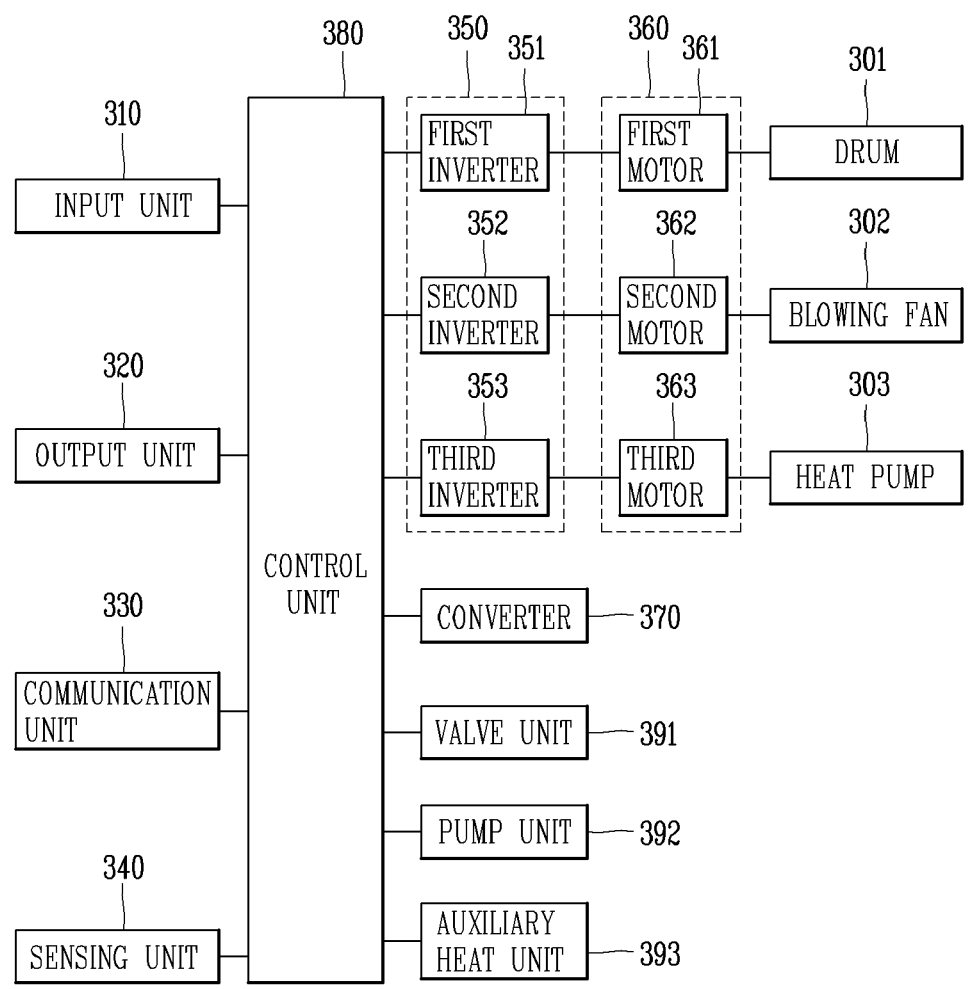
FIG. 15A is a block diagram illustrating components of a clothes treatment apparatus in accordance with the present disclosure.

Referring to FIG. 15A, the clothes treatment apparatus according to the present disclosure may include at least one of an input unit 310, an output unit 320, a communication unit 330, a sensing unit 340, an inverter 350, a motor 360, a converter 370, a control unit 380, a valve unit 391, a pump unit 392, and an auxiliary heater unit 393.

The input unit 310 may receive a control command related to an operation of the clothes treatment apparatus from a user. The input unit 310 may be configured as a plurality of buttons or may be configured as a touch screen.

Specifically, the input unit 310 may be configured as a control panel through which the user may select an operation mode of the clothes treatment apparatus or apply an input related to an execution of the selected operation mode.

The output unit 320 may output information related to the operation of the clothes treatment apparatus. The output unit 320 may include at least one display.

The information output by the output unit 320 may include information related to an operating state of the clothes treatment apparatus. That is, the output unit 320 may output information related to at least one of a selected operation mode, whether a failure has occurred, an operation completion time, and an amount of clothes accommodated in the drum.

In one implementation, the output unit 320 may be a touch screen integrally formed with the input unit 310.

The communication unit 330 may perform communication with an external network. The communication unit 330 may receive a control command related to an operation of the clothes treatment apparatus from the external network. For example, the communication unit 330 may receive an operation control command of the clothes treatment apparatus sent from an external terminal through the external network. Accordingly, the user can remotely control the clothes treatment apparatus.

In addition, the communication unit 330 may transmit information related to an operation result of the clothes treatment apparatus to a predetermined server through the external network.

Also, the communication unit 330 may communicate with other electronic devices in order to establish an Internet of Things (IOT) environment.

The sensing unit 340 may detect information related to an operation of the clothes treatment apparatus.

Specifically, the sensing unit 340 may include at least one of a current sensor, a voltage sensor, a vibration sensor, a noise sensor, an ultrasonic sensor, a pressure sensor, an infrared sensor, a visual sensor (camera sensor), and a temperature sensor.

In one example, the current sensor of the sensing unit 340 may detect a current flowing through a point of a control circuit of the clothes treatment apparatus.

In another implementation, the temperature sensor of the sensing unit 340 may detect an internal temperature of the drum.

As described above, the sensing unit 340 may include at least one of various types of sensors, and the types of sensors included in the clothes treatment apparatus may not be limited. In addition, the number or installation location of each sensor may be variously designed according to purposes.

The inverter 350 may include a plurality of inverter switches, and be configured to convert smoothed DC power Vdc into three-phase AC power va, vb, vc having a predetermined frequency by a switching-on/off operation of the switches and output the three-phase AC power va, vb, vc to a motor.

Referring to FIG. 15A, the clothes treatment apparatus according to the present disclosure may include a plurality of inverters 351, 352, and 353, and the inverters 351, 352, and 353 may supply power to a plurality of motors 361, 362, and 363, respectively.

In FIG. 15A, it is shown that the clothes treatment apparatus includes the three inverters 351, 352, 353, and the inverters supply power to the three motors 361, 362, 363, respectively, but the number of inverters and motors may not be limited to the implementation.

Specifically, the first inverter 351 may supply power to the first motor 361 rotating a drum 301, the second inverter 352 may supply power to the second motor 362 rotating a blower fan 302, and the third inverter 353 may supply power to the third motor 363 operating a compressor of a heat pump 303.

A rotation shaft of the first motor 361 and a rotation shaft of the drum 301 may be connected to each other by a belt (not illustrated), and the first motor 361 may transmit a rotational force to the drum 301 through the belt.

The motor 360 may be a BLDC motor that can perform speed control based on a speed command value, or may be a constant speed motor that does not perform speed control. In one example, the first motor for rotating the drum and the third motor for operating the compressor may be configured as the BLDC motors, and the second motor for rotating the blower fan may be configured as the constant speed motor.

Each of the inverters 351, 352, and 353 may include upper arm switches Sa, Sb and Sc and lower arm switches S'a, S'b and S'c which are connected in series as pairs, and thus totally three pairs of upper and lower arm switches Sa & S'a, Sb & S'b, and Sc & S'c may be connected in parallel. A diode may be connected in reverse-parallel to each switch Sa, S'a, Sb, S'b, Sc, S'c.

That is, the first upper arm switch Sa and the first lower arm switch S'a may implement a first phase. The second upper arm switch Sb and the second lower arm switch S'b may implement a second phase. In addition, the third upper arm switch Sc and the third lower arm switch S'c may implement a third phase.

In one implementation, the inverter 350 may have a shunt resistor corresponding to at least one of the first to third phases.

Specifically, a first shunt resistor may be connected to one end of the first lower arm switch S'a of the first switch pair (Sa, S'a). Similarly, a second shunt resistor may be connected to one end of the second lower arm switch S'b, and a third shunt resistor may be connected to one end of the third lower arm switch S'c. The first to third shunt resistors are not essential components, and only some of the three shunt resistors may be installed if necessary.

In another implementation, the inverter 350 may be connected to a common shunt resistor that is commonly connected to the first to third phases.

Meanwhile, each of the switches in the inverters 351, 352, and 353 may be switched on and off based on an inverter switching control signal generated by the control unit 380. Accordingly, the three-phase AC power having a predetermined frequency may be output to the motor 360.

The control unit 380 may control the switching operations of the inverters 351, 352, and 353 in a sensorless manner. Specifically, the control unit 380 may control the switching operation of the inverter 350 by using a motor phase current detected by the current sensor of the sensing unit 340.

The control unit 380 may output an inverter switching control signal to the inverters 351, 352, 353 in order to control the switching operations of the inverters 351, 352, 353. Here, the inverter switching control signal may be a pulse width modulation (PWM) switching control signal.

As illustrated in FIG. 15A, the clothes treatment apparatus according to the present disclosure may include a plurality of inverters. In FIG. 15A, it is shown that three motors 360 and three inverter 350 are provided for driving or operating the drum 301, the blower fan 302, and the compressor of the heat pump 303, respectively, but the present disclosure is not limited thereto. For example, if the drum 301 and the blower fan 302 are operated by one motor, and the compressor of the heat pump 303 is operated by another motor, two motors and two inverters may be used.

In this way, as the number of inverters increases, power consumption may increase. Accordingly, the present disclosure proposes a clothes treatment apparatus including the converter 370.

The converter 370 may convert commercial AC power into DC power and output it. In more detail, the converter 370 may convert single-phase AC power or three-phase AC power to DC power and output it. An internal structure of the converter 370 may vary depending on a type of commercial AC power source.

Meanwhile, the converter 370 may be configured as a diode or the like without a switching element, and may perform a rectification operation without a separate switching operation.

For example, in the case of a single-phase AC power source, four diodes may be used in a bridge configuration. On the other hand, in the case of a three-phase AC power source, six diodes may be used in a bridge configuration.

On the other hand, the converter 370, for example, may be a half-bridge type converter in which two switching elements and four diodes are connected. In the case of a three-phase AC power source, six switching elements and six diodes may be used.

When the converter 370 includes a switching element, the converter 410 may perform a boosting operation, a power factor correction, and a DC power conversion by a switching operation of the switching element.

The valve unit 391 may be disposed at a point of a flow path provided in the clothes treatment apparatus, to control the flow along the flow path. The pump unit 392 may provide a driving force for supplying gas or liquid to the flow path.

In addition, the auxiliary heater unit 393 may be installed separately from the heat pump, to supply heat to the drum. The auxiliary heater unit 393 may heat air flowing into the drum.

The control unit 380 may control components included in the clothes treatment apparatus.

First, in order to control the rotation of the motor 360, the control unit 380 may generate at least one of a power command value, a current command value, a voltage command value, and a speed command value corresponding to the motor.

Specifically, the control unit 380 may calculate power or a load of the motor 360 based on the output of the sensing unit 340. Specifically, the control unit 380 may calculate a rotational speed of the motor by using a phase current value detected by the current sensor of the sensing unit 340.

In addition, the control unit 380 may generate a power command value corresponding to the motor, and may calculate a difference between the generated power command value and the calculated power. In addition, the control unit 380 may generate a speed command value of the motor based on the difference between the power command value and the calculated power.

Further, the control unit 380 may calculate a difference between the speed command value of the motor and the calculated rotational speed of the motor. In this case, the control unit 380 may generate a current command value applied to the motor based on the difference between the speed command value and the calculated rotational speed.

In one example, the control unit 380 may generate at least one of a q-axis current command value and a d-axis current command value.

Meanwhile, the control unit 380 may convert power to a phase current of a stationary coordinate system or a phase current of a rotating coordinate system based on a phase current sensed by the current sensor. The control unit 380 may generate a voltage command value applied to the motor by using the converted phase current and the current command value.

By performing such processes, the control unit 380 may generate an inverter switching control signal according to the PWM method.

The control unit 380 may adjust a duty ratio of the switches included in the inverter using the inverter switching control signal.

Also, the control unit 380 may control an operation of at least one of the drum, the blower fan, and the heat pump based on a control command input through the input unit 310.

In one example, the control unit 380 may control a rotation pattern of the drum based on a user input applied to the input unit 310.

In another example, the control unit 380 may control a rotational speed or an operation timing of the blower fan based on a user input applied to the input unit 310.

In another example, the control unit 380 may control an output of the heat pump to adjust an internal temperature of the drum based on a user input applied to the input unit 310.

Figure 15B:
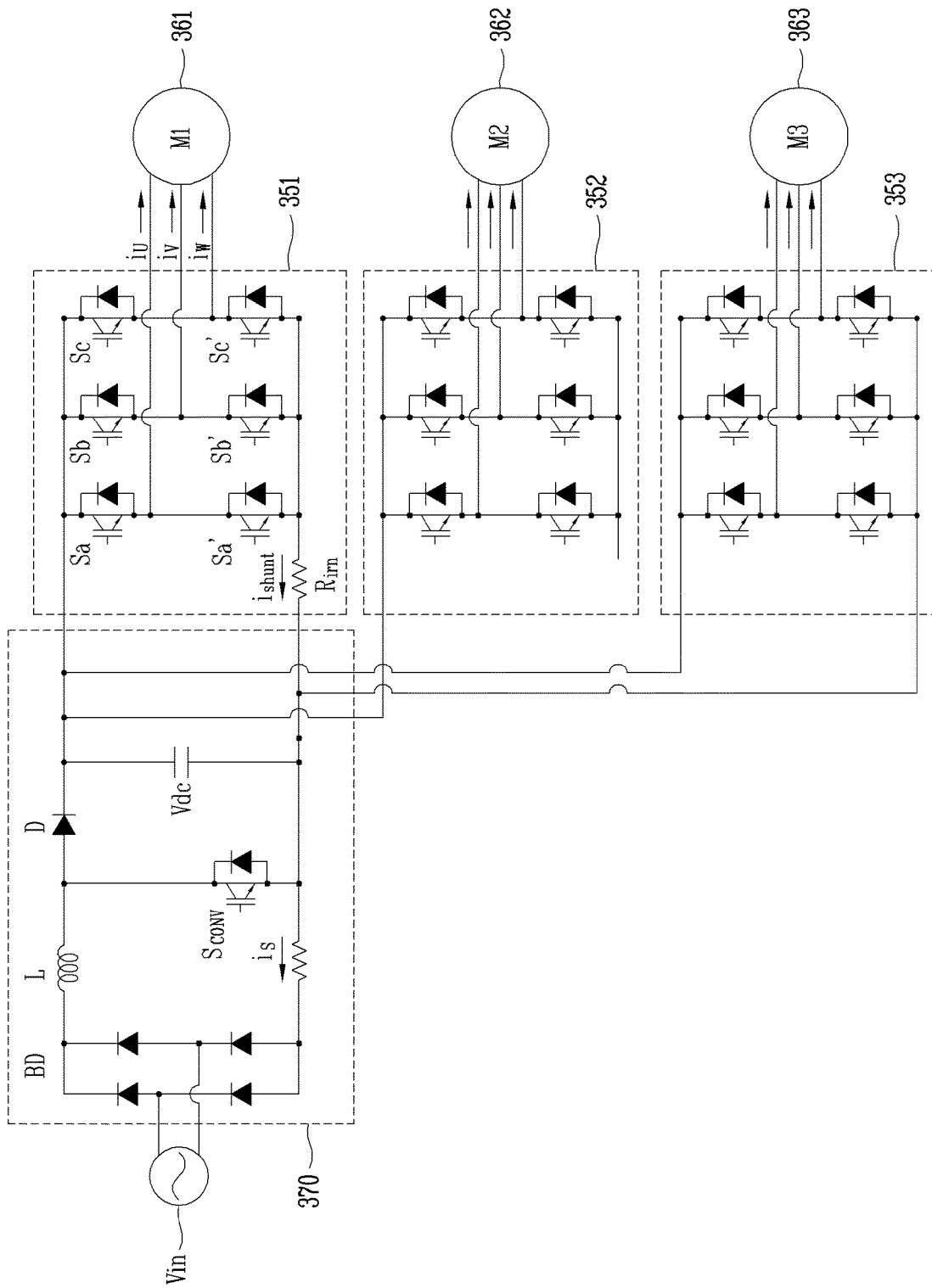
FIG. 15B is a circuit diagram illustrating a control circuit of the clothes treatment apparatus in accordance with the present disclosure.

Hereinafter, a control circuit of the clothes treatment apparatus according to the present disclosure will be described with reference to FIG. 15B.

The control circuit included in the clothes treatment apparatus according to the present disclosure may further include a converter 370, a DC-link voltage detector B, a smoothing capacitor Vdc, a plurality of shunt resistors, a plurality of inverters 351, 352, and 353, a plurality of diodes D and BD, a reactor L, and the like.

The reactor L may be disposed between a commercial AC power source Vin and the converter 370 to perform a power factor correction or a boosting operation. The reactor L may also perform a function of limiting a harmonic current due to fast switching of the converter 370.

The converter 370 may convert AC power Vin, which has been applied from the commercial AC power source 405 via the reactor L, into DC power and output the DC power. Although the commercial AC power source Vin is shown as a single-phase AC power source in the drawing, it may alternatively be a three-phase AC power source.

The smoothing capacitor Vdc may smooth input power and store it. In the drawing, one element is illustrated as the smoothing capacitor Vdc, but a plurality of smoothing capacitors may alternatively be provided to ensure element stability. On the other hand, both ends of the smoothing capacitor Vdc may be referred to as DC-links or DC-link ends since DC power is stored.

The control unit 380 may detect an input current is which is input from the commercial AC power source using the shunt resistor installed in the converter 370. In addition, the control unit 380 may detect a phase current of the motor by using the shunt resistor Rin installed in the inverter 350.

Figure 16A:
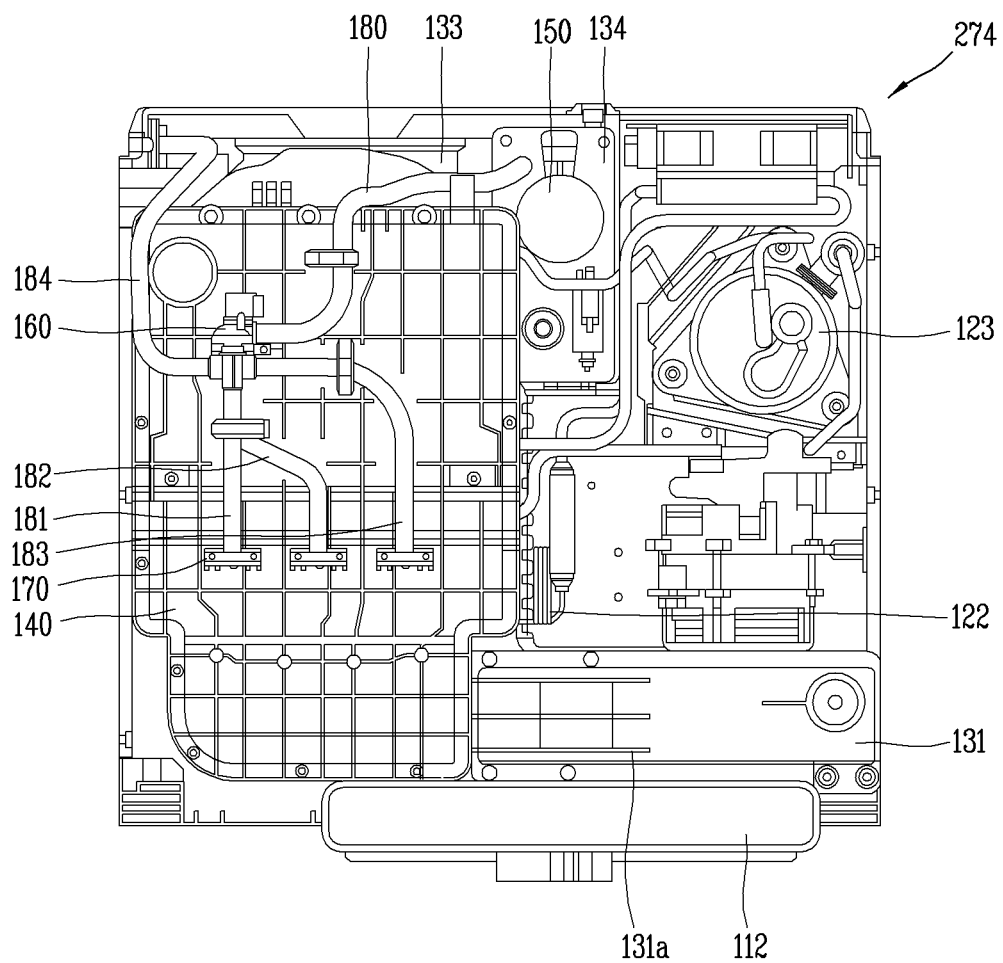
FIG. 16A is a planar view illustrating a base for explaining an implementation of a clothes treatment apparatus and a control method therefor according to the present disclosure.
Figure 16B:
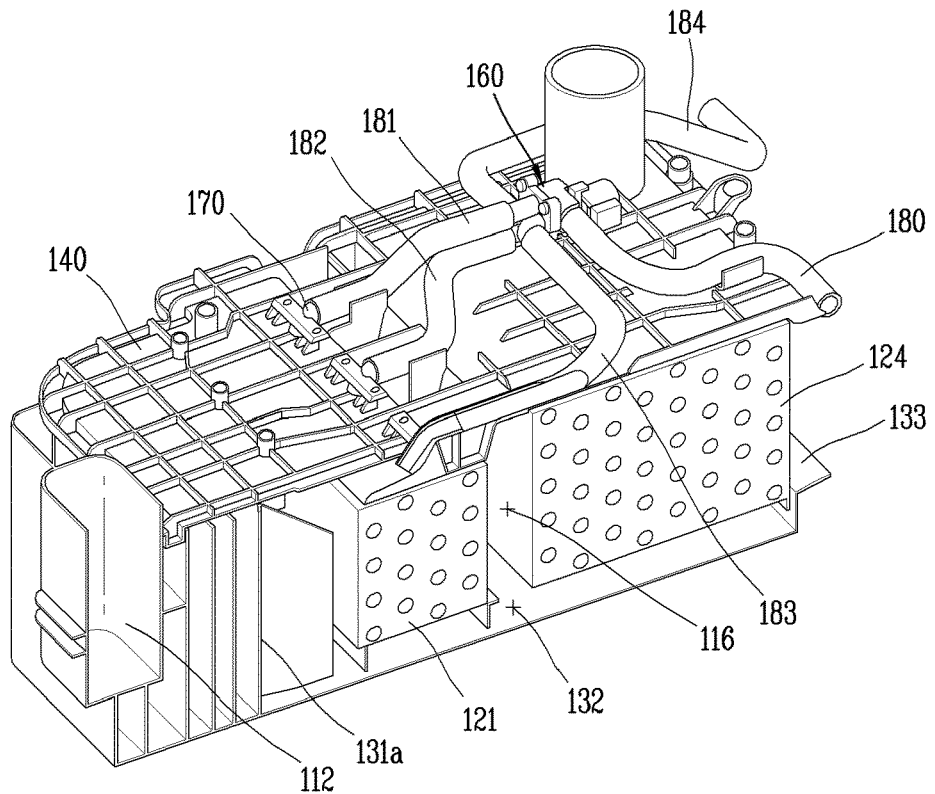
FIG. 16B is a partial cut-away view illustrating the base illustrated in FIG. 16A.

FIGS. 16A and 16B are views related to the base of the clothes treatment apparatus.

The base illustrated in FIG. 16A may be installed on the lower surface of the cabinet 1010 and provide an installation place for stably supporting the heat pump. In addition, the base may constitute a part of a flow path through which heated air circulates.

As illustrated in FIGS. 16A and 16B, a lint filter mounting portion 112 may be formed on one side of the cabinet 1010, and a circulation flow path guide portion 131a may be disposed to communicate with the lint filter mounting portion 112.

The circulation flow path guide portion 131a may communicate with the lint filter mounting portion 112 to guide hot air exhausted from the drum toward the evaporator of the heat pump. To this end, the circulation flow path guide portion 131a may be configured as a plurality of guide vanes for guiding introduced air toward the evaporator.

The hot air guided by the circulation flow path guide portion 131a may be introduced into a circulation flow path 116. The circulation flow path 116 may be defined as a cover plate 140 covers a top of a space that is defined by the bottom surface of the base and partition walls (not shown) formed on the base. That is, the circulation flow path 116 may be defined by the cover plate 140 and the partition walls of the base. Air passing through the thusly-defined circulation flow path 116 may pass through the evaporator and the condenser in sequence, and then be introduced into a back duct through a back duct connection portion 133 formed on the rear surface of the base.

On the other hand, condensate water may be collected in a portion, on which an evaporator and a condenser are disposed, of the bottom surface of the base. That is, the condensate water generated by the evaporator 121 in a condensing manner may be primarily collected in the portion, on which the evaporator 121 is disposed, of the bottom surface of the base.

The collected condensate water may be introduced into a condensate water storage part 134 located adjacent to a compressor 123. A condensate water collection part 132 and the condensate water storage part 134 may be partitioned by a partition wall, and may communicate with each other through a through hole formed at the partition wall.

Therefore, when a water level of the condensate water collected in the condensate water collection part 132 rises above a predetermined level, the condensate water may be introduced into the condensate water storage part 134 through the through hole so as to be stored in the condensate water storage part 134. The condensate water stored in the condensate water storage part 134 may be supplied to a control valve 160 installed on an upper portion of the cover plate 140 by a pump 150.

Figure 19:
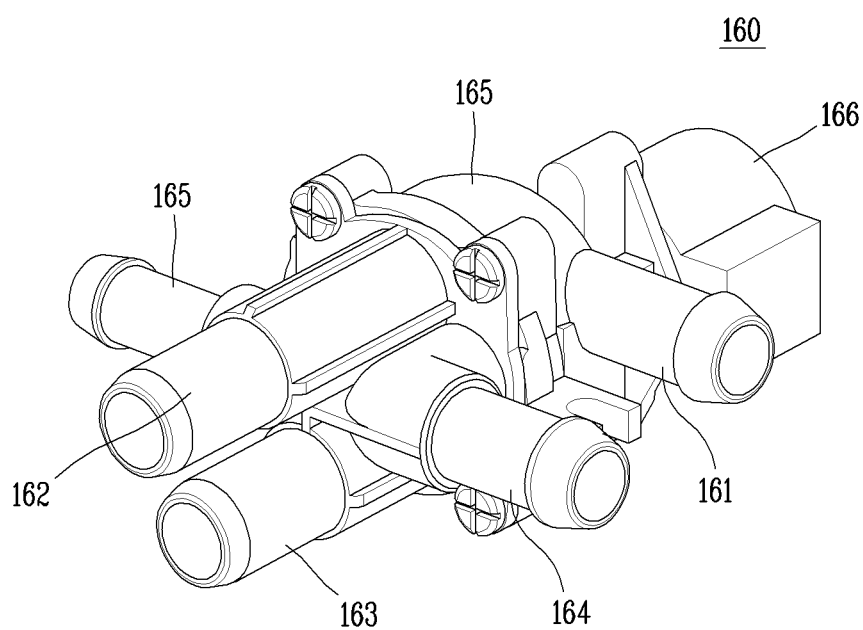
FIG. 19 is a perspective view illustrating a control valve of a cleaning device to which the implementation is applied.
Figure 20:
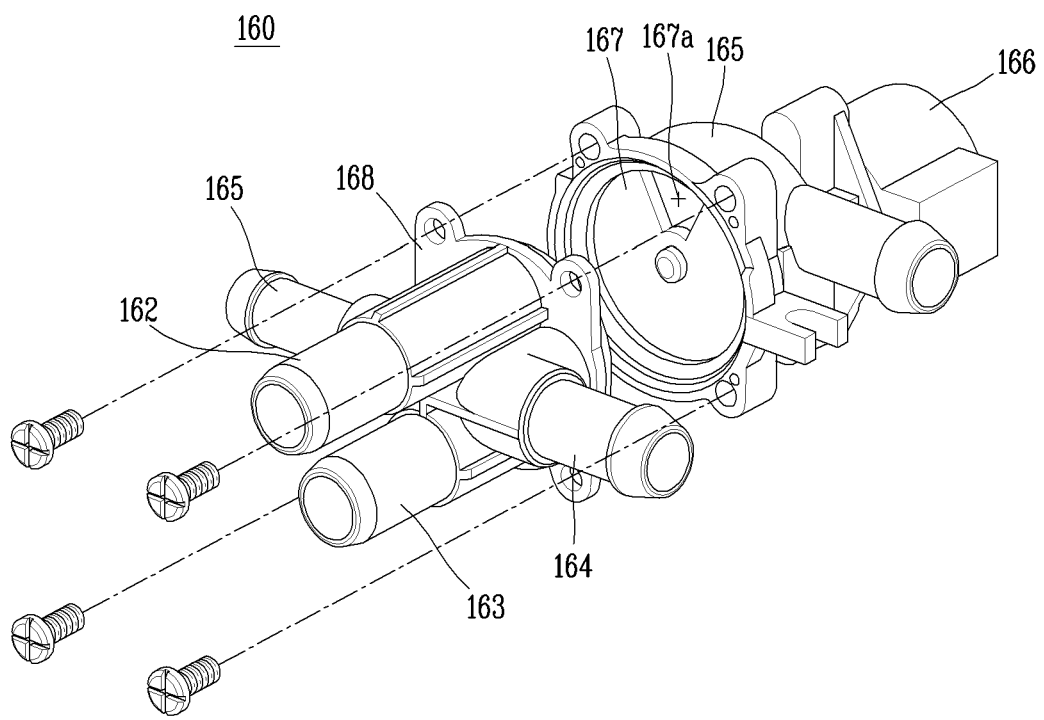
FIG. 20 is an exploded perspective view illustrating the control valve.

Referring to FIGS. 19 and 20, condensate water supplied through a water supply pipe 180 connected between an outlet port of the pump 150 and an inlet port 161 of the control valve 160 may be discharged through a plurality of water supply ports 181, 182, 183 and a drain port 184 provided in the control valve 160. The inlet port 161 may be disposed at a valve case 165 in which a plate member 167 is provided, and the water supply ports and the drain port may be formed at a port portion 168 coupled to the valve case 165. The plate member 167 may be mounted to be rotatable by a motor 166 installed on one end portion of the valve case 165, and have a cutout portion 167*a*.

In addition, the water supply ports and the drain port may be arranged in the port portion 168 radially at 90° intervals. Accordingly, a flow path of the condensate water supplied through the inlet port 161 may be determined depending on the position of the cutout portion 167*a*. In the state shown in FIG. 20, the condensate water may be discharged to the water supply port 162, and the position of the cutout portion 167*a* may be controlled by a control unit (not illustrated).

Figure 17:
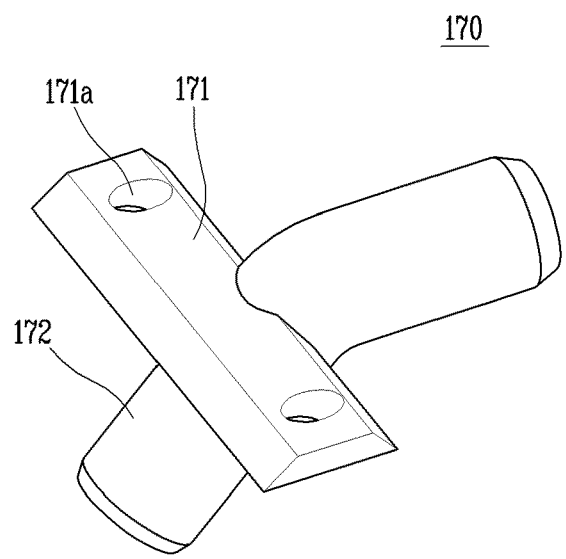
FIG. 17 is a perspective view illustrating an injection pipe in the implementation.
Figure 18:
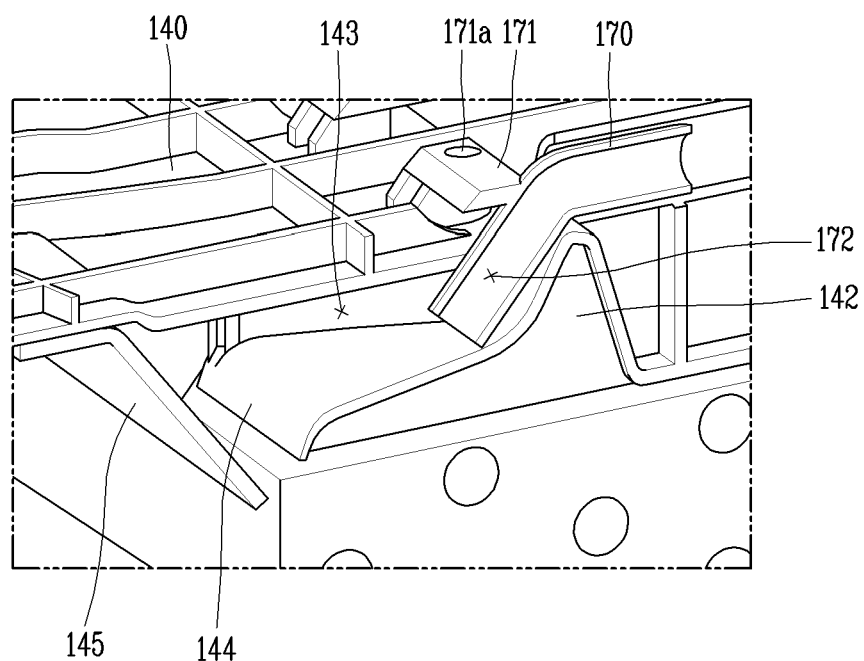
FIG. 18 is a partial cut-away view illustrating an installation structure of the injection pipe.

In this way, the condensate water that has passed through the control valve 160 may be supplied into injection pipes 170 through three water supply pipes 181, 182, and 183. Referring to FIGS. 17 and 18, each of the injection pipes 170 may have a shape with a central portion bent and include a coupling portion 171 integrally extending to both sides thereof. The coupling portion 171 may have a plate-like shape extending in one direction, and be provided with coupling holes 171*a* formed on portions near both ends thereof such that the injection pipe 170 is coupled with the cover plate 140 by bolts.

An outlet port 172 of the injection pipe 170 may penetrate through the cover plate 140 to protrude to a lower surface of the cover plate 140. In addition, a diffuser 142 that defines a flow path of condensate water discharged from the outlet port 172 of the injection pipe 170 may be positioned on the lower surface of the cover plate 140. Here, the diffuser 142 may be integrally formed with the cover plate 140 as illustrated, or may be separately manufactured to be fixed to the lower surface of the cover plate 140.

A channel 143 as a flow path through which the injected condensate water flows may be formed in the diffuser 142, and a width of the channel 143 may increase toward an outlet 144. In addition, the outlet 144 of the channel 143 may be bent downward to face the front of the evaporator 121. Accordingly, the flow of the condensate water discharged through the injection pipe 170 may be made stable while the condensate water flows along the channel 143 of the diffuser 142. The condensate water may then drop onto a front part of the evaporator along the shape of the outlet 144. That is, immediately after the condensate water is discharged from the injection pipe, the condensate water may flow fast due to pressure of the pump so as to be scattered more due to collision with a wall surface.

As the condensate water is scattered more, an amount of condensate water guided to the surface of the evaporator may decrease. Accordingly, the condensate water may be supplied to the evaporator after stabilizing the flow of the condensate water by lowering the flow rate while the condensate water is flowing along the diffuser, thereby utilizing the supplied condensate water as much as possible. However, for this, the channel of the diffuser must secure a sufficient length, but such sufficient length may not be secured in some cases. To solve this problem, a guide plate 145 disposed to be spaced apart from the outlet 144 may be installed on the lower surface of the cover plate 140. The guide plate 145 may be inclined downward to face the front surface of the evaporator 121. Accordingly, the condensate water discharged through the outlet 144 may be discharged to the front surface of the evaporator by the guide plate 145 even if some of the condensate water are scattered.

Here, a range that the condensate water discharged by each of the diffusers reaches may be set to be smaller than a total area of the evaporator. Therefore, condensate water injected by one diffuser may reach only a part of the evaporator rather than the entire evaporator. However, regions that condensate water injected by three diffusers reaches may be different from one another, as illustrated. One diffuser may not clean the entire region of the evaporator. However, the entire region of the evaporator can be cleaned by adding the ranges that the condensate water injected through the respective diffusers reaches.

Here, the entire region of the evaporator does not necessarily mean all regions of the front surface of the evaporator, and it should be considered to include even a region in which lint particles contained in hot air may accumulate.

Meanwhile, when more than an appropriate amount of condensate water is stored in the condensate water storage unit, it must be drained to maintain an appropriate water level. Therefore, when a detection device such as a water level sensor (not illustrated) detects that the amount of condensate water in the condensate water storage portion is more than an appropriate amount, the condensate water must be drained through the drain port 164 of the control valve 160 using the pump 150. The condensate water drained in this way may be discharged to the outside of the cabinet through the drain pipe 184, so that the amount of condensate water in the condensate water storage portion can be adjusted.

Figure 21:
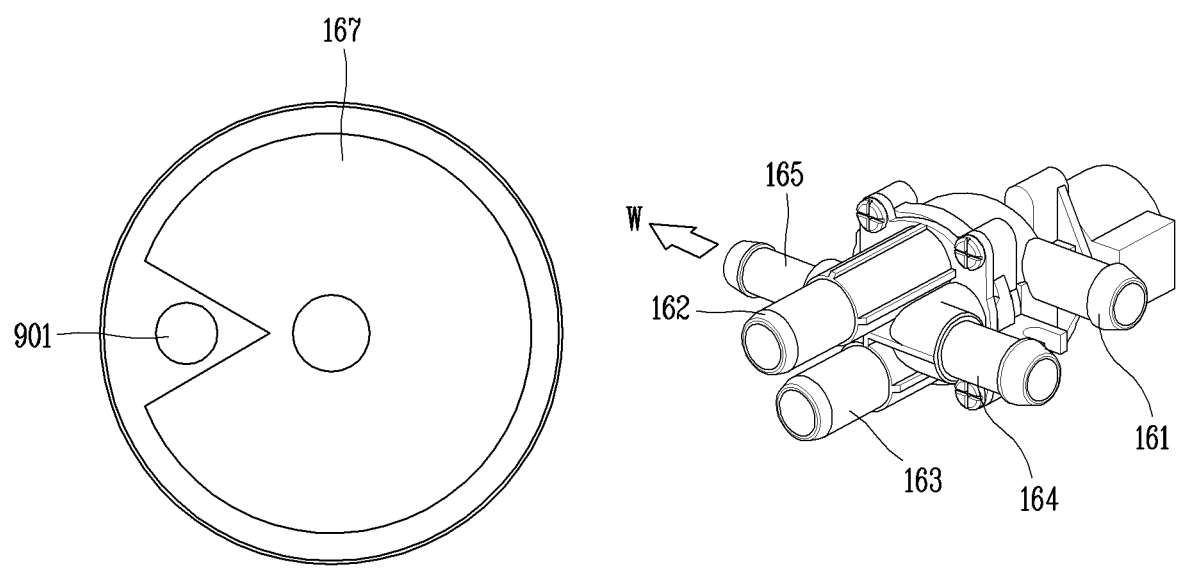
FIG. 21 is a conceptual view (1) illustrating an operating state of a valve unit in accordance with the implementation of the clothes treatment apparatus and the control method therefor according to the present disclosure.

However, if a drainage facility such as a sewer is not provided in a place where a dryer is installed, drainage to the outside of the cabinet may not be allowed. Therefore, as illustrated in FIG. 21, a condensate water storage tank 109 for storing condensate water may be provided in an upper portion of the cabinet to communicate with the drain pipe 184 such that the condensate water can be stored in the storage tank 109. The condensate water stored in the condensate water storage tank 109 may be drained out by a user or used when condensate water is insufficient after removing foreign substances through a filter or the like. Hereinafter, an operation of a cleaning device to which the implementation is applied will be described.

When it is necessary to remove lint particles collected on the surface of the evaporator, the control unit may detect an amount of condensate water stored in the condensate water storage portion. When the detected amount of condensate water is more than a minimum amount required for cleaning the evaporator (here, the minimum amount corresponds to an amount that allows cleaning of a relevant level for an evaporator region assigned to one diffuser, and may be arbitrarily set by a person skilled in the art), the condensate water may be injected (sprayed) on the surface of the evaporator by operating the pump and the control valve. At this time, the control valve may sequentially rotate the plate member to control the condensate water supplied by the pump to be sequentially injected through each diffuser.

That is, as the plate member rotates, the water supply port or the drain port facing the cutout portion may communicate with the inlet port, so that the condensate water is discharged from the control valve through the corresponding port. The discharged condensate water may be injected on the surface of the evaporator through the injection pipe and the diffuser, and a part of the evaporator located within an injection range of the condensate water may be cleaned by the injected condensate water. Therefore, when the condensate water is sequentially injected through the respective diffusers, the surface of the heat exchanger may also be cleaned sequentially, that is, with a time difference.

Here, the number of injection pipes for injecting condensate water simultaneously may vary depending on the number of cutout portions formed through the plate member. That is, when there are three cutout portions, injection may be carried out through two diffusers at the same time. The number of cutout portions may be arbitrarily set according to the capacity of the pump and the use of the dryer.

If the amount of condensate water is insufficient to clean the entire evaporator, the location of a diffuser by which cleaning or washing has not been completely done, namely, which has made the number of injections less than the other diffusers due to an insufficient remaining amount of condensate water, may be recorded in a memory provided inside the control unit. Afterwards, when the condensate water is sufficiently stored, the corresponding diffuser may be controlled to inject the condensate water first.

On the contrary, when the amount of condensate water is insufficient to clean the entire evaporator, it may be possible to consider an example of washing or cleaning the entire region of the evaporator by adjusting an injection amount, other than injecting the condensate water only to a partial region.

Meanwhile, the implementation illustrates that only the condensate water is used to clean or wash the evaporator, but a case of using an external water supply source such as a water supply service may also be considered. That is, an external water supply source may be connected to an additional inlet port further provided in the control valve or to an additional water supply pipe branched from the water supply pipe connected to the inlet port, to wash or clean the evaporator using water supplied from the external water supply source.

Here, an example may also be considered in which an ON/OFF valve for blocking a flow path to control the supply of water from an external water supply source is provided in a water supply pipe connected to the external water supply source, to perform cleaning or washing of the evaporator only using condensate water when the condensate water are sufficient or using both condensate water and external water by opening the ON/OFF valve when the condensate water is insufficient.

In addition, various types of cleaning nozzles may be used.

Hereinafter, an operating state of the control valve 160 will be described with reference to FIGS. 21 to 24. For reference, the control valve 160 may also be defined as a valve unit.

Referring to FIG. 21, the control valve 160 may include a plurality of condensate water ports 162, 163, 164, and 165.

Specifically, the control valve 160 may include a first port 165 connected to the outside of the clothes treatment apparatus. The control unit 380 may control the control valve 160 to open the first port 165 in order to perform a drain operation of the clothes treatment apparatus.

That is, when the first port 165 is opened, water flowing in the flow path connected to the control valve 160 may be drained to the outside of the clothes treatment apparatus.

The control valve 160 may further include a second port 163, a third port 164 and a fourth port 162 that are disposed to inject water toward the heat pump.

Specifically, each of the second to fourth ports may be configured so that water is injected to a part of the heat pump. For example, water injected from the second port 163 may come in contact with (seated on) a first portion of the outer surface of the evaporator of the heat pump. In another example, water injected from the third port 164 may come in contact with a second portion of the outer surface of the evaporator. The first portion and the second portion may be different from each other.

The control unit 380 may control a motor provided in the control valve 160 to rotate the plate member 167 provided in the control valve 160. In this case, the motor provided in the control valve 160 may be configured separately from the first to third motors corresponding to the first to third inverters.

As illustrated in FIG. 21, when the posture of the plate member 167 is a first posture of opening a first hole 901 connected to the first port 165 in the control valve 160, water W may be injected from the first port 165.

As such, when the plate member 167 is in the first posture, an operating state of the control valve 160 may be defined as a first state.

Figure 22:
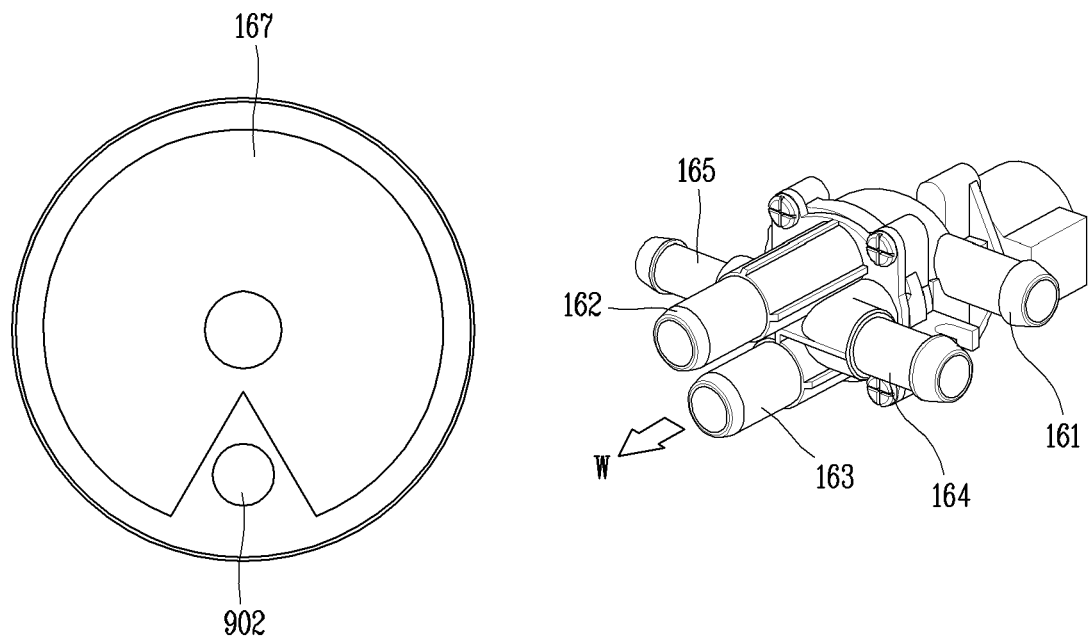
FIG. 22 is a conceptual view (2) illustrating the operating state of the valve unit in accordance with the implementation of the clothes treatment apparatus and the control method therefor according to the present disclosure.

In addition, as illustrated in FIG. 22, when the posture of the plate member 167 is a second posture of opening a second hole 902 connected to the second port 163 in the control valve 160, water W may be injected from the second port 163.

As such, when the plate member 167 is in the second posture, the operating state of the control valve 160 may be defined as a second state.

Figure 23:
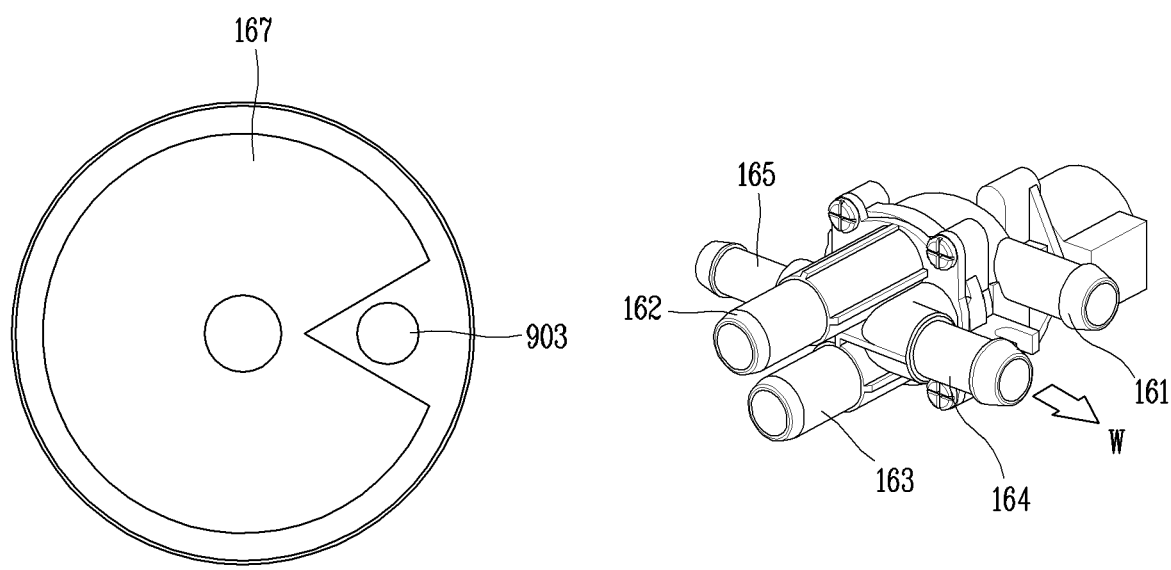
FIG. 23 is a conceptual view (3) illustrating an operating state of a valve unit in accordance with the implementation of the clothes treatment apparatus and the control method therefor according to the present disclosure.

Also, as illustrated in FIG. 23, when the posture of the plate member 167 is a third posture of opening a third hole 903 connected to the third port 164 in the control valve 160, water W may be injected from the third port 164.

As such, when the plate member 167 is in the third posture, the operating state of the control valve 160 may be defined as a third state.

Figure 24:
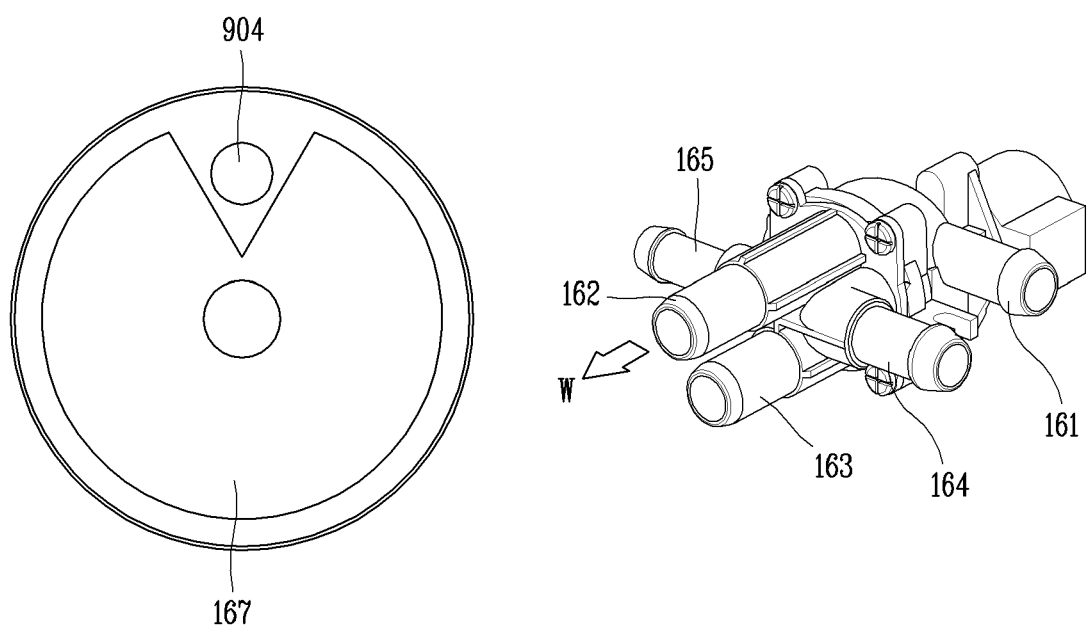
FIG. 24 is a conceptual view (4) illustrating the operating state of the valve unit according to the implementation of the clothes treatment apparatus and the control method therefor according to the present disclosure.

As illustrated in FIG. 24, when the posture of the plate member 167 is a fourth posture of opening a fourth hole 904 connected to the fourth port 162 in the control valve 160, water W may be injected from the fourth port 162.

As such, when the plate member 167 is in the fourth posture, the operating state of the control valve 160 may be defined as a fourth state.

[Clothes Treatment Apparatus and Method for Controlling the Same]

Hereinafter, implementations of a clothes treatment apparatus and a method for controlling the same according to the present disclosure will be described, and the description of the like portions will be omitted to avoid redundant description if possible.

Figure 25:
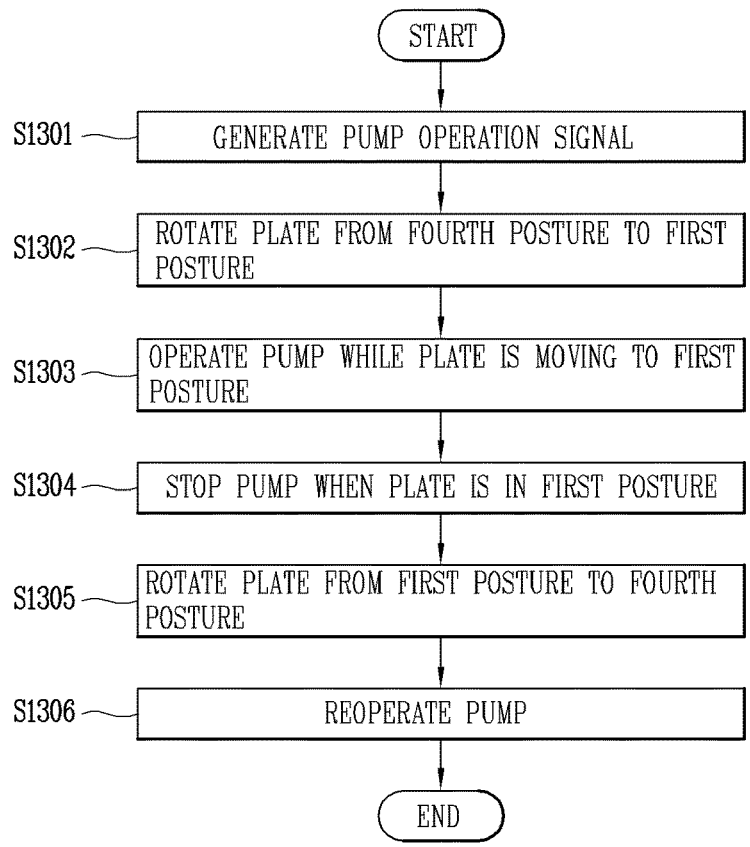
FIG. 25 is a flowchart (1) illustrating a control method in accordance with an implementation of a clothes treatment apparatus and a control method therefor according to the present disclosure.

First, one implementation of a clothes treatment apparatus and a method for controlling the same will be described with reference to FIG. 25.

A clothes treatment apparatus 1000 according to one implementation may include a main body defining an outer appearance, a drum 301 rotatably installed inside the main body and accommodating an object (or objects) to be dried, a compressor 1120 of a heat pump 303 for compressing refrigerant such that moisture-removed air circulates to the drum via a condenser and an evaporator when the moisture is removed from heated air absorbed from the object to be dried, a blower fan 302 for generating a flow of the heated air or the moisture-removed air, a driving unit having a plurality of motors for providing driving force to the drum 301, the blower fan 302, and the compressor 1120, a cleaning unit for injecting (or spraying) condensate water generated in the evaporator onto a surface of the evaporator to remove foreign substances that accumulate on the surface of the evaporator while the heated air passes through the evaporator, a valve unit having a plurality of condensate water ports to define a part of paths along which the condensate water flows, and a control unit 380 for controlling an operation of the valve unit based on an operating state of the cleaning unit.

Also, the control unit 380 may control an operation of a control valve 160 (see FIG. 20) based on the operating state of the cleaning unit.

Specifically, when a first port 165 is open, the control unit 380 may control the operation of the cleaning unit so that external air is not introduced.

For example, the control unit 380 may stop an operation of a pump of the cleaning unit while the first port is open.

In another example, when it is determined that the first port has been open, the control unit 380 may adjust an output of the pump so that negative pressure is not generated in the clothes treatment apparatus.

In another example, while a plate member 167 is rotating, the control unit 380 may operate the pump of the cleaning unit until the first port 165 is open.

In another example, when the first port 165 is open, the control unit 380 may stop the pump of the cleaning unit for a preset period.

At this time, the control unit 380 may monitor an operation of a motor connected to the plate member 167, and determine to which of first to fourth postures a current posture of the plate member 167 corresponds based on a monitoring result. Also, the control unit 380 may determine which port has been open among the first to fourth ports, based on the posture of the plate member 167.

Meanwhile, the control unit 380 may control the operation of the control valve 160 so that the fourth port 162 is open before the cleaning unit starts a cleaning operation.

In one implementation, the control unit 380 may control the operation of the control valve 160 so that the fourth port 162 is open at the time when the cleaning unit first operates or when a drain operation is started.

That is, the control unit 380 may set the fourth posture of the plate member 167 as a reference posture, and may maintain the operating state of the control valve 160 in a fourth state when the cleaning unit does not perform any separate operation.

In addition, when a command for starting the cleaning operation of the cleaning unit is generated, the control unit 380 may control the pump of the cleaning unit according to the operating state of the control valve 160 while switching the state of the control valve 160.

Specifically, when the cleaning operation is started, the control unit 380 may operate the motor of the control valve to switch the state of the control valve 160 from the open state of the fourth port 162 to the open state of the first port 162.

That is, the control unit 380 may gradually rotate the plate member 167 to open the fourth port 162, the third port 165, the second port 164, and the first port 162 in a sequential manner.

Meanwhile, the control unit 380 may control the rotation of the plate member 167 such that an open state of one of the first to fourth ports is maintained for a preset time interval.

In one implementation, the control unit 380 may stop the rotation of the plate member 167 for a predetermined time interval and restart the rotation of the plate member 167 each time when the plate member 167 opens the first to fourth holes 901, 902, 903, and 904.

In addition, the control unit 380 may rotate the plate member 167 in a reverse direction to restore the posture of the plate member 167 to the fourth posture when the preset time interval (time period) elapses after the first port is open.

Although not illustrated, a partition wall (not illustrated) may be provided between the first hole and the fourth hole to prevent the rotation of the plate member 167.

Due to this partition wall, the control unit 380 can no longer reversely rotate the plate member of the control valve in the fourth state. Likewise, the partition wall may apply an external force to the plate member to prevent the plate member of the control valve in the first state from rotating forward any more.

In addition, in order to adjust the posture of the plate member to the reference posture, the control unit 380 may rotate the plate member in the reverse direction for a predetermined period of time without considering the current position of the plate member.

In one example, when a preset period elapses after the first port 165 is open, the control unit 380 may rotate the plate member 167 such that the state of the control valve 160 is switched from the open state of the first port 165 to the open state of the fourth port 162.

Hereinafter, one implementation related to the control method will be described with reference to FIG. 25.

First, the control unit 380 may determine whether a pump operation signal is generated (S1301).

In one example, the control unit 380 may generate a pump operation signal when it is determined that a drain operation of the clothes treatment apparatus is required.

In another example, the control unit 380 may generate a pump operation signal when it is determined that an internal cleaning operation of the clothes treatment apparatus is required.

In addition, when the pump operation signal is generated, the control unit 380 may rotate the plate member 167 to be switched from the fourth posture to the first posture (S1302).

In addition, the control unit 380 may start the operation of the pump while the plate member is moving to the first posture (S1303).

While rotating the plate member, the control unit 380 may determine whether the posture of the plate member has entered the first posture. When the posture of the plate member has entered the first posture, the control unit 380 may stop the operation of the pump (S1304).

After stopping the operation of the pump for a predetermined time, the control unit 380 may rotate the plate member to be switched back to the fourth posture (S1305).

When the plate member is switched from the first posture to the second posture, the control unit 380 may restart the operation of the pump (S1306).

According to the implementation, when a cleaning operation for the heat pump is performed, the pump may be operated according to an operating state of a valve, thereby preventing an introduction of external air into a circulation flow path connected to the valve or the pump. In addition, drainage and cleaning operations may be carried out in consideration of whether the valve unit is connected to the outside of the clothes treatment apparatus, thereby preventing a failure of the clothes treatment apparatus.

Figure 27:
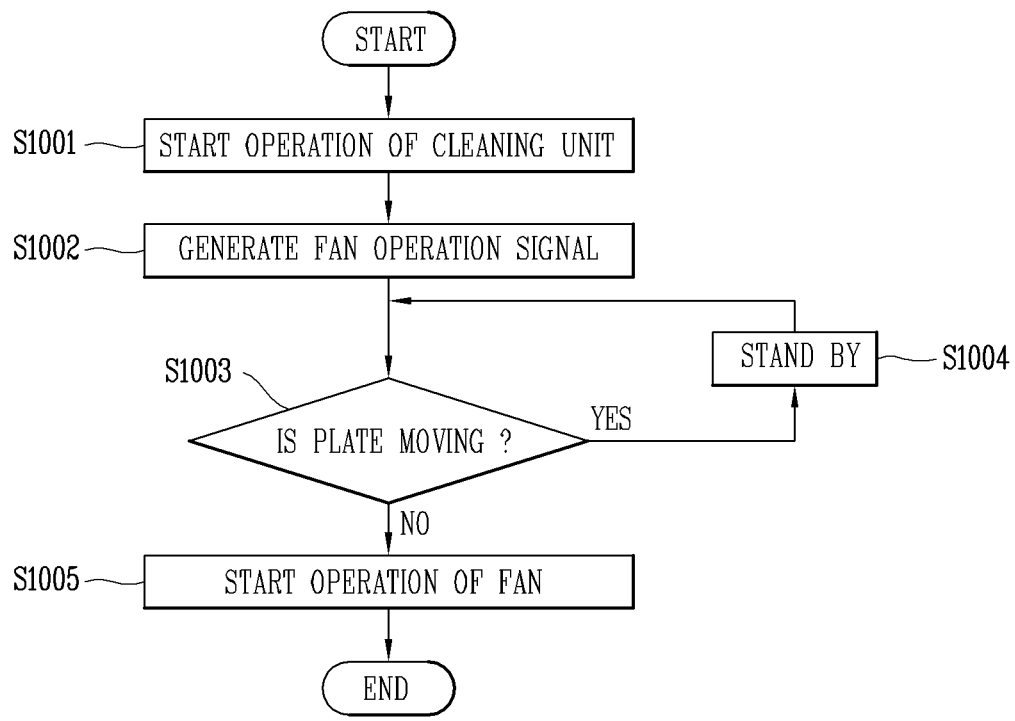
FIG. 27 is a flowchart (3) illustrating a control method in accordance with the implementation of the clothes treatment apparatus and the control method therefor according to the present disclosure.
Figure 28:
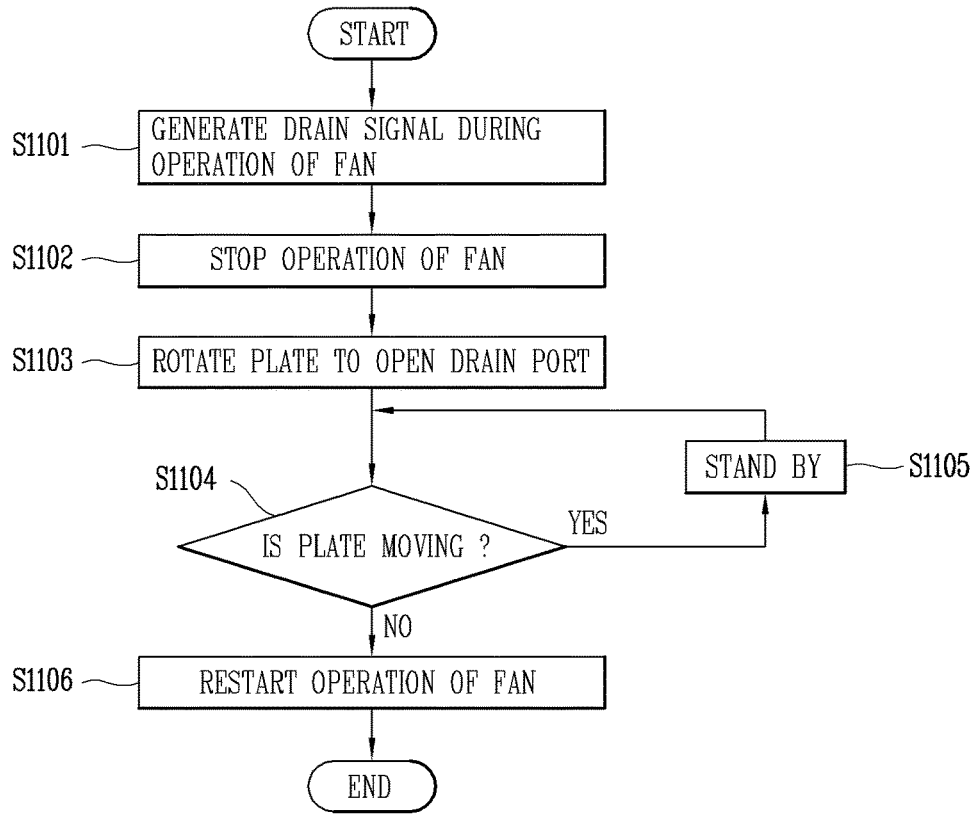
FIG. 28 is a flowchart (4) illustrating a control method in accordance with the implementation of the clothes treatment apparatus and the control method therefor according to the present disclosure.

Hereinafter, another implementation of a clothes treatment apparatus and a method for controlling the same will be described with reference to FIGS. 26 to 28.

A clothes treatment apparatus 1000 according to another implementation may include a main body defining an outer appearance, a drum 301 rotatably installed inside the main body and accommodating an object (or objects) to be dried, a compressor 1120 of a heat pump 303 for compressing refrigerant such that moisture-removed air circulates to the drum via a condenser and an evaporator when the moisture is removed from heated air absorbed from the object to be dried, a blower fan 302 for generating a flow of the heated air or the moisture-removed air, a driving unit having a plurality of motors for providing driving force to the drum 301, the blower fan 302, and the compressor 1120, a cleaning unit for injecting (or spraying) condensate water generated in the evaporator onto a surface of the evaporator to remove foreign substances that accumulate on the surface of the evaporator while the heated air passes through the evaporator, and a control unit 380 for controlling the operation of the cleaning unit and changing a rotational speed of the blower fan based on the operation of the cleaning unit.

This implementation of the clothes treatment apparatus 1000 may be an implementation related to a method of controlling an operation (driving) of a blower fan or a drying fan during a process of performing a cleaning operation using the aforementioned control valve.

Figure 26:
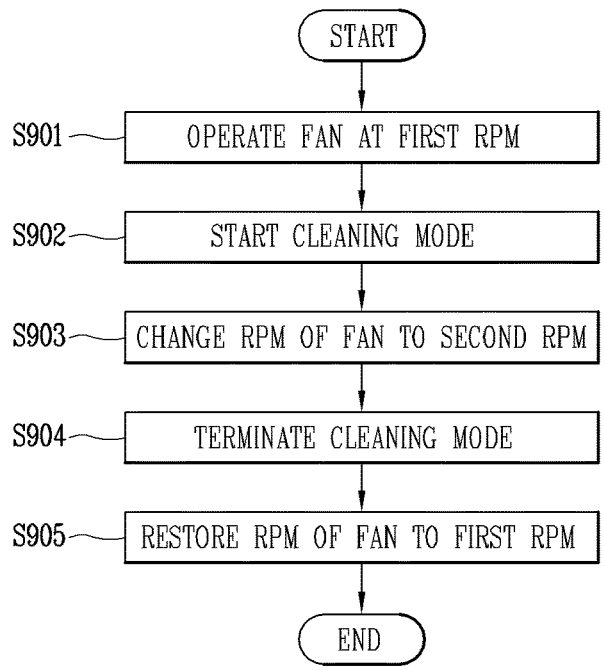
FIG. 26 is a flowchart (2) illustrating a control method in accordance with the implementation of the clothes treatment apparatus and the control method therefor according to the present disclosure.

Referring to FIG. 26, the control unit 380 may operate a fan at a first rotational speed (rpm) (S901). At this time, the fan driven by the control unit 380 may be a blower fan for introducing heated air into the drum, or a drying fan for drying the inside of the cabinet.

That is, the control unit 380 may rotate the blower fan or the drying fan at a preset first RPM based on an operation mode of the clothes treatment apparatus.

In addition, the control unit 380 may operate the control valve 160 and the pump to start a cleaning mode for cleaning the heat pump of the clothes treatment apparatus (S902).

For example, when a water level of a condensate water storage portion exceeds a preset reference water level, the control unit 380 may start a cleaning mode for cleaning the heat pump of the clothes treatment apparatus.

When it is determined that the cleaning mode has been started, the control unit 380 may change the RPM of the fan to a second RPM (S903).

In this case, the second RPM may preferably be set to be slower than the first RPM.

In addition, the control unit 380 may determine whether the cleaning mode has been terminated. When it is determined that the cleaning mode has been terminated (S904), the control unit 380 may restore the RPM of the fan to the first RPM (S905).

In this way, as long as the rotational speed of the fan is variably controlled upon entering the cleaning mode, the situation that cleaning water is shaken by wind, thereby enhancing a cleaning effect.

That is, in the clothes treatment apparatus according to the present disclosure, the capacity of the drum may increase and an output of the blower fan may increase, which may result in an increase in the influence of the wind on the cleaning water. Therefore, by introducing the method of controlling the RPM of the fan, which is applied during the cleaning mode, the cleaning water can be accurately settled on an object to be cleaned.

A clothes treatment apparatus according to one implementation may include a cleaning unit for injecting (or spraying) condensate water generated in an evaporator onto a surface of the evaporator to remove foreign substances accumulating on the surface of the evaporator while heated air passes through the evaporator, and a control unit for controlling an operation of the cleaning unit and changing a rotational speed (RPM) of a blower fan based on the operation of the cleaning unit.

Specifically, the cleaning unit may include a condensate water storage portion, an injection flow path connected to the condensate water storage portion, a pump for supplying condensate water from the condensate water storage portion to one end of the injection flow path, and a cleaning nozzle for injecting the condensate water supplied from the pump onto a surface of a front part of the evaporator.

The control unit 380 may control the second inverter and the second motor to reduce the RPM of the blower fan when the condensate water is injected from the cleaning nozzle by operating the pump.

In addition, the control unit 380 may control the second motor corresponding to the blower fan so that the RPM of the blower fan is restored to a speed before the pump is operated when the operation of the pump for injecting the condensate water is terminated.

Meanwhile, the clothes treatment apparatus according to the present disclosure may further include a valve unit defining a part of a path through which the condensate water flows.

In one example, the valve unit may include a valve case, a plurality of condensate water ports protruding from the valve case to set flow paths of the condensate water, a plate member rotatably disposed inside the valve case to block at least some of the plurality of condensate water ports, and a motor for rotating the plate member.

The control unit 380 may control the blower fan 302 to be operated after the rotation of the plate member is completed. Similarly, the control unit 380 may variably set an operation time point of the drying fan such that the operation of the drying fan is started after the rotation of the plate member is completed.

In one example, any one of the plurality of condensate water ports may be connected to the outside of the clothes treatment apparatus. When the blower fan is operated while the condensate water port connected to the outside is open, negative pressure may be generated inside the clothes treatment apparatus and external air may be introduced, thereby causing a failure of the drain pump.

Accordingly, the control unit 380 may control the motor of the valve unit such that the plate member is switched from a first state in which one condensate water port connected to the outside is open among the plurality of condensate water ports into a second state in which another one of the plurality of condensate water ports is open. When the state of the plate member is completely switched, the control unit 380 may control the blower fan to be operated.

In particular, the control unit 380 may set start point of operating the blower fan based on a rotation angle of the plate member. That is, the control unit 380 may determine which one of the plurality of condensate water ports has been opened based on an angle by which the plate member has been rotated from its initial posture or the reference posture. In addition, when the rotation angle of the plate member enters a predetermined range, the control unit 380 may control the second motor to operate the blower fan.

Meanwhile, the control unit 380 may stop the operation of the blower fan before the condensate water is drained to the outside by the operation of the pump.

Hereinafter, another implementation related to the control method of the clothes treatment apparatus will be described with reference to FIG. 27.

First, the control unit 380 may control the pump of the cleaning unit and the valve unit such that the operation of the cleaning unit is started when a predetermined condition is satisfied (S1001).

Specifically, the control unit 380 may operate the pump so that the condensate water is injected toward the heat pump, and rotate the plate member of the valve unit to determine a port through which the condensate water is to be injected.

On the other hand, when a fan operation signal is generated during the cleaning operation (S1002), the control unit 380 may determine whether the plate member is moving by detecting an output of the motor moving the plate member (S1003).

Here, the fan may be a blower fan or a drying fan for drying the inside of the cabinet.

When the fan operation signal is generated, the control unit 380 may stand by without operating the fan according to whether the plate member is moving (S1004) or may start the operation of the fan after the movement of the plate member is terminated (S1005).

In this way, the control unit 380 may prevent the fan from being operated while the plate member is moving.

Hereinafter, another implementation related to the control method of the clothes treatment apparatus will be described with reference to FIG. 28.

Unlike FIG. 27, in FIG. 28, the operation of the controller 380 when a drain signal is generated during the operation of the fan (S1101) will be described.

When a drain signal is generated, the control unit 380 may stop the operation of the fan (S1102).

In addition, the control unit 380 may rotate the plate member to open the drain hole or the drain flow path (S1103).

Thereafter, the control unit 380 may determine whether the plate member is moving (S1104), and may determine whether to restart the operation of the fan according to the determination result.

That is, the control unit 380 may maintain the fan in a stopped state while the plate member is moving (S1105) and restart the operation of the fan after the movement of the plate member is completed (S1106).

According to this implementation, when the cleaning operation for the heat pump is performed, the rotational speed of the fan may be adjusted, so as to increase a cleaning effect for the heat pump, prevent water overflow due to introduction of air into the clothes treatment apparatus, and also prevent the phenomenon that water is drawn to one side in the clothes treatment apparatus.

Hereinafter, another implementation of a clothes treatment apparatus and a method for controlling the same will be described with reference to FIGS. 29 to 31.

A clothes treatment apparatus 1000 according to another implementation may include a main body defining an outer appearance, a drum 301 rotatably installed inside the main body and accommodating an object (or objects) to be dried, a compressor 1120 of a heat pump 303 for compressing refrigerant such that moisture-removed air circulates to the drum 301 via a condenser and an evaporator when the moisture is removed from heated air absorbed from the object to be dried, a blower fan 302 for generating a flow of the heated air or the moisture-removed air, a driving unit having a plurality of motors for providing driving force to the drum 301, the blower fan 302, and the compressor 1120, a condensate water storage unit for storing condensate water generated in the evaporator, a water level sensor for detecting a water level of the condensate water storage unit, and a control unit 380 for determining whether the water level of the condensate water storage unit has reached a full water level based on an output of the water level sensor 380, and redetect the water level of the condensate water storage unit using the water level sensor in a state where the operation of the compressor 1120 is stopped.

Hereinafter, the related art method of detecting the water level of the condensate water stored in the condensate water storage unit when the cleaning operation of the clothes treatment apparatus is performed will be described with reference to FIG. 29.

First, the control unit 380 may control the control valve and the pump so that the cleaning unit performs a cleaning operation (S401).

Specifically, when cleaning of the heat pump is required, the control unit 380 may generate a signal for starting the cleaning operation of the cleaning unit.

When the cleaning operation of the cleaning unit is started, the control unit 380 may detect the output of the water level sensor every preset period (S402).

The control unit 380 may generate error information corresponding to the cleaning operation based on the output of the water level sensor (S403). When the error information is generated, the control unit 380 of the related art clothes treatment apparatus may stop the operation of the clothes treatment apparatus (S404).

Figure 29:
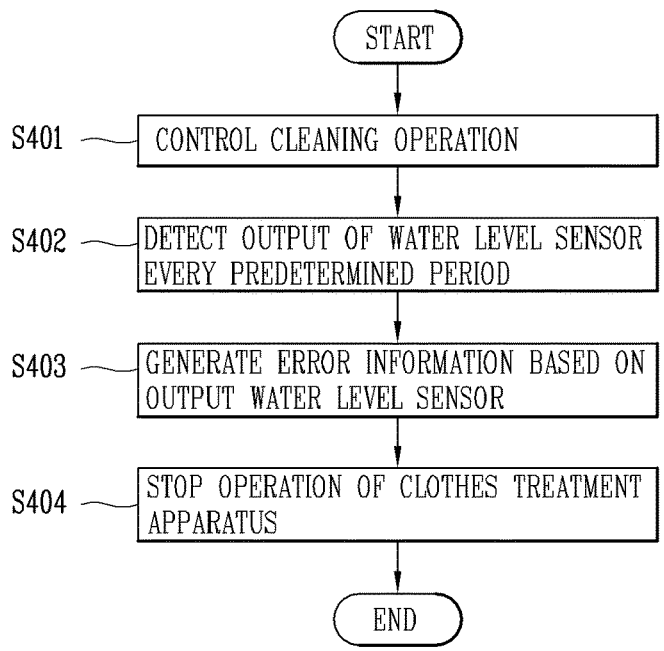
FIG. 29 is a flowchart illustrating a control method of a clothes treatment apparatus according to the related art.

However, in the method illustrated in FIG. 29, when error information related to the water level sensor occurs during the cleaning operation, the operation of the clothes treatment apparatus may immediately be stopped. This causes a problem that the operation of the clothes treatment apparatus is ended without completely drying an object to be dried accommodated in the main body.

Accordingly, in order to solve the above problem, the present disclosure proposes a control method for a clothes treatment apparatus for verifying error information related to a water level sensor and transmitting the error information to a user.

That is, the control unit of the clothes treatment apparatus according to the present disclosure may perform a first monitoring process of determining whether the water level of the condensate water storage unit reaches the full water level based on the output of the water level sensor that detects the water level of the condensate water storage unit. In addition, when it is determined in the first monitoring process that the condensate water storage unit is at the full water level, the control unit may perform a second monitoring process of redetecting the water level of the condensate water storage unit using the water level sensor in a state in which the compressor is stopped.

The control unit may verify the result of the first monitoring process by undergoing the second monitoring process.

Figure 30:
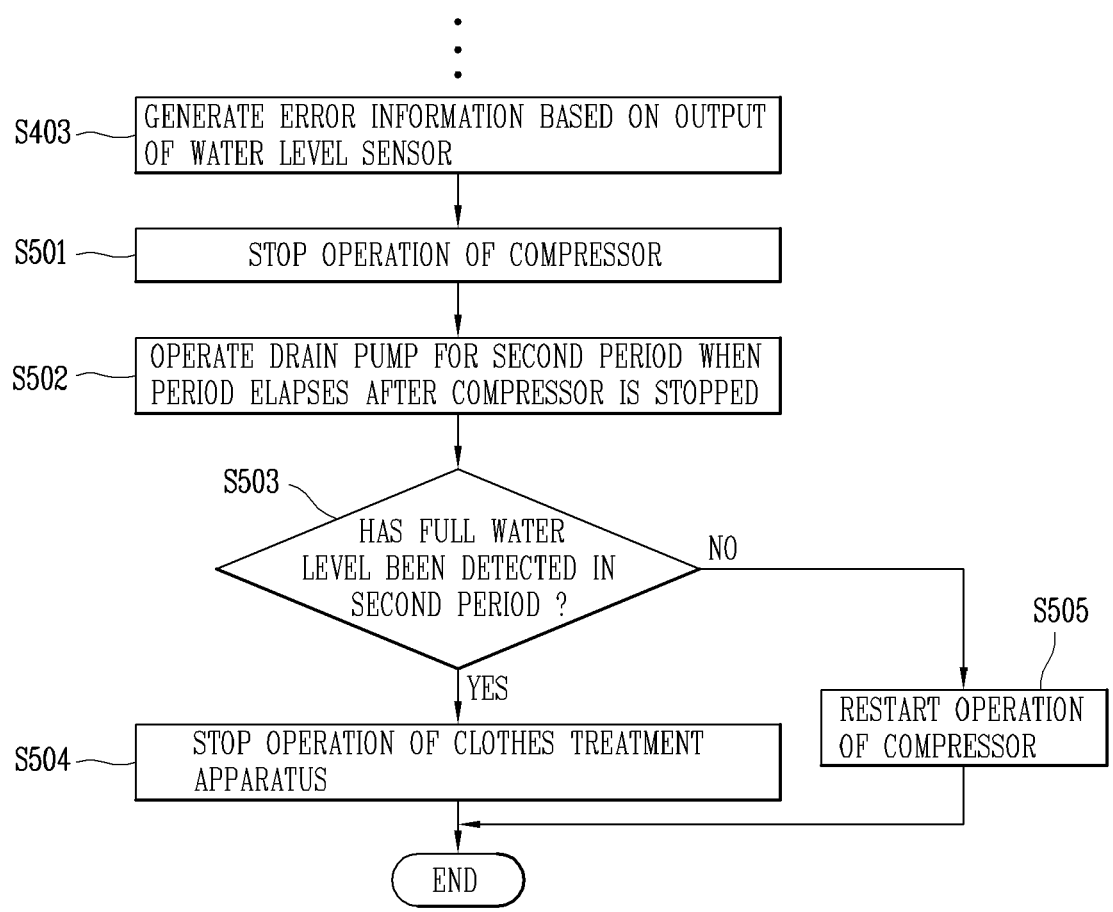
FIG. 30 is a flowchart (5) illustrating a control method in accordance with the implementation of the clothes treatment apparatus and the control method therefor according to the present disclosure.

FIG. 30 illustrates an implementation related to the control method for the clothes treatment apparatus.

Referring to FIG. 30, after generating error information corresponding to the cleaning operation based on the output of the water level sensor (S403), the control unit 380 may stop the operation of the compressor (S501).

In an implementation, when the output of the water level sensor is not included in a preset range, the control unit 380 may determine that the drain operation for the condensate water storage unit has not been normally performed. The control unit 380 may generate the error information when it is determined that the drain operation for the condensate water storage unit has not been normally performed.

In another implementation, when the water level of the condensate water storage unit determined by the output of the water level sensor exceeds a preset limit water level, the control unit 380 may determine that the condensate water storage unit is at the full water level. The control unit 380 may generate the error information when it is determined that the condensate water storage unit is at the full water level after the drain operation is performed.

In another implementation, when the output of the water level sensor is less than a preset limit value, the control unit 380 may determine that the condensate water storage unit is at the full water level. Specifically, the water level sensor disclosed in the present disclosure may be designed to output a lower value as the water level increases more. However, the technical idea of the present disclosure is not limited thereto, and the method of determining the full water level may variously change depending on the design method of the water level sensor.

In addition, the control unit 380 may stop the operation of the compressor when the error information is generated as illustrated in the aforementioned implementations. In this case, the control unit 380 may keep operating other components of the clothes treatment apparatus, except for the compressor, as before generating the error information.

In addition, the control unit 380 may stop the operation of the compressor based on the number of times the error information is generated. In one example, the control unit 380 may stop the operation of the compressor when error information is generated four times using the output of the water level sensor.

Next, when the operation of the compressor is stopped, the control unit 380 may operate the drain pump for a preset second period (S502).

In one example, the control unit 380 may operate the drain pump during the second period when a preset first period elapses after the compressor is stopped. The control unit 380 may operate the drain pump at a constant speed during the second period, or may operate it according to a predetermined pattern.

The first period may be set to be longer than the second period. For example, the first period may be set to 60 seconds, and the second period may be set to 30 seconds.

The control unit 380 may monitor the water level sensor for a preset third period after the operation of the drain pump is terminated, and control the operation of the compressor based on the monitoring result.

Specifically, when the second period elapses, the control unit 380 may determine whether the water level of the condensate water storage unit exceeds a preset limit water level based on the output of the water level sensor within the third period (S503). That is, the control unit 380 may detect whether the water level of the condensate water storage unit reaches the full water level during the third period after the operation of the drain pump is terminated.

Thereafter, the control unit 380 may stop the operation of the clothes treatment apparatus when the output of the water level sensor exceeds the preset limit value within the third period (S504).

In one example, the control unit 380 may maintain the compressor in a stopped state and terminate the operation of the clothes treatment apparatus when the water level of the condensate water storage unit reaches the full water level within the third period after the operation of the drain pump is terminated.

In another example, the control unit 380 may calculate the number of times that the output of the water level sensor exceeds the limit value during the third period. When the calculated number of times exceeds a preset limit number of times, the control unit 380 may maintain the compressor in the stopped state and terminate the operation of the clothes treatment apparatus. In this case, the control unit 380 may set the third period to 60 seconds and set the limit number of times to 10 times.

On the other hand, when the water level of the condensate water storage unit does not reach the full water level within the third period, the control unit 380 may restart the operation of the compressor (S505).

In one implementation, the control unit 380 may store information related to a rotational frequency at the time when the operation of the compressor is stopped. That is, the control unit 380 may memorize the rotational frequency of the compressor before stopping the operation of the compressor by the first monitoring process.

Thereafter, the control unit 380 may set the rotational frequency when the operation of the compressor is restarted, using information related to the rotational frequency before stopping the compressor.

Figure 31:
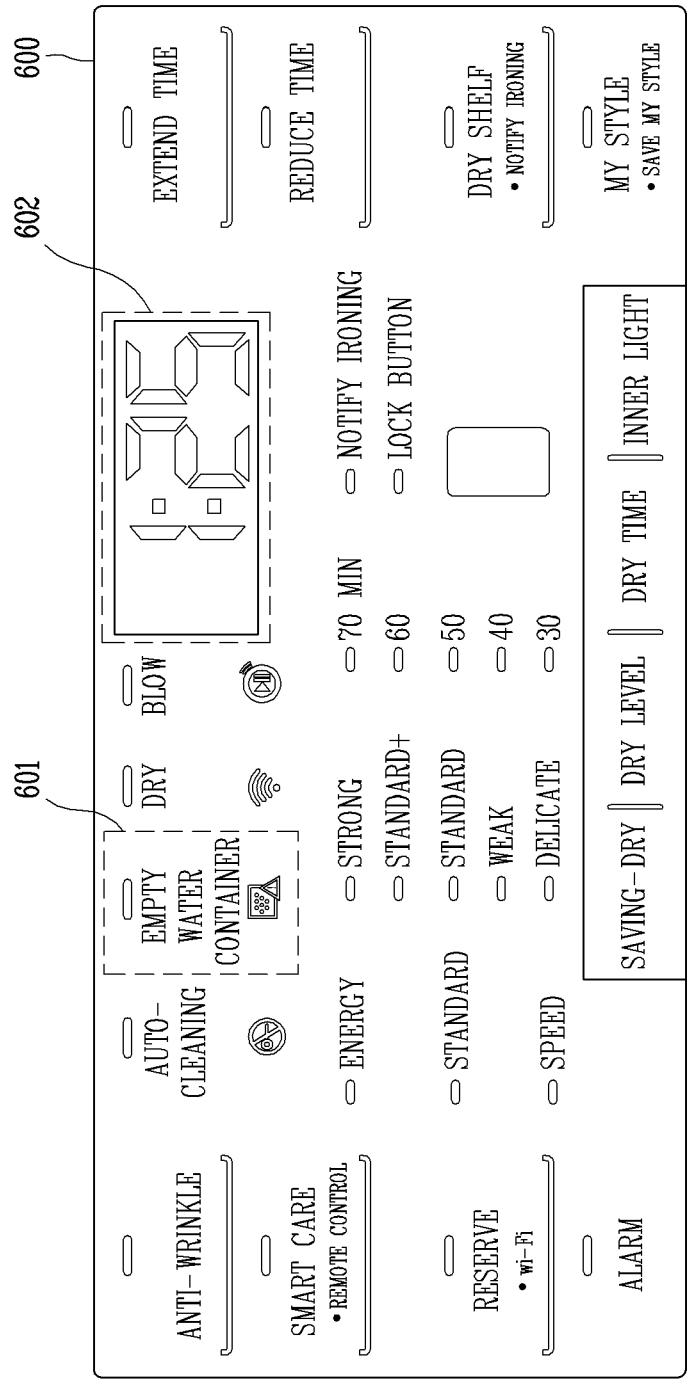
FIG. 31 is a conceptual view illustrating a display of a clothes treatment apparatus in accordance with the implementation of the clothes treatment apparatus and the control method therefor according to the present disclosure.

Referring to FIG. 31, the control unit 380 may control the output unit of the clothes treatment apparatus to output at least one of a first icon 601 related to the water level of the condensate water and a second icon 602 related to a remaining operation time based on the output of the water level sensor.

Although not illustrated in FIG. 31, the control unit 380 may control an operation of a buzzer (not illustrated) provided in the clothes treatment apparatus based on the output of the water level sensor.

Specifically, the control unit 380 may detect the output of the water level sensor every preset monitoring period, and generate error information if the detected output of the water level sensor is not included in a preset range.

When the error information is generated continuously four times, the control unit 380 may control the compressor to be stopped, the buzzer to generate a notification sound, and the output unit to blink the first icon 601.

When the error information is generated continuously six times, the control unit 380 may maintain the stopped state of the compressor, terminate the drying operation of the clothes treatment apparatus, and control the output unit to blink the second icon 602.

When error information is not generated in a next monitoring period after the error information is generated continuously four times, the control unit 380 may control the output unit to deactivate the first icon 601.

According to this implementation, the clothes treatment apparatus can be prevented from being stopped due to erroneous detection by more accurately detecting the amount of condensate water stored in the condensate water storage unit, an increase in a drying time can be prevented by the prevention of the unnecessary stop of the operation, and operation reliability can be improved by re-detecting the water level of the condensate water storage unit in the stopped state of the compressor so as to improve reliability of the water level sensor.

Those implementations of the clothes treatment apparatus and the control method therefor as described above may be applied to a control device, a control module, or a control element for controlling the clothes treatment apparatus, a control method for the control device controlling the clothes treatment apparatus, a control method for the control module controlling the clothes treatment apparatus, a control system for the clothes treatment apparatus, and the like.

Those implementations of the clothes treatment apparatus and the control method therefor as described above may particularly be usefully applied to a control device for controlling an initial operation of the clothes treatment apparatus by employing a converter and a plurality of inverters, a clothes treatment apparatus having the control device, or a control method thereof.

The implementations of the clothes treatment apparatus and the control method thereof as described above may also be applied to all clothes treatment apparatuses, dryers, initial operation control methods of clothes treatment apparatuses, and operation control methods of clothes treatment apparatuses to which the technical idea of the technology can be applied.

The implementations of the clothes treatment apparatus and the control method thereof as described above may be embodied independently or in combination of two or more, and may also be embodied as a part or combination of configurations or steps included in each implementation or embodied in combination of implementations.

The implementations of the clothes treatment apparatus and the control method thereof can be implemented as computer-readable codes in a program-recorded medium. The computer readable medium includes all kinds of recording devices in which data readable by a computer system is stored. Examples of the computer-readable medium include a hard disk drive (HDD), a solid state disk (SSD), a silicon disk drive (SDD), a ROM, a RAM, a CD-ROM, a magnetic tape, a floppy disk, an optical data storage device and the like, and may also be implemented in the form of a carrier wave (e.g., transmission over the Internet). The computer may also include the control unit 380 of the clothes treatment apparatus.

Although specific implementations of the present disclosure have been described so far, various modifications are possible without departing from the scope of the present disclosure. Therefore, the scope of the present disclosure should not be limited to the described implementations, but should be determined not only by the claims below, but also by the equivalents of the claims.

As described above, although the present disclosure has been described by way of limited implementations and drawings, it should be understood that the present disclosure is not limited to the above-described implementations and various modifications and changes are made by those skilled in the art to which the present disclosure pertains. Accordingly, all of the equivalents or equivalent modifications thereof will be said to belong to the scope of the present disclosure.

What is claimed is:

1. A clothes treatment apparatus comprising:
   a main body that defines an outer appearance of the clothes treatment apparatus;
   a drum rotatably disposed in the main body and configured to accommodate an object to be dried;
   a heat pump configured to supply heated air to the drum, the heat pump comprising a compressor being configured to compress refrigerant and to enable the heated air to circulate through the drum via an evaporator and a condenser;
   a blower fan disposed at a rear end of the evaporator and the condenser, the blower fan being configured to generate flow of the heated air;
   a plurality of motors configured to provide driving force to the drum, the blower fan, and the compressor;
   a cleaner configured to spray condensate water collected from the evaporator to a surface of the evaporator to thereby remove foreign substances on the surface of the evaporator;
   a controller configured to control the cleaner and the blower fan, the controller being configured to decrease a rotational speed of the blower fan based on operating the cleaner; and
   a valve comprising:
      a valve case,
      a plurality of condensate water ports that protrude from the valve case and define flow paths of the condensate water therein,
      a plate rotatably disposed in the valve case and configured to block at least one of the plurality of condensate water ports, and
      a valve motor configured to rotate the plate.

2. The clothes treatment apparatus of claim 1, wherein the controller is configured to decrease the rotational speed of the blower fan to a preset reference speed.

3. The clothes treatment apparatus of claim 1, wherein the controller is configured to stop rotation of the blower fan.

4. The clothes treatment apparatus of claim 1, wherein the cleaner comprises:
   a condensate water storage;
   an injection flow path connected to the condensate water storage;
   a pump configured to supply condensate water in the condensate water storage to an end of the injection flow path; and
   a cleaning nozzle configured to, based on operation of the pump, spray the condensate water to a surface of a front part of the evaporator.

5. The clothes treatment apparatus of claim 4, wherein the controller is configured to decrease the rotational speed of the blower fan based on operating the pump to spray the condensate water through the cleaning nozzle.

6. The clothes treatment apparatus of claim 5, wherein the blower fan comprises a blower motor, and
   wherein the controller is configured to, based on terminating operation of the pump, control the blower motor to restore the rotational speed of the blower fan to a first speed that is set before the pump is operated.

7. The clothes treatment apparatus of claim 1, wherein the controller is configured to operate the blower fan after a rotation of the plate being stopped.

8. The clothes treatment apparatus of claim 7, wherein the controller is configured to stop operation of the blower fan before operating a pump of the cleaner to drain the condensate water to the outside.

9. The clothes treatment apparatus of claim 7, wherein at least one of the plurality of condensate water ports is connected to an outside of the clothes treatment apparatus.

10. The clothes treatment apparatus of claim 9, wherein the controller is configured to:
    control the valve motor to switch the plate from (i) a first state in which one of the plurality of condensate water ports connected to the outside is open to (ii) a second state in which another one of the plurality of condensate water ports is open; and
    control the blower fan to operate based on the plate being switched to the second state.

11. The clothes treatment apparatus of claim 1, wherein the controller is configured to set a start time point for operating the blower fan based on a rotation angle of the plate.

12. The clothes treatment apparatus of claim 1, wherein the valve case defines a plurality of holes corresponding to ends of the plurality of condensate water ports, respectively, and
    wherein the plate is configured to open one of the plurality of holes based on rotating relative to the valve case.

13. The clothes treatment apparatus of claim 12, wherein the plate comprises a circular plate having a cut portion, the cut portion being configured to open one of the plurality of holes based on rotating relative to the valve case.

14. The clothes treatment apparatus of claim 1, wherein the plurality of condensate water ports comprise (i) a first port that extends in a first direction and (ii) a second port that extends in a second direction intersecting the first direction.

15. The clothes treatment apparatus of claim 14, wherein the plate is configured to rotate about an axis extending in the second direction.

16. The clothes treatment apparatus of claim 15, wherein the plurality of condensate water ports further comprise a third port that extends in the first direction and a fourth port that extends in the second direction, and wherein the fourth port is disposed above the second port.

17. The clothes treatment apparatus of claim 16, wherein the valve further comprises a port portion that defines a plurality of holes corresponding to ends of the plurality of condensate water ports, respectively, and wherein at least one of the plurality of condensate water ports is curved in the second direction and connected to one of the plurality of holes of the port portion.

18. The clothes treatment apparatus of claim 1, wherein the controller is configured to:

control the blower fan to rotate at a first revolutions per minute (rpm);

based on operating the blower fan at the first rpm, start a cleaning mode for operating the cleaner;

based on starting the cleaning mode, control the blower fan to rotate at a second rpm different from the first rpm;

terminate the cleaning mode; and based on terminating the cleaning mode, control the blower fan to rotate at the first rpm.

19. The clothes treatment apparatus of claim 18, wherein the controller is configured to decrease the rotational speed of the blower fan to zero based on starting the cleaning mode.

* * * * *